United States Patent
Imai et al.

(10) Patent No.: US 6,712,700 B1
(45) Date of Patent: Mar. 30, 2004

(54) STEREO MODEL DISPLAYING METHOD AND APPARATUS IN VIDEO GAME, GAME APPARATUS, AND COMPUTER-READABLE RECORDING MEDIUM STORED WITH STEREO MODEL DISPLAYING PROGRAM FOR VIDEO GAME

(75) Inventors: Hitoshi Imai, Tokyo (JP); Tsuyoshi Hasegawa, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 270 days.

(21) Appl. No.: 09/694,784

(22) Filed: Oct. 24, 2000

(30) Foreign Application Priority Data

Oct. 29, 1999 (JP) .......................................... 11-310383

(51) Int. Cl.[7] ................................................ A63F 9/24
(52) U.S. Cl. ....................................................... 463/31
(58) Field of Search .............. 463/30–32; 345/418–419, 345/421, 420, 426

(56) References Cited

U.S. PATENT DOCUMENTS

| | | | |
|---|---|---|---|
| 5,880,736 A | * 3/1999 | Peercy | 345/426 |
| 5,966,134 A | * 10/1999 | Arias | 345/426 |
| 6,151,026 A | 11/2000 | Iwade et al. | |

FOREIGN PATENT DOCUMENTS

JP                251094           9/2000

OTHER PUBLICATIONS

English language abstract of JP 2000–251094.

* cited by examiner

Primary Examiner—Mark Sager
(74) Attorney, Agent, or Firm—Greenblum & Bernstein P.L.C.

(57) ABSTRACT

It is an object of the invention to form a non-photorealistic game image in real time by using a computer graphics technology.

In order to form an image in a cel animation tone having a contour line as an example of the non-photorealistic game image, there is acquired data of a contour drawing model and a stereo model expressing a character (step S2). Next, a player of a game operates a button or the like of an input apparatus (step S3). How the game is progressed in accordance with operation of the player is determined and a game progress situation of a position, a direction or the like of the character is set (steps S4–5). In accordance with the setting, the stereo model and the contour drawing model arranged to include the stereo model are drawn (steps S6–7). A portion of the contour drawing model extruded from the stereo model actually constitutes the contour line. The stereo model is set with color for drawing at respective predetermined brightness ranges in polygons thereof and is painted by two or three kinds of color for the respective polygons. The processing is repeated until the game is over.

12 Claims, 44 Drawing Sheets

FIG. 2

| THRESHOLD | REFERENCE BRIGHTNESS |
|---|---|
| 0.75 | 0.75 |
| 0.50 | 0.50 |
| 0.00 | 0.25 |

FIG. 3

| BRIGHTNESS RANGE | | REFERENCE BRIGHTNESS |
|---|---|---|
| UPPER LIMIT | LOWER LIMIT | |
| 1.00 | 0.75 | 0.75 |
| 0.74 | 0.50 | 0.50 |
| 0.49 | 0.00 | 0.25 |

FIG. 6

CHARACTER DATA

| | | |
|---|---|---|
| 10 | MAXIMUM PHYSICAL STRENGTH | 300 |
| 12 | PHYSICAL STRENGTH | 300 |
| 14 | ATTACK FORCE | 123 |
| 16 | DEFENCE FORCE | 51 |
| 18 | COORDINATES (X, Y, Z) | (15.0, 0.0, 3.2) |
| 20 | DIRECTION (ROTATIONAL ANGLES AROUND X, Y, Z AXIS) | (0, -90, 0) |
| 22 | MOTION (POINTER) | → MOTION DATA |
| 24 | STEREO MODEL (POINTER) | → MODEL DATA |
| | ⋮ | |

FIG. 10A

| |
|---|
| TRIANGULAR POLYGON BEFORE PERSPECTIVE VIEW CONVERSION 0 |
| TRIANGULAR POLYGON BEFORE PERSPECTIVE VIEW CONVERSION 1 |
| TRIANGULAR POLYGON BEFORE PERSPECTIVE VIEW CONVERSION 2 |
| ⋮ |
| TRIANGULAR POLYGON BEFORE PERSPECTIVE VIEW CONVERSION N-1 |

FIG. 10B

TRIANGULAR POLYGON BEFORE PERSPECTIVE VIEW CONVERSION

| | |
|---|---|
| | COLOR OF MATERIAL (Y, I, Q) |
| APEX 0 | APEX DATA IDX |
| APEX 1 | APEX DATA IDX |
| APEX 2 | APEX DATA IDX |

FIG. 10C

APEX DATA TABLE

| | |
|---|---|
| APEX DATA IDX 0 | THREE-DIMENSIONAL COORDINATES (P0x, P0y, P0z) |
| | NORMAL LINE VECTOR (N0x, N0y, N0z) |
| APEX DATA IDX 1 | THREE-DIMENSIONAL COORDINATES (P1x, P1y, P1z) |
| | NORMAL LINE VECTOR (N1x, N1y, N1z) |
| | ⋮ |
| APEX DATA IDX [ N-1 ] | THREE-DIMENSIONAL COORDINATES (P [ N-1 ] x, P [ N-1 ] y, P [ N-1 ] z) |
| | NORMAL LINE VECTOR (N [ N-1 ] x, N [ N-1 ] y, N [ N-1 ] z) |

FIG. 16

| | |
|---|---|
| | DRAWING COLOR IN CORRESPONDENCE WITH FIRST BRIGHTNESS RANGE (r, g, b) |
| | DRAWING COLOR IN CORRESPONDENCE WITH SECOND BRIGHTNESS RANGE (r, g, b) |
| | DRAWING COLOR IN CORRESPONDENCE WITH THIRD BRIGHTNESS RANGE (r, g, b) |
| APEX 0 | APEX DATA IDX |
| APEX 1 | APEX DATA IDX |
| APEX 2 | APEX DATA IDX |

FIG. 21

CHARACTER DATA

| | | |
|---|---|---|
| 10 | MAXIMUM PHYSICAL STRENGTH | 300 |
| 12 | PHYSICAL STRENGTH | 300 |
| 14 | ATTACK FORCE | 123 |
| 16 | DEFENCE FORCE | 51 |
| 18 | COORDINATES (X, Y, Z) | (15.0, 0.0, 3.2) |
| 20 | DIRECTION (ROTATIONAL ANGLES AROUND X, Y, Z AXIS) | (0, -90, 0) |
| 22 | MOTION (POINTER) | ⟶ MOTION DATA |
| 24 | STEREO MODEL (POINTER) | ⟶ MODEL DATA |
| 26 | CONTOUR DRAWING MODEL (POINTER) | ⟶ MODEL DATA |
| | ⋮ | |

FIG. 26A
CASE OF HEAD
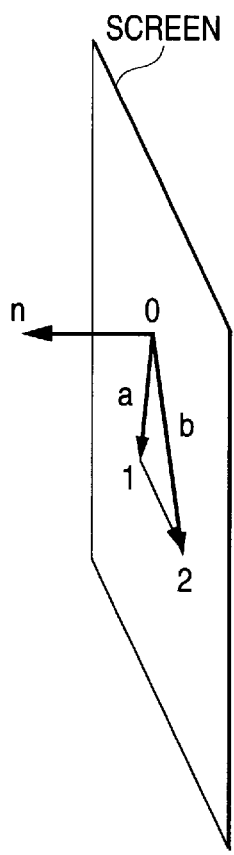
FIG. 26B
CASE OF TAIL
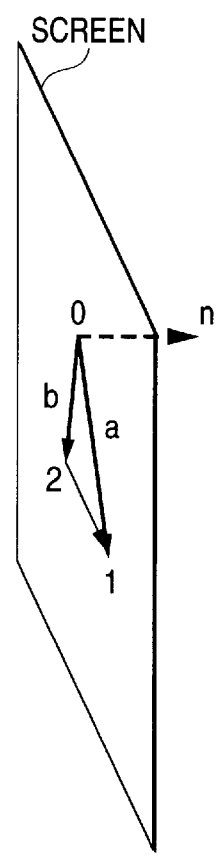
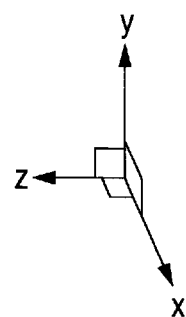
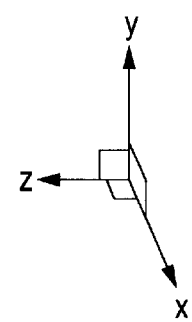
n: a x b (OUTER PRODUCT)

WHEN CONTOUR DRAWING MODEL
IS FORMED SUCH THAT TAIL FACE IS
CONSTITUTED ON THE HEAD SIDE

THIS SIDE OF
PAPER FACE IS TAIL

| THRESHOLD | REFERENCE BRIGHTNESS |
|---|---|
| 0.3125 | 0.76 |
| 0 | 0.60 |

STEREO MODEL DISPLAYING METHOD AND APPARATUS IN VIDEO GAME, GAME APPARATUS, AND COMPUTER-READABLE RECORDING MEDIUM STORED WITH STEREO MODEL DISPLAYING PROGRAM FOR VIDEO GAME

BACKGROUND OF THE INVENTION

1. Field of the Invention

The present invention relates to a method and an apparatus of displaying a stereo model in a video game, a game apparatus and a computer-readable recording medium stored with a program of displaying a stereo model for a video game, for drawing a stereo model constituted by a plurality of polygons in a virtual three-dimensional space. Here, a stereo model designates 3D object constituted by a plurality of polygons.

2. Related Art

In recent years, by progress of display-related art, particularly computer graphics (CG) art, there have been produced more than before, games of three-dimensional images expressed more photorealistically. However, on the other hand, a new look has been taken at a game by images which are expressed non-photorealistically, that is, in a handwriting tone and demand therefor is enhancing. As an example of such a non-photorealistic image, there is an image which is referred to as cel animation tone since the image resembles an image of cel animation produced by cel pictures.

Conventionally, in order to express a non-photorealistic game image in the cel animation tone, it is necessary to produce a character or a background image by handwriting, particularly, when a direction of displaying the character is changed in a game, an image in correspondence with each display direction is prepared by handwriting. In this way, a character image in cel animation tone is produced by manual labor and accordingly, only character images from limited directions have been prepared.

SUMMARY OF THE INVENTION

It is an object of the invention to provide a method and an apparatus of displaying a stereo model in a video game capable of displaying a character in a cel animation tone in an arbitrary direction in real time, a game apparatus and a computer-readable record medium stored with a stereo model display program for a video game.

In order to achieve the above-described object, according to a first aspect of the invention, there is provided a method of displaying a stereo model in a video game which is a method of displaying a stereo model in a video game for drawing the stereo model constituted by a plurality of polygons in a virtual three-dimensional space, the method comprising:

a first step of determining a direction of displaying the stereo model in response to an operation input;

a second step of arranging the stereo model and a contour drawing model having a shape of including the stereo model and constituted by a plurality of polygons in conformity with the direction determined at the first step such that a positional relationship in which the contour drawing model includes the stereo model is constituted; and a third step of drawing the stereo model by reducing a gray scale number of a brightness previously given to the stereo model and drawing only the polygon of the contour drawing model in which a surface of the polygon is directed in a direction reverse to the direction determined at the first step. In this case, "a direction of displaying the stereo model" is, for example, a direction from the stereo model to a view point. Further, "surface" mentioned above, is a face of the stereo model directed to an outer side. By executing such a method, the stereo model in a cel animation tone is drawn.

According to the invention, the direction of displaying the stereo model is determined in response to the operation input and the stereo model is drawn in the cel animation tone in accordance with the determined direction. Thereby, even in the direction of displaying the stereo model is changed by the operation input, the stereo model from the changed direction can be drawn in the cel animation tone in real time.

According to the method of displaying a stereo model in a video game, the third step may be constituted by a step of drawing the stereo model by reducing the gray scale number of the brightness previously given to the stereo model and drawing only the polygon of the contour drawing model in which the surface of the polygon is directed in the direction reverse to the direction determined at the first step by using a predetermined color.

According to the method of displaying a stereo model in a video game, the first step may be constituted by a step of moving the stereo model and determining the direction of displaying the stereo model in response to the operation input.

According to the method of displaying a stereo model in a video game, the first step may be constituted by a step of switching a view point and determining the direction of displaying the stereo model in response to the operation input.

According to the method of displaying a stereo model in a video game, the stereo model may be a character.

Further, according to a second aspect of the invention, there is provided a computer-readable record medium which is a computer-readable record medium stored with a stereo model display program for a video game for drawing a stereo model constituted by a plurality of polygons in a virtual three-dimensional space:

wherein the stereo model display program makes the computer execute:

a first step of determining a direction of displaying the stereo model in response to an operation input;

a second step of arranging the stereo model and a contour drawing model having a shape of including the stereo model and constituted by a plurality of polygons in conformity with the direction determined at the first step such that a positional relationship in which the contour drawing model includes the stereo model is constituted; and a third step of drawing the stereo model by reducing a gray scale number of a brightness previously given to the stereo model and drawing only the polygon of the contour drawing model in which a surface of the polygon is directed in a direction reverse to the direction determined at the first step.

According to the program, the third step may be constituted by a step of drawing the stereo model by reducing the gray scale number of the brightness previously given to the stereo model and drawing only the polygon of the contour drawing model in which the surface of the polygon is directed in the direction reverse to the direction determined at the first step by using a predetermined color.

According to the program, the first step may be constituted by a step of moving the stereo model and determining the direction of displaying the stereo model in response to the operation input.

According to the program, the first step may be constituted by a step of switching a view point and determining the direction of displaying the stereo model in response to the operation input.

According to the program, the stereo model may be a character.

Further, the program according to the second aspect of the invention is stored in a record medium of, for example, CD-ROM, floppy disk, memory cartridge, memory, hard disk or the like or a storing apparatus. By making a computer read the program stored in a record medium or a storing apparatus in this way, an apparatus of displaying a stereo model and a game apparatus, mentioned below, can be realized. Further, the program can be easily distributed and sold independent from an apparatus as a software product by a record medium. Further, by executing the program by using a hardware such as a computer, the graphics technology of the invention can easily be executed by the hardware.

Further, according to a third aspect of the invention, there is provided an apparatus of displaying a stereo model in a video game which is an apparatus of displaying a stereo model in a video game for drawing a stereo model constituted by a plurality of polygons in a virtual three-dimensional space, wherein the apparatus executes:

determining a direction of displaying the stereo model in response to an operation input;

arranging the stereo model and a contour drawing model having a shape of including the stereo model and constituted by a plurality of polygons in conformity with the determined direction such that a positional relationship in which the contour drawing model includes the stereo model is constituted; and drawing the stereo model by reducing a gray scale number of a brightness previously given to the stereo model and drawing only the polygon of the contour drawing mode in which a surface of the polygon is directed in a direction reverse to the determined direction.

By making a computer execute the respective steps by the method of displaying a stereo model according to a first mode of the invention, an effect similar to that in the method of displaying a stereo model, mentioned above, can be achieved.

Therefore, by executing the described processing steps by using a hardware of a computer or the like, the stereo model display technology of the invention can easily be executed by the hardware.

Further, according to a fourth aspect of the invention, there is provided a game apparatus which is a game apparatus for drawing a stereo model constituted by a plurality of polygons in a virtual three-dimensional space, the apparatus comprising:

a computer;

a computer-readable record medium stored with a program which the computer is made to execute;

wherein the program makes the computer execute:

a determining processing of determining a direction of displaying the stereo model in response to an operation input;

an arranging processing of arranging the stereo model and a contour drawing model having a shape of including the stereo model and constituted by a plurality of polygons in conformity with the direction determined by the determining processing such that a positional relationship in which the contour drawing model includes the stereo model is constituted; and a drawing processing of drawing the stereo model by reducing a gray scale number of a brightness previously given to the stereo model and drawing only the polygon of the contour drawing model in which a surface of the polygon is directed to a direction reverse to the direction determined by the determining processing.

BRIEF DESCRIPTION OF THE DRAWINGS

FIG. 2 is a diagram showing an example of a brightness range table;

FIG. 3 is a diagram showing an example of a brightness range table;

FIG. 6 is a schematic diagram showing a data structure of character data in a cell animation tone coloring processing;

FIGS. 10A, 10B and 10C are schematic diagrams showing a data structure of a polygon model in which FIG. 10A shows a data structure of a total of a stereo model, FIG. 10B shows a data structure of a triangular polygon before perspective view conversion and FIG. 10C shows a data structure of apex data table;

FIGS. 12A, 12B, 12C, 12D, 12E and 12F show an example of an image for explaining respective stages of processing when a triangular polygon is drawn by an algorism of a cel animation tone coloring processing in which FIGS. 12A and 12B show areas drawn when the threshold of 0.75 is set, FIGS. 12C and 12D show ranges drawn when a threshold of 0.5 is set in the case in which a Z buffer is not used in a cel animation coloring processing and FIGS. 12E and 12F show ranges drawn when a threshold of 0.5 is set in the case in which the Z buffer is used in the cel animation tone coloring processing;

FIG. 16 is a schematic diagram of a data structure of a triangular polygon used in a cel animation tone coloring processing and Embodiments 1 and 2 in correspondence with FIG. 10B;

FIG. 21 is a schematic diagram showing a data structure of character data in the first and the second contour drawing processings and Embodiments 1 and 2;

FIG. 26 is a schematic view for explaining a method of determining head and tail;

DETAILED DESCRIPTION OF THE PREFERRED EMBODIMENT(S)

Figure 1:
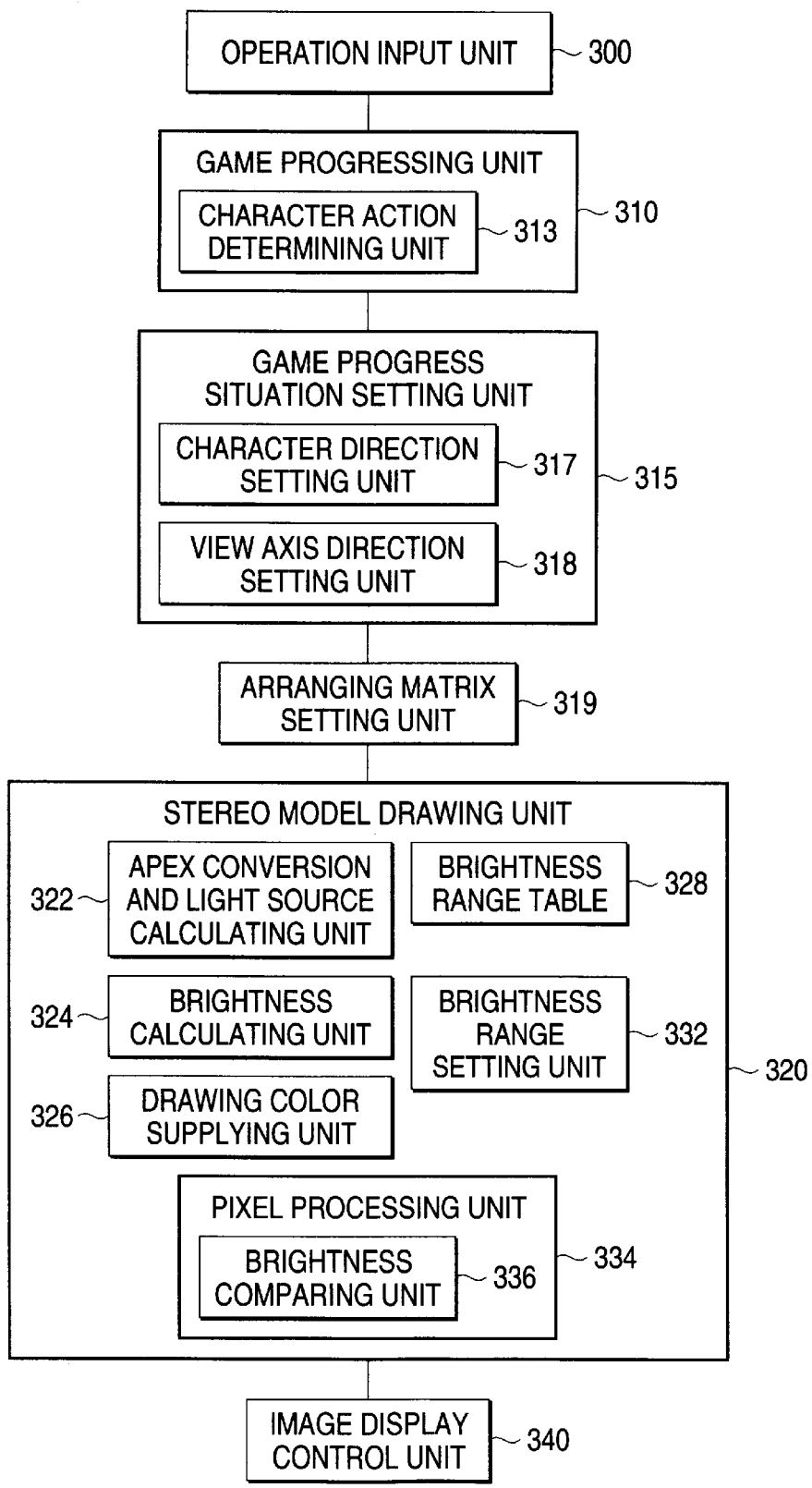
FIG. 1 is a functional block diagram of a cel animation tone coloring processing.

An explanation will be given of an embodiment of the invention in reference to the attached drawings as follows.

First, an explanation will be given of an outline of an embodiment of the invention. A game apparatus according to the embodiment of the invention includes means for determining a direction of displaying a stereo model, arranging means for arranging the stereo model and a contour drawing model and drawing means for drawing the two models.

The means for determining a direction of displaying a stereo model, determines a direction of displaying a stereo model by moving the stereo model constituting, for example, a character of a game in accordance with, for example, operation of a player. The arranging means arranges the stereo model and the contour drawing model in a shape capable of including the stereo model in accordance with the direction determined by an operation input, for example, in the same direction and at the same position. Thereby, there is constituted a positional relationship in which the contour drawing model includes the stereo model.

The drawing means carries out coloring in a cel animation tone to the stereo model by drawing a picture by reducing a gray scale number of brightness. Meanwhile, with regard to the contour drawing model, among polygons constituting the contour drawing model, only a polygon an outer side of which is directed in a reverse direction relative to a view point, is drawn by, for example, black. When a hidden face erasing processing is carried out in the drawing processing, only a portion of the contour drawing model which is extruded from the stereo model in view from the view point, is drawn and accordingly, as a result, a contour drawing processing is carried out.

Thereby, the stereo model drawn in a self animation tone can be displayed in real time. Prior to the explanation of the embodiment according to the invention, in the following, firstly, a detailed explanation will be given of a cel animation tone coloring processing and two kinds of contour drawing processings necessary for the invention.

(1) Cel Animation Tone Coloring Processing

According to a cel animation tone coloring processing, coloring in a cel animation tone is carried out to a stereo model expressing a character or the like of a game. That is, the stereo model is colored by a gray scale number lower than a gray scale number of brightness provided when a photorealistic game image is formed.

An explanation will be given of an outline of the cel animation tone coloring processing in reference to a functional block diagram of FIG. 1. A game machine according to the cel animation tone coloring processing includes an operation input unit 300, a game progressing unit 310 including a character action determining unit 313, a game situation setting unit 315 including a character direction setting unit 317 and a view axis direction setting unit 318, a stereo model drawing unit 320 and an image display control unit 340. Further, the stereo model drawing unit 320 includes an apex conversion and light source calculating unit 322, a brightness calculating unit 324, a drawing color supplying unit 326, a brightness range table 328, a brightness range setting unit 332 and a pixel processing unit 334. The pixel processing unit 334 includes a brightness comparing unit 336.

The operation input unit 300 outputs operation information of a button, a lever or the like of the operation input unit 300 operated by a player of a game to the game progressing unit 310.

The game progressing unit 310 determines, based on information from the operation input unit 300, content of progressing the game such as action of a character, a change in a view point position, a change in a direction of a view axis, or movement of a position of a light source, a change in a direction of light ray and gives instruction to the game progress situation setting unit 315. The character action determining unit 313 in the game processing unit 310 is provided with a function of particularly determining the action of the character based on the information from the operation input unit 300.

The game progress situation setting unit 315 calculates and sets a position, a direction and a shape of the character, the position of the view point or the direction of the view axis, the position of the light source, the direction of the light ray, and an increase or a decrease in a physical strength in accordance with the action of the character, in accordance with the content of progressing the game instructed by the game processing unit 310. The character direction setting unit 317 in the game progress situation setting unit 315 is provided with a function of particularly determining a direction of the character relative to the view point in accordance with the content of progressing the game instructed by the game progressing unit 310. Meanwhile, the view axis direction setting unit 318 in the game progress situation setting unit 315 is provided with a function of particularly setting the direction of the view axis in accordance with the content of progressing the game instructed by the game progressing unit 310.

Further, the physical strength of the character is a capacity value provided to the character and when the character is attacked in a battle against an enemy character, the value is reduced by a value calculated based on attack force of the enemy character and defence force of the character. Further, when the character rests at a predetermined rest site in the world of the game, the physical strength of the character increases to a value of maximum physical strength of the character.

An arranging matrix setting unit 319 carries out processing of determining an arranging matrix of a stereo model for expressing a character in accordance with position coordinates and a direction of the character and a position of a view point which are set by the game progress situation setting unit 315. The arranging matrix is a matrix for carrying out parallel movement, rotation and perspective view conversion of a stereo model.

The stereo model drawing unit 320 executes a processing of providing a stereo model with coloring in a cel animation tone by a function included therein.

The apex conversion and light source calculating unit 322 of the stereo model drawing unit 320 executes apex conversion (enlargement, contraction, rotation, parallel movement, perspective view conversion) with regard to respective apexes of triangular polygons constituting a stereo model arranged in a virtual three-dimensional space and carries out light source calculation with regard to the respective apexes of the triangular polygons subjected to apex conversion. Here, there is used the arranging matrix of a stereo model set by the arranging matrix setting unit 319.

Further, the apex conversion and the light source calculating unit 322 of the stereo model drawing unit 320 also carries out head and tail determination of the respective triangular polygons of the stereo model. Only a surface directing head to a view point constitutes an object of drawing. A detailed description will be given of the head and tail determination in (2) contour drawing processing.

The brightness calculating unit 324 of the stereo model drawing unit 320 calculates a brightness from color at respective apexes of the triangular polygons calculated by the apex conversion and light source calculating unit 322. Normally, the apex conversion and the light source calculating unit 322 calculates color in an RGB system and accordingly, the brightness calculating unit 324 calculates a brightness Y by subjecting RGB to YIQ conversion. The brightness at the respective apex of the triangular polygon is outputted to the pixel processing unit 394.

The brightness range table 328 is, for example, a table as shown in FIG. 2. That is, this is a table paired with a threshold and a reference brightness which are set here to three stages (levels) such that threshold value 0.75 versus reference brightness 0.75, threshold value 0.5 versus reference brightness 0.50 and threshold 0.00 versus reference brightness 0.25. Further, here, the brightness is provided with a real number value from 0 to 1. In place of the threshold value, a range may be designated by an upper limit and a lower limit (for example, refer to FIG. 3).

By referring to the brightness range table 328, the drawing color supplying unit 326 calculates color for drawing in correspondence with the respective threshold. The drawing color in correspondence with the respective threshold is calculated by the reference brightness in correspondence with the threshold and information of color previous set to the respective triangular polygon. The calculated drawing color is outputted to the pixel processing unit 334 by the drawing color supplying unit 326.

Further, the drawing color supplying unit 326 may calculate the drawing color in execution or may previously calculate the drawing color and store the data. For example, when the brightness range table as shown by, for example, FIG. 2, it is necessary to previously store three drawing color data for respective polygon.

The brightness range setting unit 332 selects one threshold of the brightness range table 328 and sets the threshold to the pixel processing unit 334. When the brightness range table 328 as shown by FIG. 2 is used as it is, the brightness range setting unit 332 sets the threshold value one by one in turn from upper columns. When the range by the upper limit and the lower limit is designated in place of the threshold value, the threshold can be selected and set at random.

The pixel processing unit 334 interpolates brightnesses at respective apexes of a triangular polygon outputted from the brightness calculating unit 324 and calculates brightnesses at respective pixels at inside of the polygon (brightness distribution in polygon). The system of interpolation may be of algorism of Coulaw shading or an algorism of Fon shading.

Further, the brightness comparing unit 336 compares the brightness at the respective pixel with the threshold value set by the brightness range setting unit 332 and when the brightness at the pixel is equal to or larger than the threshold, the drawing color based on the reference brightness in correspondence with the threshold is drawn as color of the pixel. When the brightness at the pixel is less that the threshold, color of the pixel is not drawn at this stage. When the brightness range setting unit 332 sets all of thresholds in the brightness range table 328 and processes all of pixels in a polygon, inside of the polygon is painted to classify in three stages.

Further, when the brightness range table 430 as shown by FIG. 2 is used as it is, hidden face erasure by the Z buffer method is further utilized. Because, for example, according to FIG. 2, brightness equal to or larger than 0.75 is also equal to or larger than 0.5 or equal to or larger than 0.0 and therefore, the upper limit of the brightness range is set such that the drawing color is prevented from being painted overlappingly. When brightness of a certain pixel is equal to or larger than 0.75, the drawing color in correspondence with the threshold 0.75 is drawn as color of the pixel and the Z value of the pixel is stored to the Z buffer.

When the threshold becomes 0.5, the Z value of the pixel is read from the Z buffer and compared with the Z value of the pixel intended to write, however, the two values are naturally the same and accordingly, the drawing color in correspondence with the threshold 0.5 is not drawn with regard to the pixel. The same goes with the threshold 0.0.

Further, brightness at the apex of a polygon or at a pixel at inside of the polygon is dealt with as an attribute value of color (RGB) referred to as a normally used as transparency. Normally, the a value is defined by a range of 0–255 and the a value multiplied by 255 is actually used. Therefore, the threshold values (upper limit and lower limit value) of the brightness range table 430 may be values in the range of 0–255.

Finally, the image display control unit 340 designates a drawing area for displaying an image on a display screen drawn by the pixel processing unit 334. The drawing area is normally divided in two, one is used for display and other is used for writing. Further, when writing to a writing area is finished, the writing area is used to switch as a displaying area, further, the displaying area is used to switch as the writing area. The image display control unit 340 controls the switching operation.

Next, an explanation will be given of a processing flow with regard to a cel animation tone coloring processing.
(Total Processing Flow)

Figure 4:
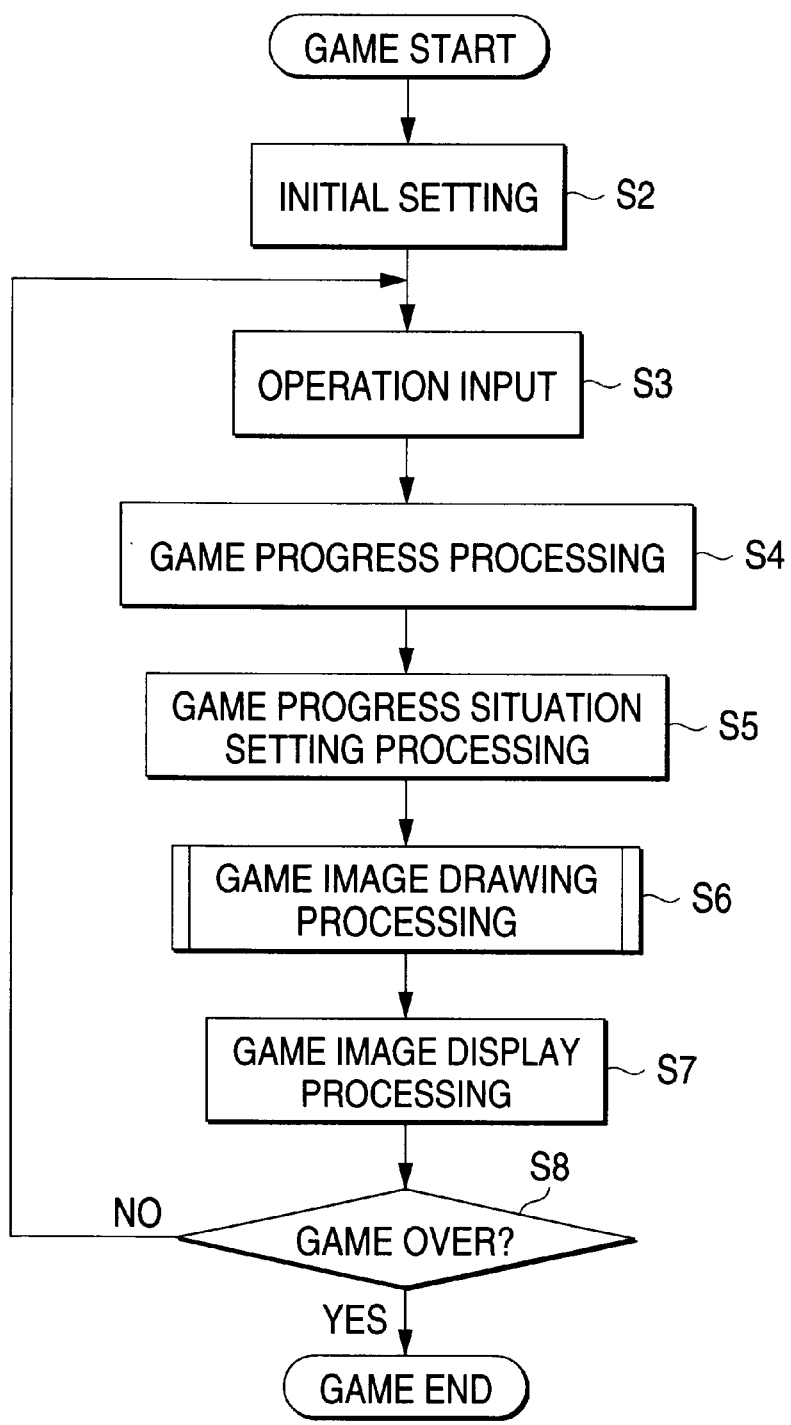
FIG. 4 is a flowchart showing a total processing according to the invention.

FIG. 4 shows a processing flow of a total of a cel animation tone coloring processing. When a game is started, initial setting is carried out (Step S2). In the processing of the initial setting, there is included a processing of acquiring data of a stereo model for expressing a character to be drawn. Next, operation of button, lever or the like of the operation input unit 300 is carried out by a player of the game (step S3). Further, based on information of the operation input at step S3, for example, there is carried out a game progress processing for determining content of progressing the game such that the character moves to the left or the character attacks, a change in a view point position, a change in a direction of a view axis, a movement of a light source position, a change in a direction of light ray or the like (step S4).

Thereafter, in accordance with content of progressing the game determined at step S4, there is carried out a game progress situation setting processing for setting a position, a direction and a shape of the character, the position of the view point, the direction of the view axis, the position of the light source or the direction of the light ray, further, an increase or a decrease of physical strength in accordance with the action of the character (step S5). Next, there is carried out a game image drawing processing for drawing a game image in accordance with a game progress situation (step S6). A detailed description will be given later of the game image drawing processing.

Further, there is carried out a game image displaying processing for displaying the game image drawn by the game image drawing processing at step S6 (step S7). Normally, the drawing area is divided in two areas of a writing area and a displaying area and in this case, by the game image drawing processing executed at step S6, there is carried out a processing of switching the writing area written with data to the displaying area and switching the displaying area to a successive writing area.

Next, it is determined whether the game is over (step S8). In the game progress situation setting processing executed in accordance with the operation input at step S3 (step S5), when the physical strength of a self character operated by the player of the game is reduced and set to 0, the condition of game over is satisfied. At step S8, the physical strength of the self character operated by player of the game is inspected and it is determined whether the game is over. Further, when the physical strength of the self character is not 0, the operation returns to step S3 and awaits for successive operation input. Meanwhile, in the case of game over, the game is finished. Further, even in the case of finishing the game, a result thereof is displayed on a display screen at step S7, the player can grasp a final situation of the game from the display screen.

Figure 5:
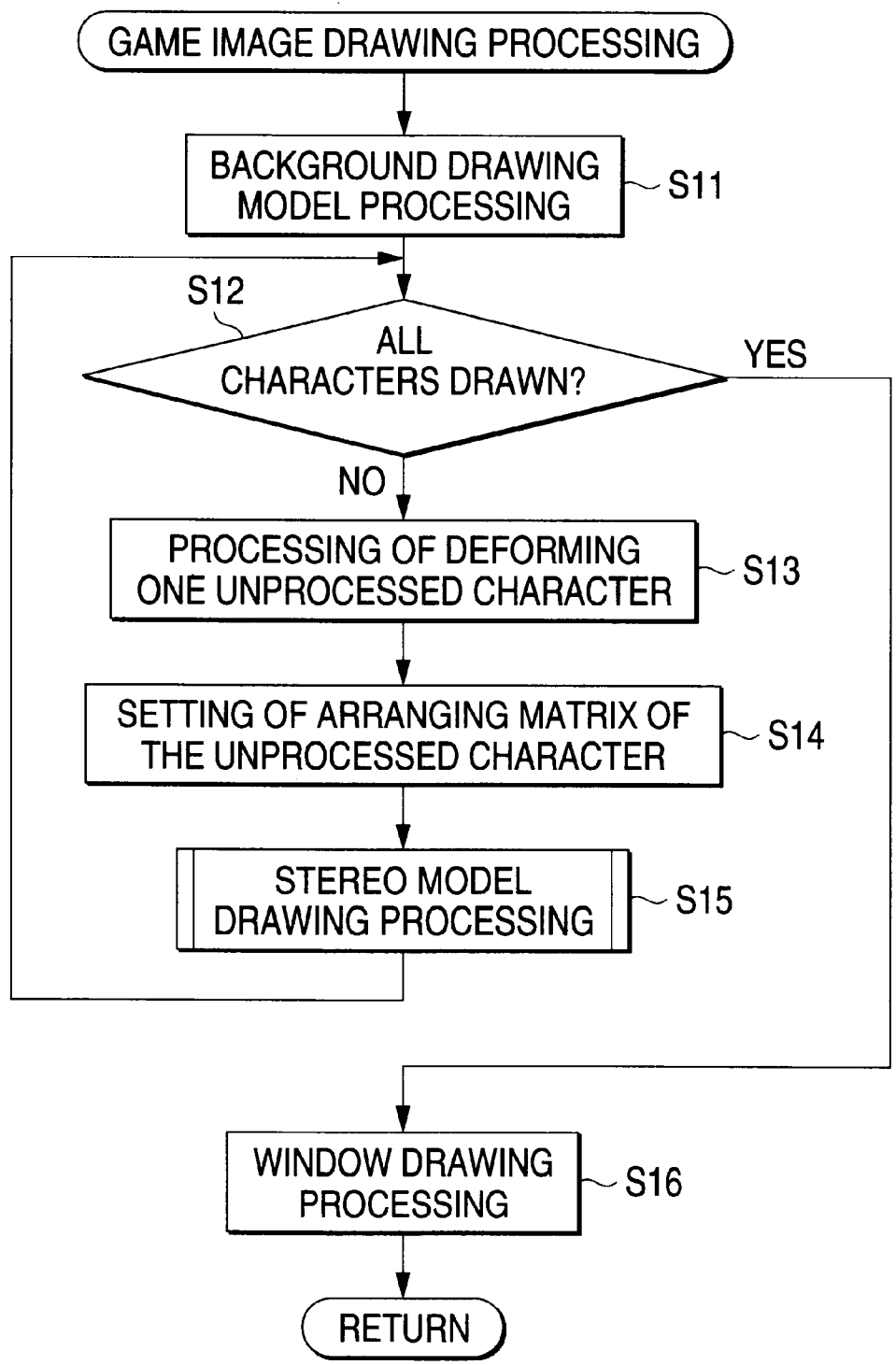
FIG. 5 is a flowchart showing a game image drawing processing in a cel animation tone coloring processing.

FIG. 5 shows a processing flow expressing an outline of the game image drawing processing at step S6 (FIG. 4). First, there is carried out a background model drawing processing for drawing a background model for expressing a background portion in a game image (step S11). The drawing processing is the same as a conventional drawing processing and therefore, a detailed description thereof will not be given here. Further, following steps S13 through S15 are repeated until drawing all of characters (steps S12).

A first one of the repeated steps is a step of executing a deforming processing for deforming one unprocessed character (step S13). In accordance with the operation input executed at the step S3 of FIG. 4, motion of the unprocessed character is determined by the game progress processing at step S4. Further, there is executed a processing of deforming a stereo model for expressing the unprocessed character, which is set by the game progress situation setting processing at step S6 which is executed further in accordance therewith.

A second one of the repeated steps is a step of setting an arranging matrix of the unprocessed character (step S14). The arranging matrix is a matrix for parallel movement, rotation and perspective view conversion of a stereo model for expressing the unprocessed character and is formed based on position coordinates and a direction of the character set by the game progress situation setting processing at step S5 and a position of a viewpoint. Further, a third one of the repeated steps is a step of executing a stereo model drawing processing for drawing a stereo model for expressing the unprocessed character (step S15). A detailed description will be given later of the stereo model drawing processing.

After all of characters have been drawn, there is executed a window drawing processing for drawing a window for displaying capacitances or the like of the characters to a user (step S16). The window drawing processing is the same as the conventional drawing process and therefore, a detailed description thereof will not be given here.

Next, although an explanation will be given of a simple example with regard to progress of a game story in accordance with the operation input of the player of the game (FIG. 7 and FIG. 8), prior thereto, an explanation will be given of data of characters used in the cel animation tone coloring processing. The character data includes a numerical value of maximum physical strength 10 (for example, 300), a numerical value of current physical strength 12 (for example, 300) a numerical value of attack force 14 (for example, 123), a numerical value of defence force 16 (for example, 51), coordinates (x, y, z) of a reference position 18 (for example, (15.0, 0.0, 3.2)), rotational angles around X, Y, Z axes constituting a direction 20 of character (for example, (0, −90, 0)), pointer 22 for motion data and pointer 24 for model data of the stereo model.

Figure 7:
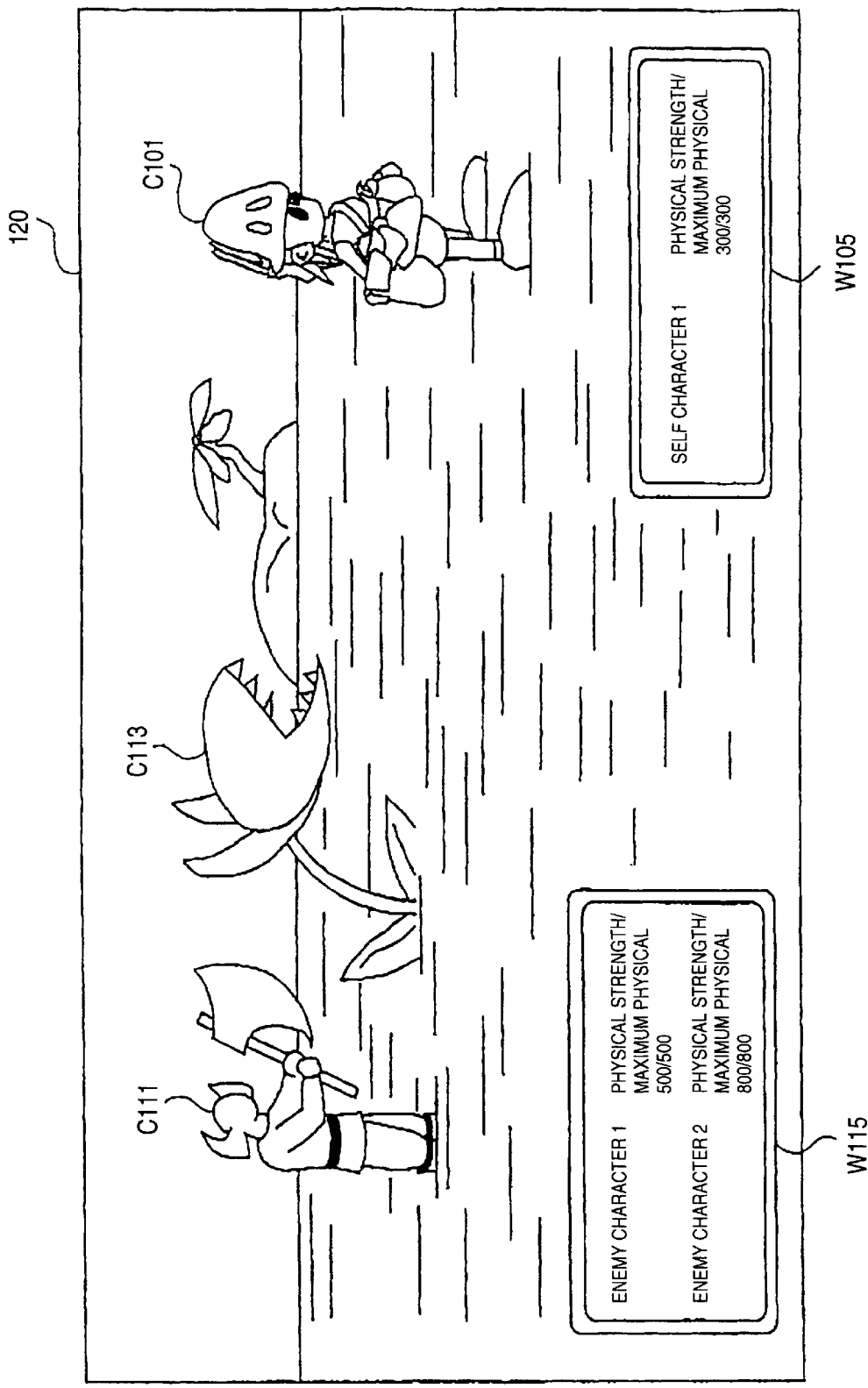
FIG. 7 is a view showing an example of a display screen of a game.

FIG. 7 shows an example of a display screen 120 for displaying an image of a game for progressing a story for making a self character fight against an enemy character in a virtual three-dimensional space by operating a self character C101 by the player of the game. In this case, there is displayed an image from a right front direction of the self character C101. That is, a direction of displaying the self character is the right front direction and as the direction 20 of the character, rotational angles around X, Y, Z axes in correspondence therewith are stored. On the left side of the display screen, there emerge an enemy character 1 (C111) and an enemy character 2 (C113).

Here, a position of a view point is determined by the game progress situation setting processing (step S5) in accordance with a positional relationship between the self character and the enemy character and the direction of the self character. Further, with regard to the respective characters there are formed an image colored in a cel animation tone from the position of the view point and is displayed on the display screen.

A window W105 is displayed with status of the self character C101 and a window W115 is displayed with statuses of the enemy characters C111 and C113. In FIG. 6, there are displayed physical strength (numeral value of physical strength 12 of FIG. 6) and maximum physical strength (numerical value of maximum physical strength 10 of FIG. 6).

The self character attacks the enemy character in accordance with the operation input of the player from the operation input unit 300. Meanwhile, the enemy character attacks the self character in accordance with a predetermined algorism. When the respective character is attacked in a battle, the physical strength of the attacked character is reduced by a value calculated based on attack force of attacking character (numerical value of attack force 14 of FIG. 6) and defence force (numerical value of defence force 16 of FIG. 6) of attacked character.

When the physical strength of the enemy character becomes equal to or smaller than 0, the enemy character is erased from the game screen and the story of the game is progressed. Meanwhile, when the physical strength of the self character becomes equal to or smaller than 0, it is determined at step S8 (FIG. 4) that the game is over and the game is finished. Further, when the respective character rests at a predetermined rest site installed in the game, the physical strength of the respective character reduced by the battle can be recovered to a value of the maximum physical strength of the respective character (maximum physical strength 10 of FIG. 6).

Figure 8:
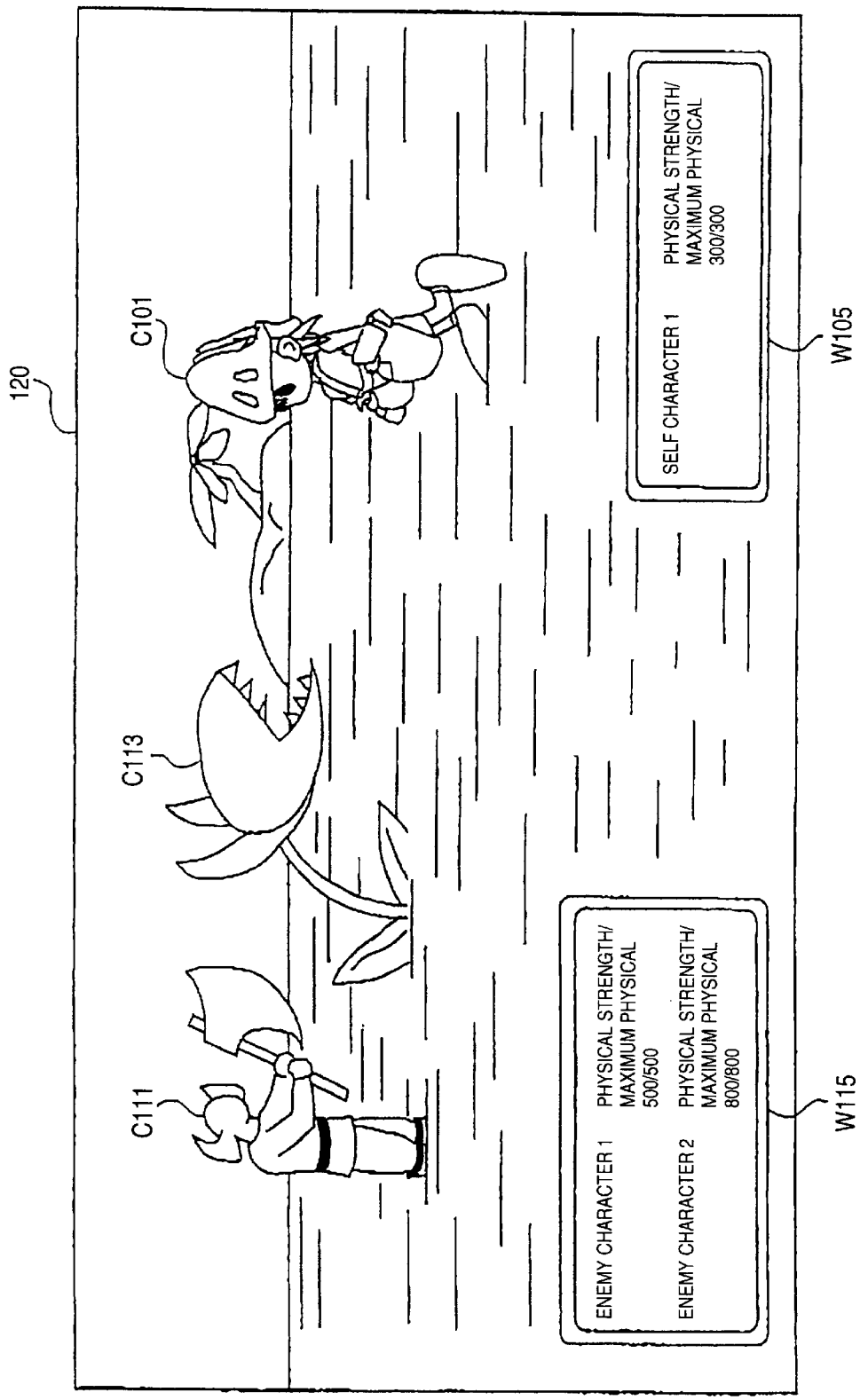
FIG. 8 is a view showing an example of a display screen of a game, showing an example of a display screen displayed after FIG. 7 by an operation input.

FIG. 8 shows the display screen 120 when the player of the game operates the operation input unit 300 to thereby move the self character C101 in the left direction of the display screen from a state of the display screen shown in FIG. 7.

In response to the operation input, action of the character of "moving in the left direction of the display screen" is determined by the game progress processing (step S4 of FIG. 4). In accordance with the action of the character, a direction, a position and a shape of the character is determined by the game progress situation setting processing (step S5 of FIG. 4). According to the example of FIG. 8, the direction of the character is determined in the left direction relative to the display screen and the position of the character is moved similarly in the left direction relative to the display screen. Further, the shape of the character is set with a shape for expressing running motion.

Further, when a reference position of the character (coordinates of reference position 18 of FIG. 6) is set to, for example, the foot of the character and the direction of the character is changed, respective rotational angles passing through the reference position of the character and around axes in parallel with respective axes of X, Y and Z (direction 20 of FIG. 6) are changed. The movement is carried out by changing the coordinates of the reference position of the character (coordinates of reference position 18 of FIG. 6) in a virtual three-dimensional space. Further, deformation to a running shape is carried out by setting data of running motion to motion of the character (motion data of FIG. 6). Actually, the pointer 22 of motion data of FIG. 6 is set with a pointer to data of running motion.

In this way, even when the game progress situation of direction or position of the character is changed, the character is drawn as the image in a cel animation tone.

(Stereo Model Drawing Processing)

Figure 9:
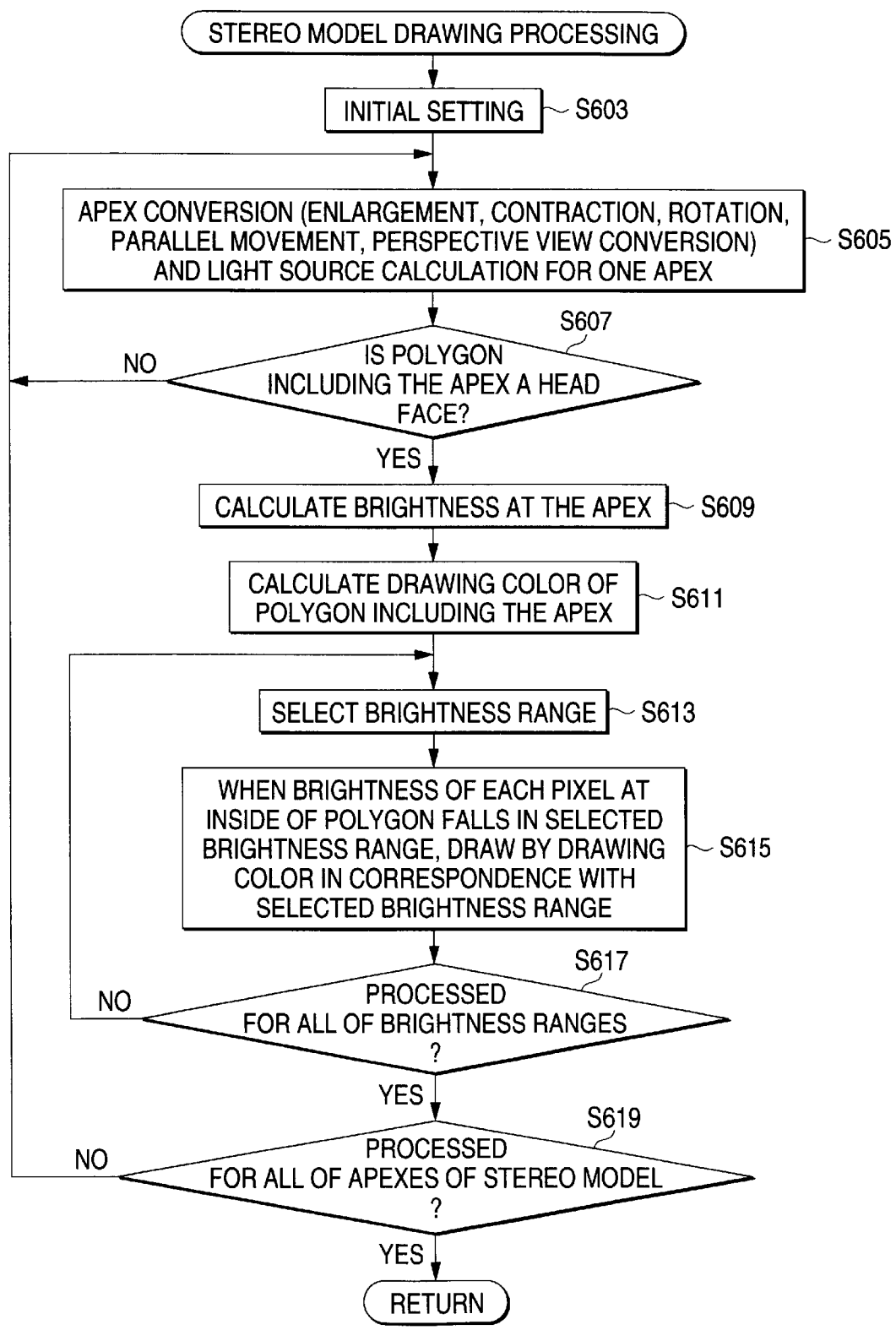
FIG. 9 is a flowchart showing a cel animation tone coloring processing and a stereo model drawing processing according to Embodiments 1 and 2.

FIG. 9 shows a flow of a processing of drawing a stereo model in a cel animation tone coloring processing. First, initial setting is carried out (step S603). In the initial setting, there is acquired a brightness range table in correspondence with the stereo model (for example, FIG. 2 or FIG. 3). Next, there are carried out apex conversion (enlargement, contraction, rotation, parallel movement, perspective view conversion) and light source calculation with respect to one apex (step S605).

The apex conversion is carried out by using the arranging matrix set at step S14 of FIG. 5. Here, the perspective view conversion converts coordinate values of the respective apex of a polygon in the world coordinate system into the screen coordinate system. Further, the light source calculation calculates shadow (brightness) produced by virtual light ray emitted from a light source.

Further, there are two methods in the light source calculation of the stereo model processing in the cel animation tone coloring processing, that is, (A) a method in consideration of material defined in a polygon and (B) a method not in consideration of color for material. In the case of (A), calculation is carried out by the following equation.

as mentioned on Appendix-1          Equation (1)

where "n" of Pn0, Pn1, Pn2, Nnx, Nny, Nnz, Pnr, Png, Pnb, Cnr, Cng, Cnb designate an n-th apex. Notation Nnx designates x component of a normal line at the n-th apex, notation Nny designates y component of the normal line at the n-th apex and notation Nnz designates z component of the normal line at the n-th apex. Notation LightMatrix designates a matrix produced by normalized light source vectors. In the following, there is shown a case of capable of defining up to three parallel light sources thereby. Further, notation LColorMatrix includes, as its components, colors of light ray emitted from light sources and in the following, there is shown a case capable of defining up to three light sources. Notation M signifies color of material of polygon and notations rgb designates its components. An output in the case of (A) is defined by notations Cnr, Cng, Cnb.

as mentioned on Appendix-1    Equation (2), (3)

where notations $L_{0x}$, $L_{0y}$ and $L_{0z}$ designate components of normalized light source vector 0, notations $L_{1x}$, $L_{1y}$ and $L_{1z}$ designate components of normalized light source vector 1, notations $L_{2x}$, $L_{2y}$ and $L_{2z}$ designate components of normalized light source vector 2. Further, components of color of light ray of the light source vector 0 are designated by notations $LC_{0r}$, $LC_{0g}$ and $LC_{0b}$, components of color of light ray of the light source vector 1 are designated by notations $LC_{1r}$, $LC_{1g}$ and $LC_{1b}$ and components of color of light ray of the light ray vector 2 are designated by notations $LC_{2r}$, $LC_{2g}$ and $LC_{2b}$. Further, the respective component of color is provided with a value between 0.0 through 1.0. For example, when only the light source 0 is present and white color is used by an angle of 45 degree relative of X, Y and X axes, the following matrices are constituted.

as mentioned on Appendix-1    Equation (4), (5)

Further, in the case of (B), calculation is carried out by the following equation.

as mentioned on Appendix-1    Equation (6)

Results of the two calculation equations are naturally different from each other and the calculation result of (A) is correct. However, an amount of calculation of (B) is smaller than that in (A) and accordingly, the processing can be accelerated. Further, quality of image is not normally changed.

Next, it is determined whether a polygon (face) including the apex is a head face (step S607). The determination is carried out in the case of a triangular polygon by in which direction a triangular polygon constituted by the apex and two apexes processed therebefore is directed. An explanation will be given of a further detailed head and tail determining method in (2) contour drawing processing. Further, with regard to initial two apexes, processings other than those in steps S605 and S609 are not carried out. Further, although in the stereo model drawing processing, the head and tail determination is carried out at this stage, it is also possible to carry out the head and tail determination prior to the stage.

When the polygon (face) including the apex is a tail face, the operation returns to step S605. When the polygon (face) including the apex is the head face, there is calculated a brightness at the apex where the apex conversion and light source calculation are carried out (step S609). In the calculation of the brightness, the YIQ conversion is carried out.

When the color at the apex is calculated by the method of (A), mentioned above, calculation is carried out by the following equation.

as mentioned on Appendix-1    Equation (7)

When color of apex is calculated by the method of (B), mentioned above, calculation is carried out by the following equation.

as mentioned on Appendix-1    Equation (8)

Further, a matrix inputted with numerical values shows a first row of 3'3 matrix for conversion from RGB to YIQ. By way of precaution, the 3'3 matrix (conversion matrix) is shown below.

as mentioned on Appendix-1    Equation (9)

FIGS. 10A, 10B and 10C show a data structure of a stereo model before subjected to perspective view conversion. Front address of model data of the stereo model is stored in the pointer 24 to the model data of the stereo model shown in FIG. 6. FIG. 10A shows a data structure of the stereo model and there are a total of N pieces of triangular polygons. As shown by FIG. 10B, the respective triangular polygon is provided with color for material (YIQ) and three of apex data indexes (IDX). Although in this case, the color of the material is provided by the YIQ system, the color may be provided by the RGB system. By using the apex data IDX, information with regard to the apex can be provided from the apex data table shown by FIG. 10C.

Figure 11:
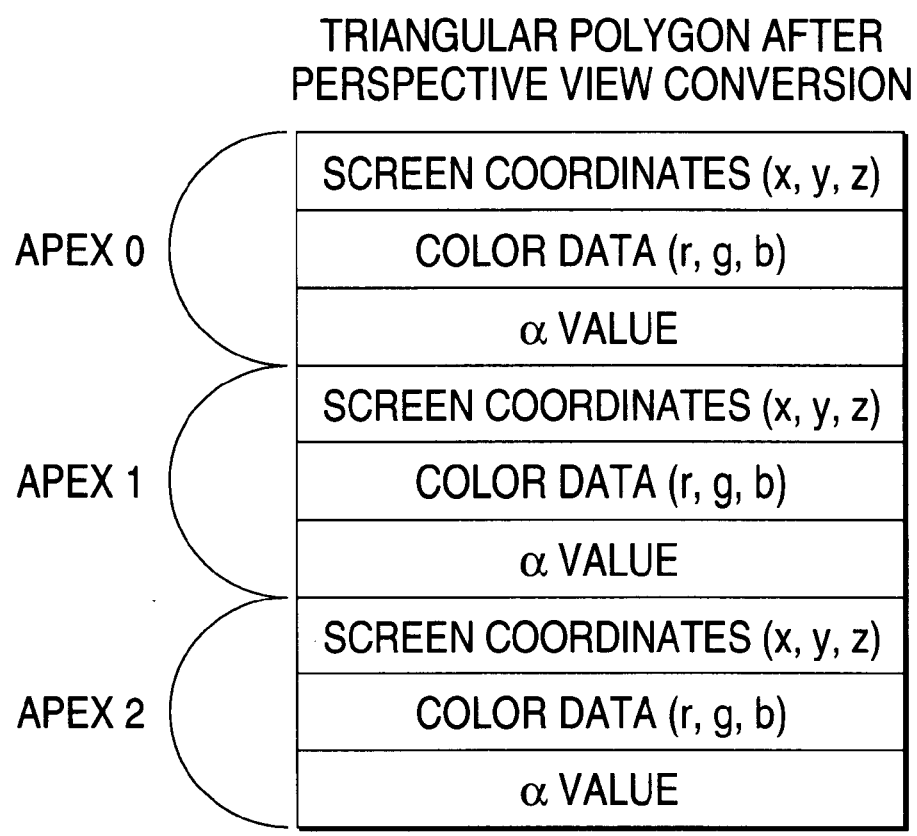
FIG. 11 shows a data structure of a triangular polygon after perspective view conversion in correspondence with FIG. 10B.

The apex data table is stored with three-dimensional coordinates ($P_{nx}$, $P_{ny}$, $P_{nz}$) and normal line vectors (Nnx, Nny, Nnz) ("n" designates apex number). When the perspective view conversion is carried out, the data structure of the triangular polygon is changed. The data structure in correspondence with FIG. 10B is shown by FIG. 11. At respective apex, there are stored coordinate values (x, y, z) in the screen coordinate system, color (r, g, b) at the apex and a value. An area stored with the α value is stored with the brightness calculated at step S609. Further, although a detailed explanation will be given below, when a triangular shape drawing processing unit 205 carries out a processing, three apex common colors (r, g, b) are stored with drawing colors in correspondence with the brightness range. Further, although the brightness falls in a range of 0.0 through 1.0, the α value is an integer from 0 through 255 and accordingly, the α value multiplied by the brightness by 255 is used.

Referring back to FIG. 9, an explanation will be given of the processing flow. After step S609, there is calculated drawing color of polygon including apex subjected to apex conversion and light source calculation (step S611). The drawing color of the polygon is calculated from the reference brightness in correspondence with the respective brightness range stored in the brightness range table and the color of the polygon. For example, when the color of the polygon is held as color of the YIQ system, In YIQ, only IQ is used, and calculation is carried out by the following equation by using the respective reference brightness Tn.

as mentioned on Appendix-1    Equation (10)

When there are three of the reference brightnesses Tn ($T_1$, $T_2$, $T_3$), three of the drawing colors are calculated. Further, when the color of the polygon is not held as color of the YIQ system but held as color of the RGB system, there is carried out a calculation of converting from RGB to YIQ by the conversion matrix, shown above. Further, although results of calculation are different from each other, when it is necessary to calculate the drawing colors at high speed, the following calculation is carried out.

as mentioned on Appendix-1                Equation (11)

Notation M designates color of material of polygon. Although in the above-described two Equations, the calculation results are different from each other and the image quality differs slightly, a second one of the equations can provide a substantially similar image at high speed.

Next, one of the brightness range in the brightness range table is selected (step S613). Further, although in the mode of the animation tone coloring processing, there is used the brightness range table shown in FIG. 2, the brightness range table as shown in FIG. 3 can also be used. FIG. 3 shows an example of the table designated with the brightness range by the upper limit and the lower limit. That is, the reference brightness 0.75 is set to the upper limit 1.00 and the lower limit 0.75 of the brightness range, the reference brightness 0.50 is set to the upper limit 0.74 and the lower limit 0.50 of the brightness range and the reference brightness 0.25 is set to the upper limit 0.49 and the lower limit 0.00 of the brightness range. When such a brightness range table is used, the brightness range including the upper limit and the lower limit can be selected and set at random. However, FIG. 3 shows a case of a computer which is effective down to a second order of decimal. When comparison between the brightness of the respective pixel and the two brightness values of the upper limit and the lower limit cannot be carried out simply in the brightness comparing process explained below, the brightness range is selected, for example, in turn from upper columns of FIG. 3. Further, in this case, the processing is carried out by only the lower limit value.

Thereafter, the brightness at the apex of the polygon is interpolated and the brightness in the respective pixel at inside of the polygon (brightness distribution in polygon) is calculated. Although color of the apex is interpolated, since the three apexes are provided with the same drawing color and accordingly, the result remains the same even after the interpolation. Further, when the brightness at the pixel falls in the selected brightness range, the pixel is drawn by the drawing color in correspondence with the selected brightness range (step S615). The steps S613 and S615 are repeated until the processing is carried out with regard to all of the brightness ranges (step S617).

The processing of comparing the brightness can be carried out also by using the Z buffer. Although the Z buffer is used for hidden face erasure, in the cel animation tone coloring processing, by also using the Z buffer, an effect similar to that in the case of comparing to the upper limit value of the brightness can be achieved.

For example, in the case of the brightness range table as shown in FIG. 2, the threshold value 0.75 is selected. By interpolating the brightness and the coordinates (including Z value) of the respective apex of the polygon, the brightness and coordinates (including Z value) of the respective pixel are calculated. Further, when the color is set to the drawing color in correspondence with the threshold 0.75 for three apexes, the color of the respective pixel becomes the drawing color even after the interpolation.

The pixel processing unit 334 compares the brightness of the pixel with the threshold 0.75 and compares the Z value of the pixel calculated by the interpolation and the Z value of the pixel stored in the Z buffer. When the Z value of the pixel the brightness of which is equal to or larger than the threshold 0.75 and calculated by the interpolation, is smaller than the Z value of the pixel stored in the Z buffer, the pixel processing unit 334 draws the color of the pixel by the drawing color in correspondence with the threshold 0.75.

Figure 12A:
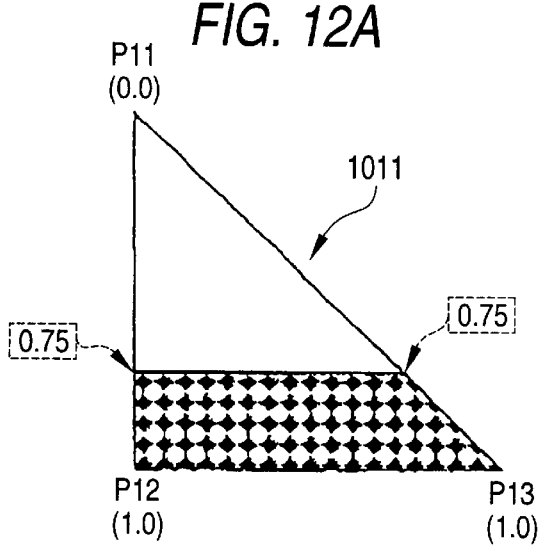
Figure 12B:
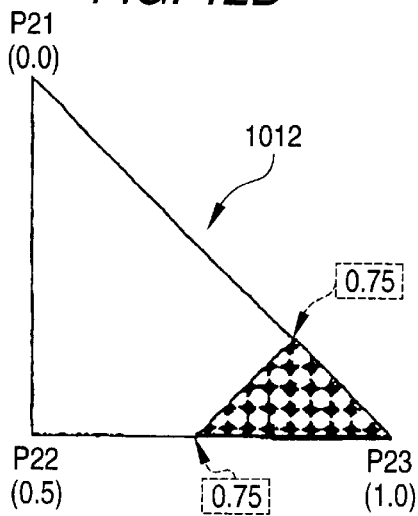

When drawing of the polygon is carried out firstly and brightness is equal to or larger than 0.75, the drawing color is written. FIGS. 12A and 12B show two examples of a triangular polygon 1011 and a triangular polygon 1012. Brightnesses of apexes P11, P12 and P13 of the triangular polygon 1011 are respectively set to 0.0, 1.0 and 1.0. Further, brightnesses of apexes P21, P22 and P23 of the triangular polygon 1012 are respectively set to 0.0, 0.5 and 1.0. When the above-described processing is executed, painted portions in the respective triangular polygons are colored by the drawing color.

Next, the threshold value 0.5 is selected. The pixel processing unit 334 calculates the brightness and the coordinates (including Z value) of the respective pixel at inside of the polygon. The pixel processing unit 334 compares the brightness of the pixel with the threshold 0.5 and compares the Z value of the pixel calculated by calculation with the Z value of the pixel stored in the Z buffer. When the brightness of the pixel is equal to or larger than the threshold 0.5 and the Z value of the pixel calculated by calculation is smaller than the Z value of the pixel stored in the Z buffer, the pixel processing unit 334 draws the color of the pixel by the drawing color in correspondence with the threshold 0.5.

Figure 12C:
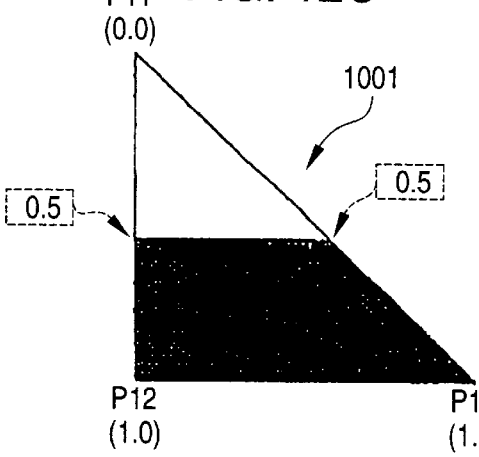
Figure 12D:
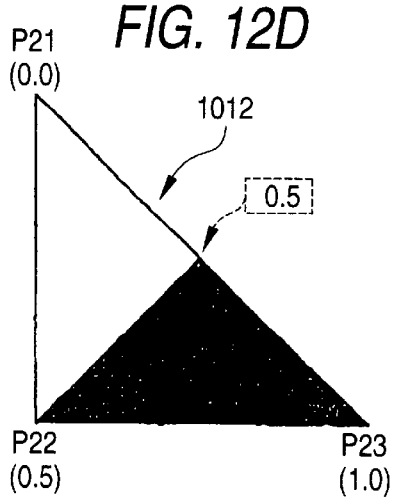
Figure 12E:
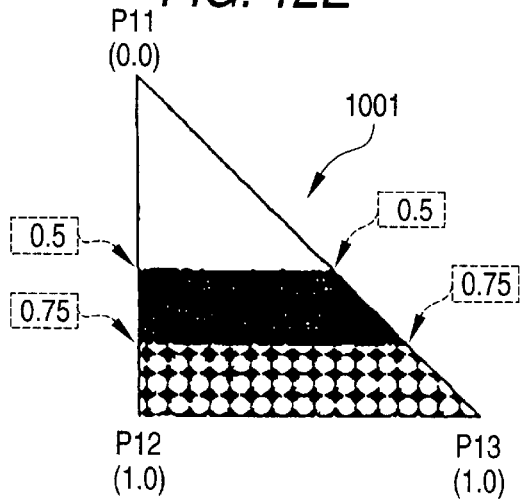
Figure 12F:
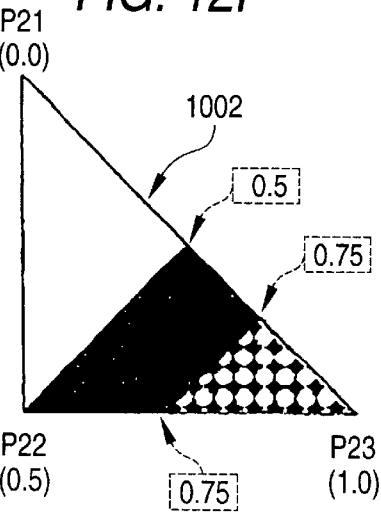

When the Z buffer is not used, as shown by FIGS. 12C and 12D, areas of the brightness 1.0 through 0.5 are colored by the drawing color in correspondence with the threshold 0.5. With regard to areas having the brightness equal to or larger than 0.75, the Z value stored in the Z buffer is the same as the Z value calculated by calculation and accordingly, the areas having the brightness equal to or larger than 0.75 are not drawn by the drawing color in correspondence with the threshold 0.5. That is, as shown by FIGS. 12E and 12F, the areas having the brightness of 0.5 through 0.74 and the areas having the brightness equal to or larger than 0.75 are colored by different drawing colors.

Figure 13A:
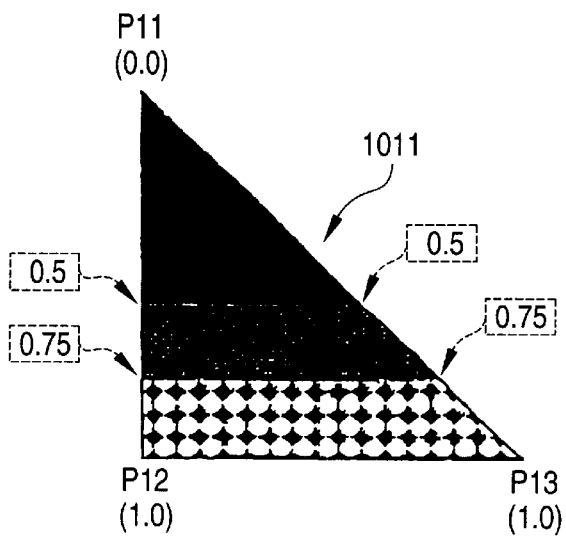
FIG. 13 shows an example of an image when a triangular polygon is drawn by an algorism of a cel animation tone coloring processing.
Figure 13B:
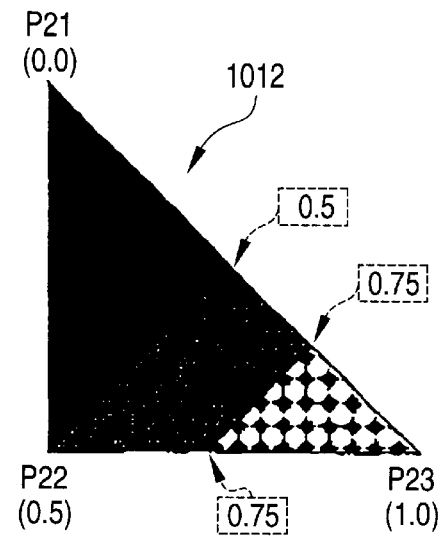

FIGS. 13A and 13B show a result of carrying out the processing similarly with respect to the threshold 0.0 in the example of FIG. 2. Brightnesses of apexes P11, P12 and P13(a) of the triangular polygon in FIG. 13A are respectively set to 0.0, 1.0 and 1.0. Further, brightnesses of apexes P21, P22, P23 of the triangular polygon 1012 in FIG. 13B are respectively set to 0.0, 0.5 and 1.0. Numerals surrounded by dotted lines, that is, 0.5 and 0.75 indicate thresholds of brightnesses. In this way, the respective triangular polygons are divided into three areas and colored with drawing colors.

Figure 14A:
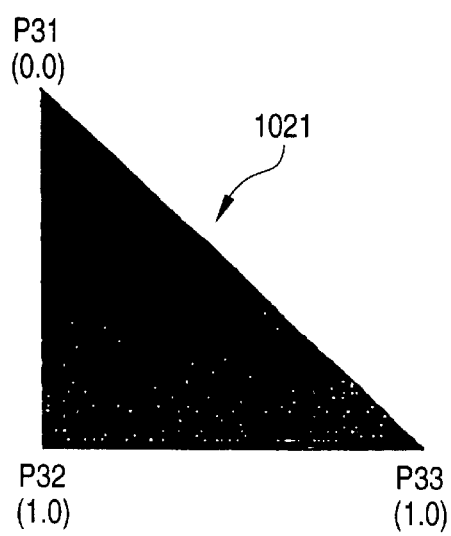
FIG. 14 shows an example of an image when a triangular polygon is drawn by conventional technology.
Figure 14B:
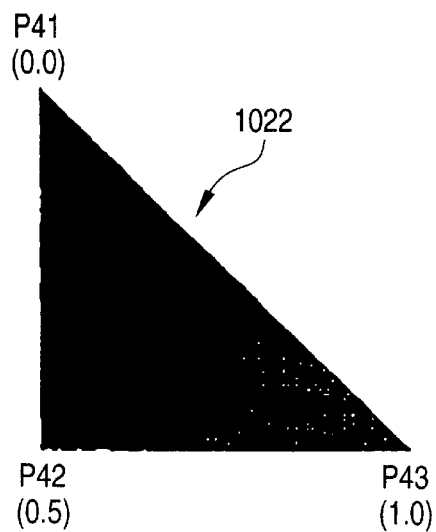

FIGS. 14A and 14B show a result of Coulaw shading. Brightnesses of apexes P31, P32 and P33 of a triangular polygon 1021 in FIG. 14A are respectively set to 0.0, 1.0 and 1.0. Further, brightnesses of apexes P41, P42 and P43 of a triangular polygon 1022 in FIG. 14B are respectively set to 0.0, 0.5 and 1.0. That is, the brightnesses of the respective apexes are the same as those of the triangular polygons 1011 and 1012 shown by FIGS. 13A and 13B. However, although according to the Coulaw shading, the brightness is smoothly changed by interpolation, in FIGS. 13A and 13B, the brightness is changed only at a boundary of partitioned areas. That is, it is known that there are present three of areas where the brightness stays to be flat to thereby constitute the cel animation tone.

Further, there also is the case in which the smallest lower limit value of the brightness range table is not 0.0. In order to eliminate a portion which is not colored at all in the polygon, in repeating step S617 of FIG. 9, step S615 is executed by setting the lower limit value to 0.0 at final repetition.

Steps S605 through S617, mentioned above, are repeated until all of apexes of the stereo model have been processed, as a result, the processings are repeated until all of the polygons have been processed (step S619).

It is preferable to form the above-described brightness range table which is optimum for the respective stereo model. However, it is also preferable to classify the stereo model into a number of categories and prepare brightness range tables for respective categories. It is conceivable to set a number of brightness ranges included in a brightness range table to 2 or 3 in conformity with actual cel animation. However, according to the above-described processing, only a number of times of repetition at step S617 is increased and accordingly, the number can easily be set to a number of 2 or more. However, since the number of times of repetition is increased, when the number is increased, the processing is retarded.

When the above-described processing is executed, all of the polygons of the stereo model expressing a character of a game or the like are painted to classify by brightnesses at predetermined stages and an image colored in the cel animation tone can be provided with respect to the stereo model. In accordance with operation input, the image colored in the cel animation tone is successively formed and accordingly, it is not necessary to prepare previously a hand-written game image and a game smoothly following the operation input can be produced.

(Stereo Model Drawing Processing (Part 2))

Figure 15:
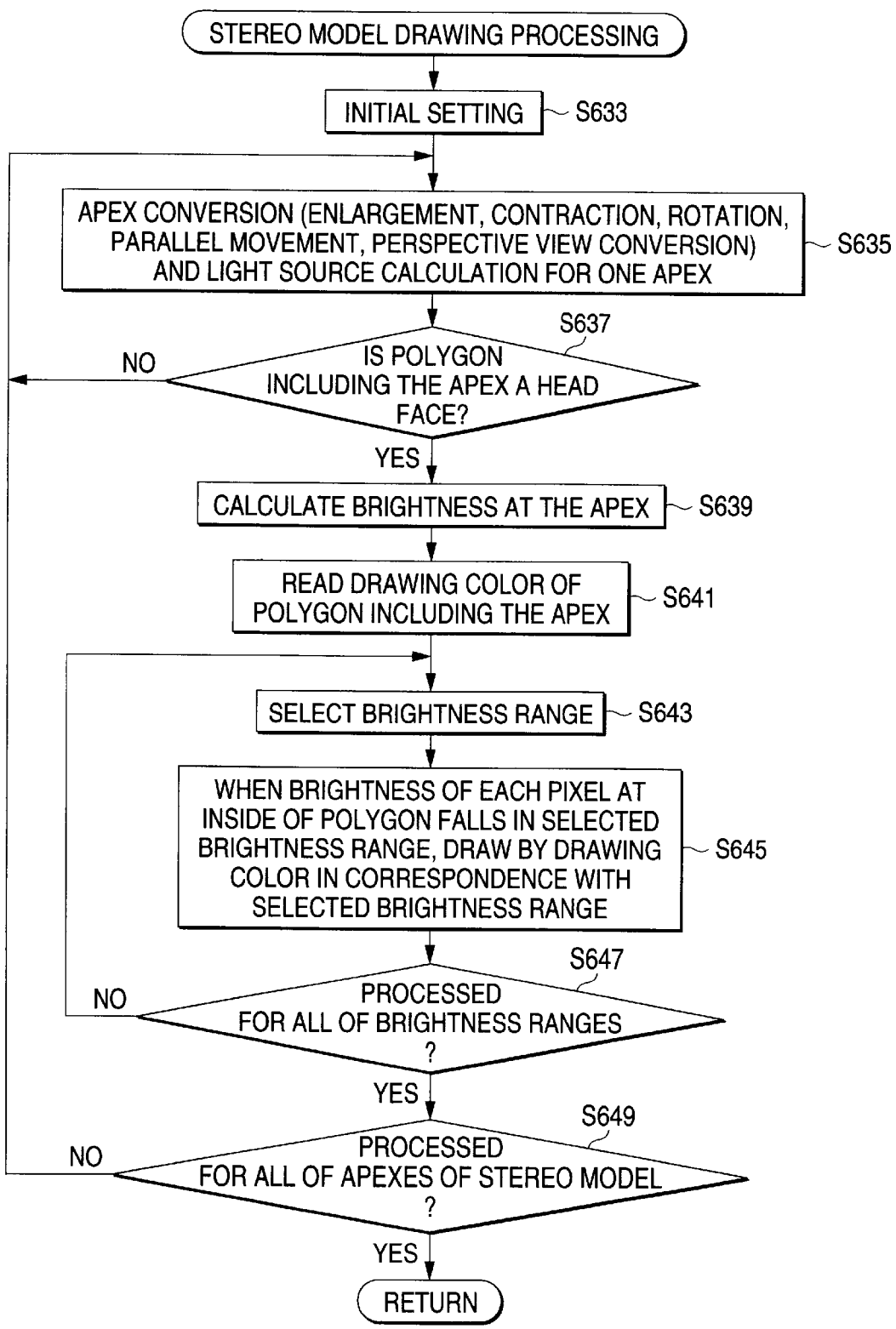
FIG. 15 is a flowchart showing a cel animation tone coloring processing and a stereo model drawing processing (part 2) according to Embodiments 1 and 2.

FIG. 15 shows a flow of a second stereo model drawing processing. A main difference between FIG. 15 and FIG. 9 resides in that step S611 of FIG. 9 is replaced by step S641 of FIG. 15. That is, in FIG. 9, although in FIG. 9, the drawing color is calculated at respective time, according to the stereo model drawing processing (part 2), the drawing color is previously calculated and stored and therefore, it is necessary to carry out a processing of reading drawing color of polygon at step S641. Further, step S641 may be carried out before steps S635 and S639 or may be carried out after step S643 so far as step S641 is carried out in parallel with these steps. The drawing color is previously calculated and stored and accordingly, the drawing color may be read until the drawing color is actually used.

For example, when the brightness range table as shown by FIG. 2 is used, three drawing color data are previously stored for respective polygon. As shown by FIG. 16, with regard to respective polygon, there are stored drawing colors (r, g, b) in correspondence with a first brightness range, drawing colors in correspondence with a second brightness range (r, g, b) and drawing colors in correspondence with a third brightness range (r, g, b), apex data IDX of apex 0 constituting the polygon, apex data IDX of apex 1 thereof and apex data IDX of apex 2 in place of FIG. 10B, described above. These data are prepared by a number of polygons of a stereo model.

In FIG. 15, first, initial setting is carried out (step S633). In the initial setting, there is acquired a brightness range table (for example, FIG. 2 or FIG. 3) in correspondence with a stereo model. Further, data of the stereo model is acquired. Next, there is carried out apex conversion (enlargement, contraction, rotation, parallel movement, perspective view conversion) and light source calculation with respect to one apex (step S635). Enlargement, contraction, rotation, parallel movement and perspective view conversion are carried out by using the arranging matrix set at step S14 of FIG. 5.

Further, the two methods of light source calculation described in the first stereo model drawing processing are adaptable as they are even in the stereo model drawing processing (part 2).

Next, it is determined whether a polygon (face) including the apex is a head face (step S637). The determination is carried out in the case of a triangular polygon by to which direction the triangular polygon constituted by two apexes processed before the apex is directed. A detailed description will be given of a method of head and tail determination in (2) contour drawing processing. Further, with respect to the initial two apexes, processings other than those at steps S635 and S639 are not carried out. Further, according to the stereo model drawing processing (part 2), the head and tail determination is carried out at the stage, however, the head and tail determination can be carried out prior to the stage.

When the polygon (face) including the apex is a tail face, the operation returns to step S635. When the polygon (face) including the apex is a head face, there is calculated a brightness at the apex subjected to the apex conversion and the light source calculation (step S639). In calculation of the brightness, the YIQ conversion is carried out.

Further, drawing color of the polygon including the apex subjected to the apex conversion and the light source calculation is read (step S641). Data of the read drawing color is previously calculated and a calculation method in previously calculating the data may be either of the two methods explained in the first stereo model drawing processing or may be other method. Further, the drawing colors may be defined one by one. According to the stereo model drawing processing (part 2), the drawing color is previously prepared and therefore, the execution speed is accelerated, however, drawing color cannot simply be changed to color other than the prepared drawing colors. In contrast thereto, when the drawing color is calculated in execution by using the reference brightness defined in the brightness range table as in the first stereo model drawing processing, the drawing color can pertinently be changed by only changing the brightness range table or the reference brightness.

Next, one of brightness ranges of the brightness range table is selected (step S643). Further, although according to the embodiment, the brightness range table shown in FIG. 2 is used, the brightness range table as shown by FIG. 3 can also be used. When such a brightness range table is used, the brightness range including the upper limit and the lower limit can be selected and set at random. When the comparison between the brightness of the respective pixel and the two brightness values of the upper limit and the lower limit cannot simply be carried out in the brightness comparing processing explained below, the brightness ranges are selected, for example, in turn from upper columns of FIG. 3. Further, in this case, the processing is carried out only by the lower limit value.

Thereafter, the brightness of the apex of the polygon is interpolated and the brightness at the respective pixel at inside of the polygon (brightness distribution in polygon) is calculated. Although color of the apex is interpolated, all of the three apexes are provided with the same drawing color and therefore, the result remains the same even after the interpolation. Further, when the brightness at the pixel falls in the selected brightness range, the pixel is drawn by the drawing color in correspondence with the selected brightness range (step S645). The steps S643 and S645 are repeated until the processing is carried out with respect to all of the brightness ranges (step S647).

The processing of comparing the brightness can be carried out by also using the Z buffer. Although the Z buffer is used in hidden face erasure, in the cel animation coloring processing, an effect similar to that in the case of comparing with the upper limit value of the brightness is achieved by also using the Z buffer.

Further, there is a case in which the value of the smallest lower limit value of the brightness range table is not 0.0. In order to eliminate a portion which is not colored at all in the polygon, in repeating S647 of FIG. 15, step S645 is carried out by setting the lower limit value to 0.0 at final repetition.

As described above, step S635 through S647 are repeated until the processing has been carried out with respect to all of the apexes of the stereo model and as a result, the steps are repeated until the processing has been carried out with respect to all of the polygons (step S649).

When the above-described processing is carried out, all of polygons of the stereo model for expressing a character of a game or the like are painted to classify by brightnesses at predetermined stages and with regard to the stereo model, there can be provided an image colored in the cel animation tone. Particularly, the stereo model drawing processing (part 2) is further accelerated than the first stereo model drawing processing. The image colored in the cel animation tone is successively formed in accordance with the operation input and therefore, it is not necessary to previously prepare a hand-written game image and a game smoothly following the operation input can be produced.

(2) Contour Drawing Processing

According to the contour drawing processing, a contour line is attached to a stereo model for expressing a character of a game or the like.

An explanation will be given of an outline of the contour drawing processing in reference to a functional block diagram of FIG. 17. A game apparatus according to the contour drawing processing includes an operation input unit 410, a game progressing unit 430 including a character action determining unit 435, a game progress situation setting unit 440 including a character direction setting unit 443 and a view axis direction setting unit 447, an arranging matrix setting unit 360, a stereo model processing unit 400, a contour drawing model acquiring unit 350, a contour drawing model processing unit 370 for receiving the arranging matrix from the arranging matrix setting unit 360, a blurred expression texture mapping unit 380, a pixel processing unit 390 receiving data from the blurred expression texture mapping unit 380 and the stereo model processing unit 400 and including a hidden face erasure processing unit 395 and an image display control unit 420.

The operation input unit 410 outputs operation information of button or lever of the operation input unit 410 operated by a player of a game to the game progressing unit 430.

The game progressing unit 430 determines content of progressing the game such as action of a character, a change in a view point position, a change in a direction of a view axis, or movement of a position of a light source, a change in a direction of light ray based on information from the operation input unit 410 and provides instruction to the game progress situation setting unit 440. The character action determining unit 435 in the game progressing unit 430 is provided with particularly a function of determining the action of the character based on information from the operation input unit 410.

The game progress situation setting unit 440 calculates and sets a position, a direction and a shape of the character, the position of the view point, the direction of the view axis, the position of the light source, the direction of the light ray, further, an increase or a decrease of physical strength in accordance with action of the character in accordance with the content of progressing the game instructed to the game progressing unit 430. The character direction setting unit 443 in the game progress situation setting unit 440 is provided with a function of particularly determining a direction with respect to the view point of the character in accordance with the content of progressing the game instructed to the game progressing unit 430. Meanwhile, the view axis direction setting unit 447 in the game progress situation setting unit 440 is provided with a function of particularly setting the direction of the view axis in accordance with the content of progressing the game instructed to the game progressing unit 430.

The arranging matrix setting unit 360 carried out a processing of determining the arranging matrix of the stereo model expressing the character in accordance with the position coordinates and the direction of the character set by the game progress situation setting unit 440 and the position of the view point. The arranging matrix is a matrix for carrying out parallel movement, rotation and perspective view conversion of the stereo model.

Although a detailed description will be given later, when a contour drawing model relatively larger than the stereo model is acquired and a reference position of the contour drawing model is disposed at a position in correspondence with the reference position of the stereo model, the arranging matrix determined by the arranging matrix setting unit 360, can be used commonly by the stereo model processing unit 400 and the contour drawing model processing unit 370. When the arranging matrix can commonly be used, one storing area for the arranging matrix can be prepared for respective character and accordingly, the common use is efficient.

However, there also is a case in which the arranging matrix is not commonly used or cannot be used commonly. In that case, an arranging matrix for the stereo model and an arranging matrix for the contour drawing model are formed and stored in respective storing areas. Further, when the arranging matrix cannot be used commonly as mentioned later, there also is the case in which one storing area of the arranging matrix is prepared, immediately before using the arranging matrix at the stereo model processing unit 400 and the contour drawing model processing unit 370, the arranging matrix of the stereo model is set to include contraction conversion and the arranging matrix of the contour drawing model is set to include enlargement conversion.

The contour drawing model acquiring unit 350 forms a contour drawing model in correspondence with, for example, a stereo model constituted by triangular polygons. Further, when the contour drawing model is previously formed, the contour drawing model acquiring unit 350 reads a contour drawing model constituted by the triangular polygons previously formed. Further, the respective polygon of the acquired contour drawing model is provided with head and tail reverse to that of a corresponding polygon of the stereo model. Further, the contour drawing model becomes larger than the stereo model. Further, color in drawing the contour drawing model is previously set. Further, although the contour drawing model is obliged to finally become large relative to the corresponding stereo model, there is a case in which the size of the contour drawing model at this stage is the same as that of the stereo model. When the contour drawing model having the size the same as that of the stereo model is acquired by the contour drawing model acquiring unit 350, a processing of enlarging the contour drawing model is carried out immediately before drawing the contour drawing model. Further, in this case, the stereo model and the contour drawing model cannot share the arranging matrix.

Color of the contour drawing model acquired by the contour drawing model acquiring unit 350 may be color the same as that of the corresponding stereo model. In this case, before drawing the acquired contour drawing model, the color of the contour drawing model is changed to other color.

Figure 18:
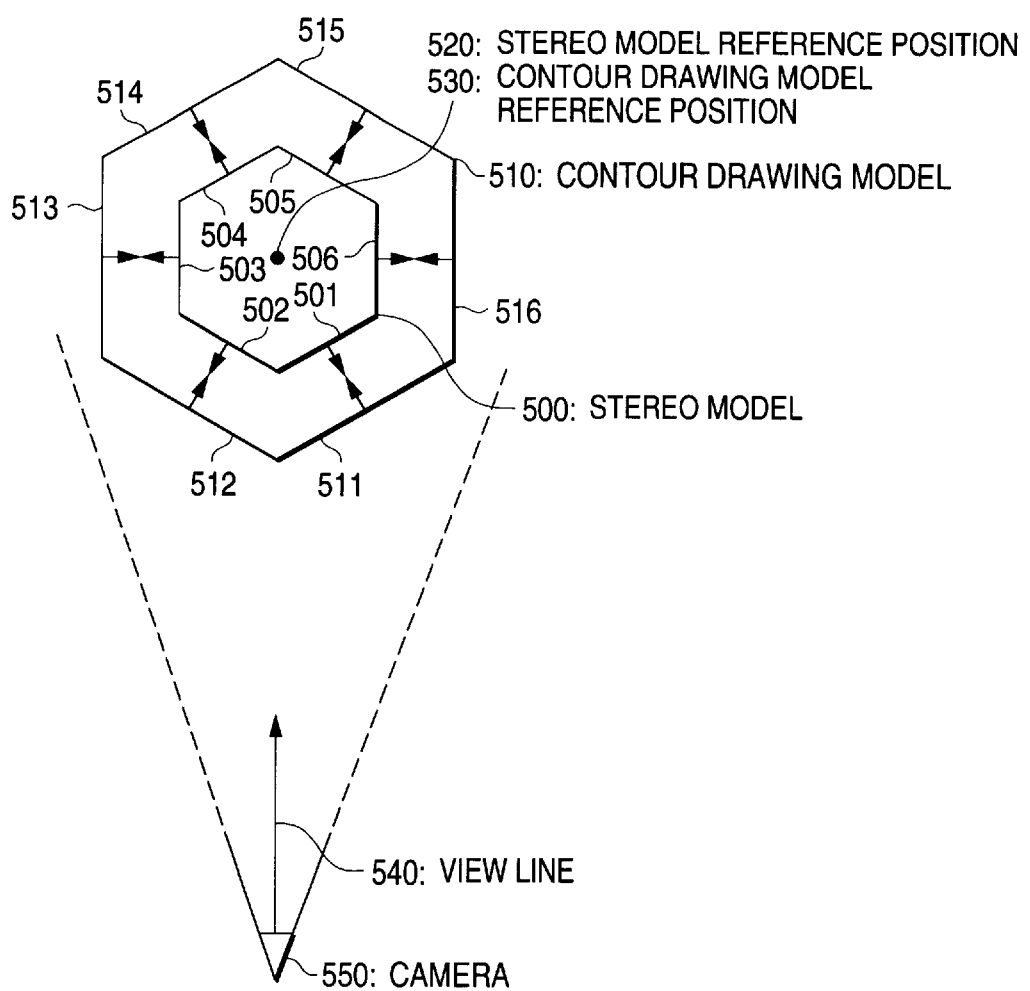
FIG. 18 is a schematic view for explaining a positional relationship among a camera, a stereo model and a contour drawing model in the first contour drawing processing in which directions in which surfaces of the stereo model and the contour drawing model are directed are shown by arrow marks.

The reference position of the contour drawing model is normally defined to dispose at the reference position of the corresponding stereo model or at a vicinity thereof. When the reference position of the stereo model and the reference position of the contour drawing model are significantly different from each other, the arranging matrix cannot be commonly used. For example, FIG. 18 shows a case in which the size of a contour drawing model 510 is larger than the size of a stereo model 500. In FIG. 18, arrow mark directions of respective faces indicate head faces. According to the stereo model 500, outer sides of respective faces in a hexagonal shape constitute head faces and according to the contour drawing model 510 and inner sides of respective faces in the hexagonal shape constitute head faces.

A stereo model reference position 520 constituting the reference position of the stereo model 500 and a contour drawing model reference position 530 constituting the reference position of the contour drawing model 510 are both defined at centers of the respective models. Further, the contour drawing model 110 is defined to be larger than the stereo model 500 centering on the contour drawing model reference position 530.

The contour drawing model processing unit 370 carries out coordinates conversion of respective apexes of the contour drawing model by using the arranging matrix set by the matrix setting unit 360 for arranging the contour drawing model. Further, the contour drawing model processing unit 370 determines whether the respective faces of the contour drawing model (for example, respective polygons) direct surfaces or direct rear faces to a view point set in a virtual space. Further, the contour drawing model processing unit 370 does not carry out calculation of brightness of light reflected at the faces of the contour drawing model. When a contour drawing model having a size the same as that of the stereo model is acquired at the contour drawing model acquiring unit 350, the contour drawing model processing unit 370 executes apex conversion for enlarging the size of the contour drawing model. In this case, also in the enlarged case, the relationship between the stereo model and the contour drawing model is as shown by FIG. 18. The designated state shows a state of the contour drawing model in a virtual three-dimensional space. The state of the contour drawing model is defined by information in correspondence with the contour drawing model. Information of the state is information indicating a position, a direction, a size and the like in the virtual space.

Further, the head and tail determination of a face is carried out for determining a polygon directing a surface thereof to a camera 550. Only a polygon directing the surface to the camera 550 constitutes a display object. In the example of FIG. 18, faces 511 and 512 of the contour drawing model 510 proximate to the camera 550 are out of the drawing object. In this way, a face thereof disposed on an outer side of the stereo model 500 and proximate to the camera 550 is out of the drawing object and accordingly, the stereo model 500 can normally be drawn. Meanwhile, only faces 513, 514, 515 and 516 of the contour drawing model 510 rearward from the stereo model 500 constitute the drawing object. Further, when a direction from the stereo model 500 to the camera 550 is made positive, it is known that a face of the contour drawing model 510 constituting the drawing object is a face an outer side (not in direction of surface) is directed in a negative direction. However, since hidden face erasure is carried out at the hidden face erasure processing unit 395 of the pixel processing unit 390, even when a face constitutes the drawing object, all of the face is not necessarily drawn.

The blurred expression texture mapping unit 380 executes a processing of mapping blurred expression texture to the contour drawing model such that a contour line drawn as a result becomes a blurred line. The blurred expression texture is a texture having a pattern including a change in brightness or transparency and an example thereof will be shown later. Further, it is not necessary needed that the contour line is blurred and accordingly, the processing of the blurred expression texture mapping unit 380 is selectively executed.

The stereo model processing unit 400 carries out a processing of the stereo model. That is, the stereo model processing unit 400 carries out apex conversion (enlargement, contraction, rotation, parallel movement, perspective view conversion) with regard to the respective apexes of the stereo model. Further, the stereo model processing unit 400 calculates brightness of light reflected by the surface of the stereo model. Further, the stereo model processing unit 400 carries out head and tail determination of respective faces of the stereo model (for example, respective polygons). Further, when the sizes of the stereo model and the contour drawing model are the same, there may be carried out also a processing of contracting the size of the stereo model by the stereo model processing unit 400. By contracting the size of the stereo model, relatively, the size of the contour drawing model becomes larger than the size of the stereo model.

Also in the case of carrying out the contraction processing by the stereo model processing unit 400, the relationship between the stereo model 500 and the contour drawing model 510 is as shown by FIG. 8. Further, the head and tail determination of a face is the same as that in the contour drawing model processing unit 370 and among faces of the stereo model, a face in which a direction thereof the same as a view line direction of the camera constitutes a direction of a head face thereof, is excluded from the drawing object. According to the example of FIG. 18, faces 503, 504, 505 and 506 on a rear side in view from the camera are excluded from the drawing object.

The pixel processing unit 390 carries out a processing of drawing the respective pixel. For example, the pixel processing unit 390 calculates color of respective pixel in a face from color of an apex of the face by interpolation and determines and draws color of the respective pixel while executing a hidden face erasure processing using the Z buffer by the hidden face erasure processing unit 395. The pixel processing unit 390 carries out the processing with respect to faces constituting the drawing object in the contour drawing model processing unit 370 and the stereo model processing unit 400.

For example, in the case of FIG. 18, two faces 501 and 502 of the stereo model 500 most proximate to the camera 550 are drawn and the four faces 513, 514 and 515 and 516 of the contour drawing model remote from the camera 550 are drawn. The four faces of the contour drawing model 510 are extruded to the left and to the right from the stereo model 500 in view from the camera 550 and accordingly, only extruded portions thereof are drawn without being subjected to hidden face erasure. The excluded portions constitute the contour line. Further, the pixel processing unit 390 determines color in consideration of color of material of the contour drawing model. Further, there also is a case in which the color of the contour line (color for black or dark contour line) is made to constitute color of the contour drawing model by totally disregarding the color of the material.

Finally, the image display control unit 420 designates a drawing area written with data for displaying on the display screen. The drawing area is normally classified in two, one is used for display and other is used for writing. Further, when writing to the writing area has been finished, the writing area is used to switch to the display area and the display area is used to switch to the writing area. The image display control unit 420 controls the switching operation.

(Premise)

Figure 19:
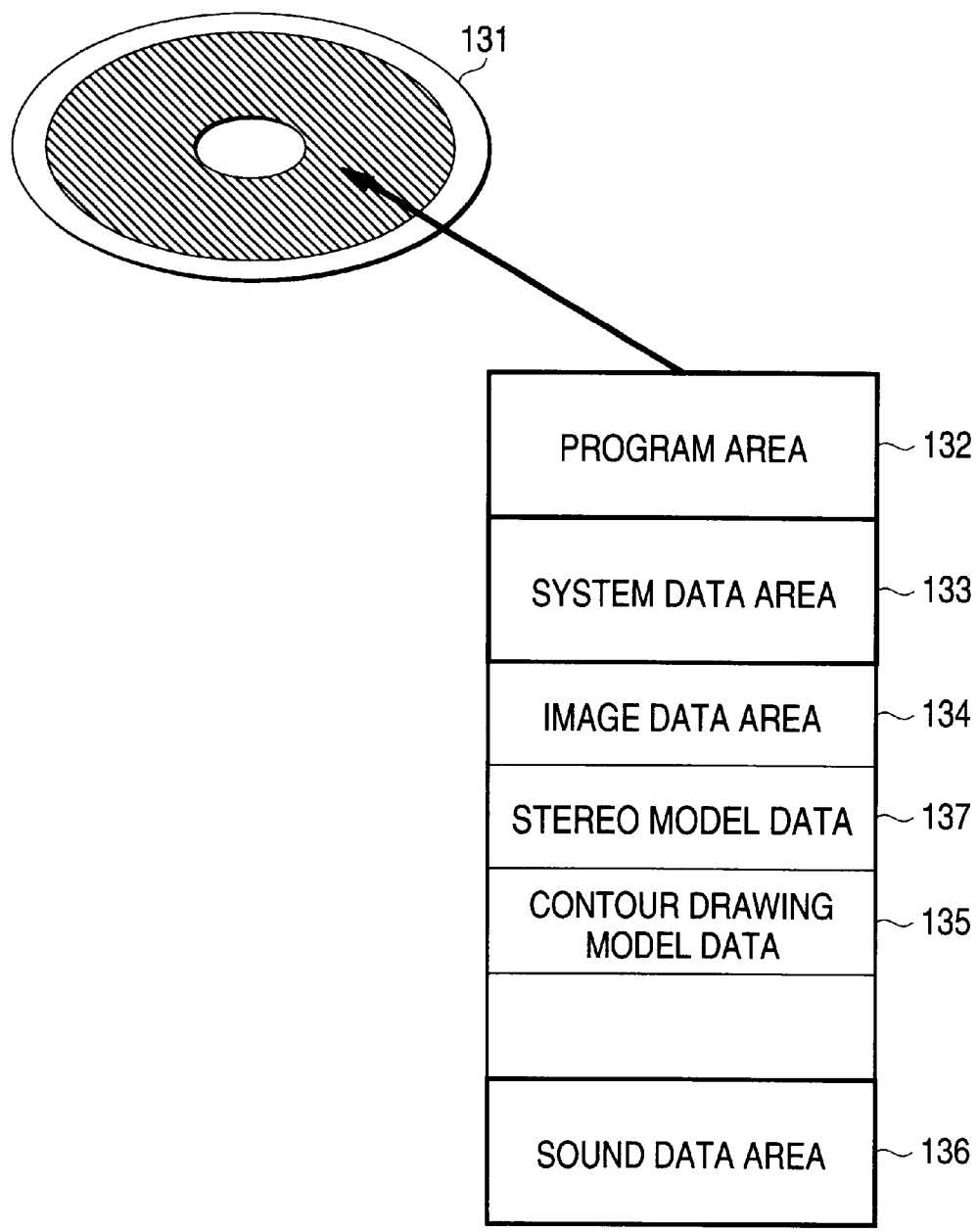
FIG. 19 is a schematic view showing an example of data stored in CD-ROM 131.

FIG. 19 schematically shows an example of data written to CD-ROM 131. According to the contour drawing processing, there is a case in which data of the contour drawing model is previously formed and stored to CD-ROM 131 and the data is read from CD-ROM 131 in executing a game.

A program area 132 is stored with a program for executing the invention in a computer. A detailed description will be given later of content of the program.

A system data area 133 is stored with various data processed by the program stored in the program area 132, mentioned above. The image data area 134 is stored with data including stereo model data 137 and contour drawing model data 135. However, when the contour drawing model is formed in the contour drawing model acquiring processing, mentioned later, there is no need of storing the contour drawing model data 135. Further, data of texture for expressing blur or the like is also stored to the image data area 134.

The contour drawing model data 135 is previously formed from the stereo model data 137 and is provided with the following characteristic.

That is, the size of the contour drawing model is defined to be larger than the stereo model. For example, according to the contour drawing model, apexes thereof are moved in normal line directions of respective apexes of a corresponding stereo model by a length of 2 percent of a total length of the stereo model and is defined to enlarge by about 2 percent as a whole. When the enlargement rate is larger, the contour line is drawn further boldly and when the enlargement rate is smaller and the contour drawing model is enlarged only slightly, the contour line is drawn further finely. Further, when the contour drawing model is defined to enlarge not uniformly but partially, only the contour line of the enlarged portion is boldly drawn. Adjustment of the size is normally carried out by a producer of the stereo model and accordingly, a contour line reflected with the intention of the producer can be drawn.

Further, color for material of the respective polygon of the contour drawing model is set to color chroma of which is the same as that of the stereo model and brightness of which is reduced. Further, there also is the case in which all of respective polygons are set to single color of black or the like. Further, there also is the case in which there is carried out setting for mapping blurred expression texture. The color for material is adjusted by a producer and accordingly, the contour line can be drawn by color intended by the producer.

Further, head and tail of the respective polygon of the contour drawing model are reverted. Specifically, one location of an order defining apexes of the respective triangle constituting the contour drawing model is switched.

Further, the size of the contour drawing model may be defined to be a size the same as the size of the corresponding stereo model. In this case, after acquiring the contour drawing model by the contour drawing model acquiring processing, mentioned later, the contour drawing model is enlarged during a time period until setting the arranging matrix of the contour arranging model by the contour drawing model arranging processing, mentioned later. Or, in setting the arranging matrix of the contour drawing model by the contour drawing model arranging processing, the arranging matrix may be determined such that the arranging matrix includes enlargement conversion. Conversely, when the stereo model is arranged, the arranging matrix of the stereo model may be determined such that the arranging matrix of the stereo model includes contraction conversion.

Further, color of material of the respective polygon of the contour drawing model may be the same as color of material of the respective polygon of the corresponding stereo model. In this case, in a processing of drawing the contour drawing model, mentioned later, for example, the contour drawing model is drawn by color defined separately such as black or the like.

A sound data area 136 is stored with data for outputting sound. Further, the sound processing is not directly related to the invention and accordingly, it is not necessary to store data to the sound data area.

Next, an explanation will be given of a processing flow of the contour drawing processing.

(Total Processing Flow)

The processing flow at a level shown by FIG. 4 remains the same also in the contour drawing processing. When the game is started, initial setting is carried out (step S2). The processing of the initial setting includes the processing of acquiring data of a stereo model expressing a character to be drawn. Further, the contour drawing processing also includes a processing of acquiring data of a contour drawing model. Next, operation of button, lever or the like of the operation input unit 410 is carried out by a player of the game (step S3). Further, there is carried out the game progress processing for determining content of progressing the game such as, for example, action of the character in which the character moves to the left or the character attacks, a change in a view point position, a change in a direction of a view axis, or movement of a light source position, a change in a direction of light ray or the like based on information of the operation input at step S3 (step S4).

Thereafter, there is carried out the game progress situation setting processing for setting a game progress situation such as a position, a direction and a shape of the character, the position of the view point or the direction of the view axis, the position of the light source or the direction of light ray, further, an increase or a decrease in physical strength in accordance with action of the character and the like in accordance with the content of progressing the game determined at step S4 (step S5). Next, there is carried out the game image drawing processing for drawing an image of the game in accordance with the game progress situation (step S6). A detailed description will later be given of the game image drawing processing.

Further, there is carried out the game image display processing for displaying the game image shown by the game image drawing processing at step S6 (step S7).

Next, it is determined whether the game is over (step S8). In the game progress situation setting processing (step S5) carried out in accordance with the operation input at the step S3, when physical strength of a self character operated by the player of the game is reduced and set to 0, the condition of game over is satisfied. At step S8, the physical strength of the self character operated by the player of the game is inspected and it is determined whether the game is over.

When the physical strength of the self character is not 0, the operation returns to step S3 and awaits for successive operation input. Meanwhile, when the game is over, the game is finished. Further, even after the game is over, at step S7, the result is displayed on a display screen and accordingly, the player can grasp a final situation from the display screen.

Figure 20:
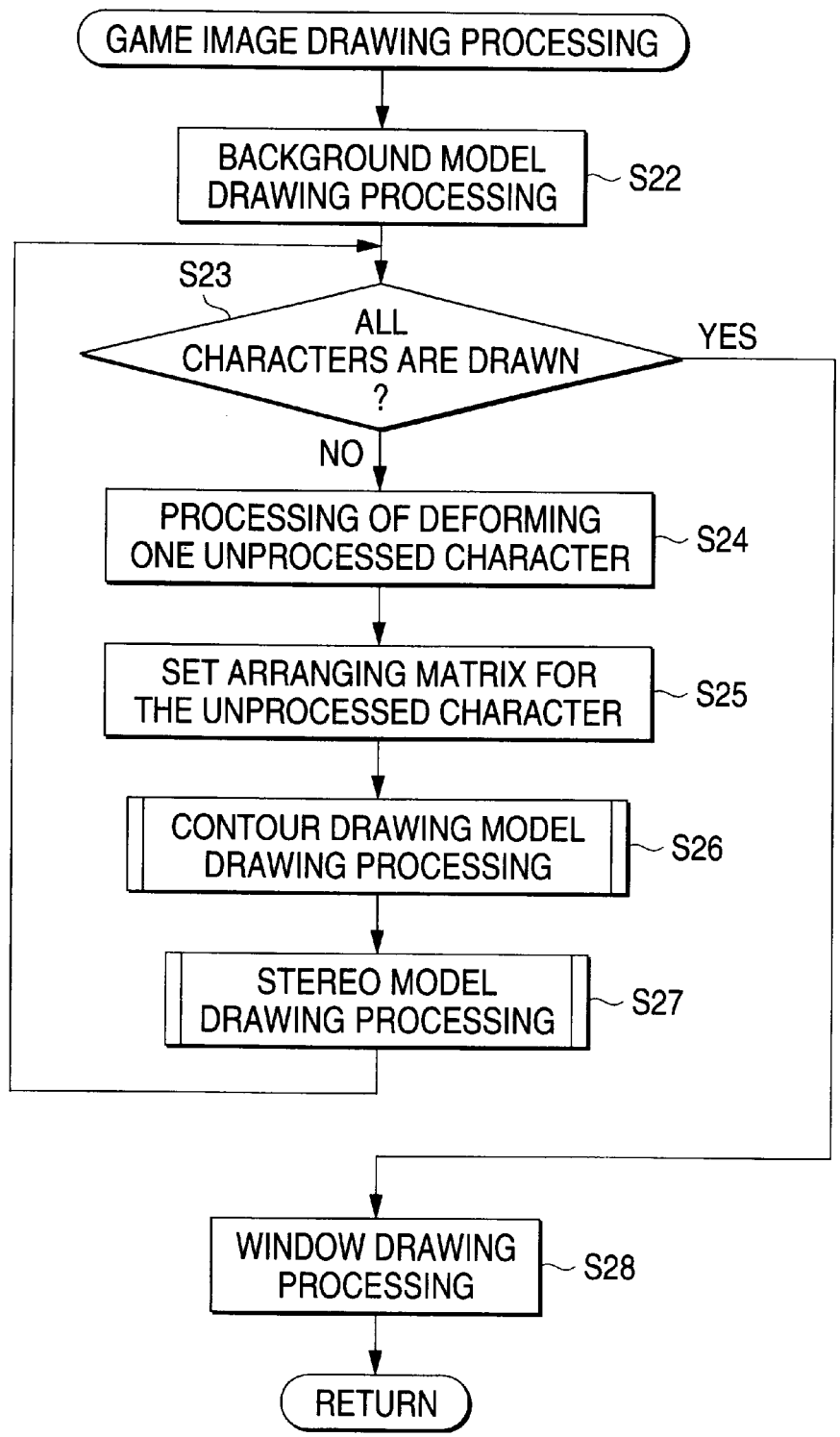
FIG. 20 is a flowchart showing the first and a second contour drawing processing and a game image drawing processing of Embodiments 1 and 2.

FIG. 20 shows a processing flow expressing an outline of the game image drawing processing at step S6 (FIG. 4). First, there is carried out a background model drawing processing for drawing a background model for expressing a background portion in the game image (step S22). The drawing processing is the same as the conventional drawing processing and therefore, a detailed description will not be given thereof here. Further, there are repeated steps S24 through S27 shown below until all characters are drawn (step S23).

A first one of the repeated steps is a step of executing a deforming processing for deforming an unprocessed character (step S24). Motion of the unprocessed character is determined by the game progress processing at step S4 in accordance with the operation input executed at step S3 of FIG. 4. Further, there is executed a processing of deforming a stereo model for expressing the unprocessed character set by the game progress situation setting processing at step S5 executed in accordance therewith. Further, according to the contour drawing processing, a processing for deforming a contour drawing model is also executed in accordance with the processing of deforming the stereo model.

A second one of the repeated steps is a step of setting an arranging matrix for the unprocessed character (step S25). The arranging matrix is a matrix for parallel movement, rotation and perspective view conversion of the stereo model for expressing the unprocessed character and is formed based on position coordinates and a direction of the character and a position of a view point set by the game progress situation setting processing at step S5. As described above, when the contour drawing model is already defined to be large relative to the stereo model and the reference position of the contour drawing model is the same as the reference position of the stereo model, the arranging matrix of the stereo model can also be used for the contour drawing model. When the condition is not satisfied, arranging matrices may be set to respectives of the stereo model and the contour drawing model. Further, there also is a case in which in the contour drawing model drawing processing, described later, an arranging matrix including enlargement conversion is set for the contour drawing model. Further, there also is a case in which in the stereo model drawing processing, an arranging matrix including contraction conversion is set for the stereo model.

Further, a third one of the repeated steps is a step of executing the contour drawing model drawing processing for drawing the contour drawing model (step S26). A detailed description will be given later of the contour drawing model drawing processing.

A fourth one of the repeated steps is a step of executing the stereo model drawing processing for drawing the stereo model for expressing the unprocessed character (step S27). A detailed description will be later of the stereo model drawing processing.

After all the characters have been drawn, there is executed a window drawing processing for drawing a window for expressing a capability of a character or the like to a user (step S28). The window drawing processing is the same as the conventional drawing processing and accordingly, a detailed description will not be given here. Further, when the drawing processing is carried out successively for the respective characters in this way, one arranging matrix (two when arranging matrix cannot be used commonly) may be prepared to all the characters and therefore, the operation is efficient.

Next, although an explanation will be given of a simple example with regard to progress of a game story in accordance with the operation input of the player of the game (FIG. 7 and FIG. 8), prior thereto, an explanation will be given of data of characters used in the contour drawing processing in reference to FIG. 21. The character data includes a numerical value of maximum physical strength 10 (for example, 300), a numerical value of current physical strength 12 (for example, 300), a numerical value of attack force 14 (for example, 123), a numerical value of defence force 16 (for example, 51), coordinates (x, y, z) of reference position 18 (for example, (15.0, 0.0, 3.2)), rotational angles around X, Y, Z axes constituting direction of character 20 (for example, (0, −90, 0)), pointer 22 to motion data, pointer 24 to model data of the stereo model and pointer 26 to model data of the contour drawing model.

FIG. 7 shows the display screen 120 for displaying the image of the game for progressing the story while making the self character fight against enemy character in the virtual three-dimensional space by operating the self character C101 by the player of the game. In this case, there is displayed the image of the self character C101 from the right front direction. There emerge the enemy character 1 (C111) and the enemy character 2 (C113) on the left side of the display screen.

In this case, the position of the view point is determined by the game progress situation setting processing (step S5) in accordance with the positional relationship between the self character and the enemy character and the direction of the self character. Further, there is formed a non-photorealistic image attaching the contour line to the character is formed from the position of the view point of the respective character and is displayed on the display screen.

The self character attacks the enemy character in accordance with the operation input of the player from the operation input unit 410. Meanwhile, the enemy character attacks the self character in accordance with the predetermined algorism.

FIG. 8 shows the display screen when the self character C101 is moved in the left direction of the display screen by operating the operation input unit 410 by the player of the game from the state of the display screen shown in FIG. 7. The action of the character of "move in the left direction of the display screen" is determined by the game progress processing (step S4 of FIG. 4) in response to the operation input. In accordance with the action of the character, the direction, the position and the shape of the character are determined by the game progress situation setting processing (step S5 of FIG. 4). According to the example of FIG. 8, the direction of the character is determined to the left direction relative to the display screen and the position of the character is similarly moved in the left direction relative to the display screen. Further, the shape of the character is set with a shape for expressing running operation.

In this way, even when the game progress situation such as the direction, the position or the like of the character is changed, the contour line is drawn to the character. (Contour drawing model acquiring processing)

Figure 22:
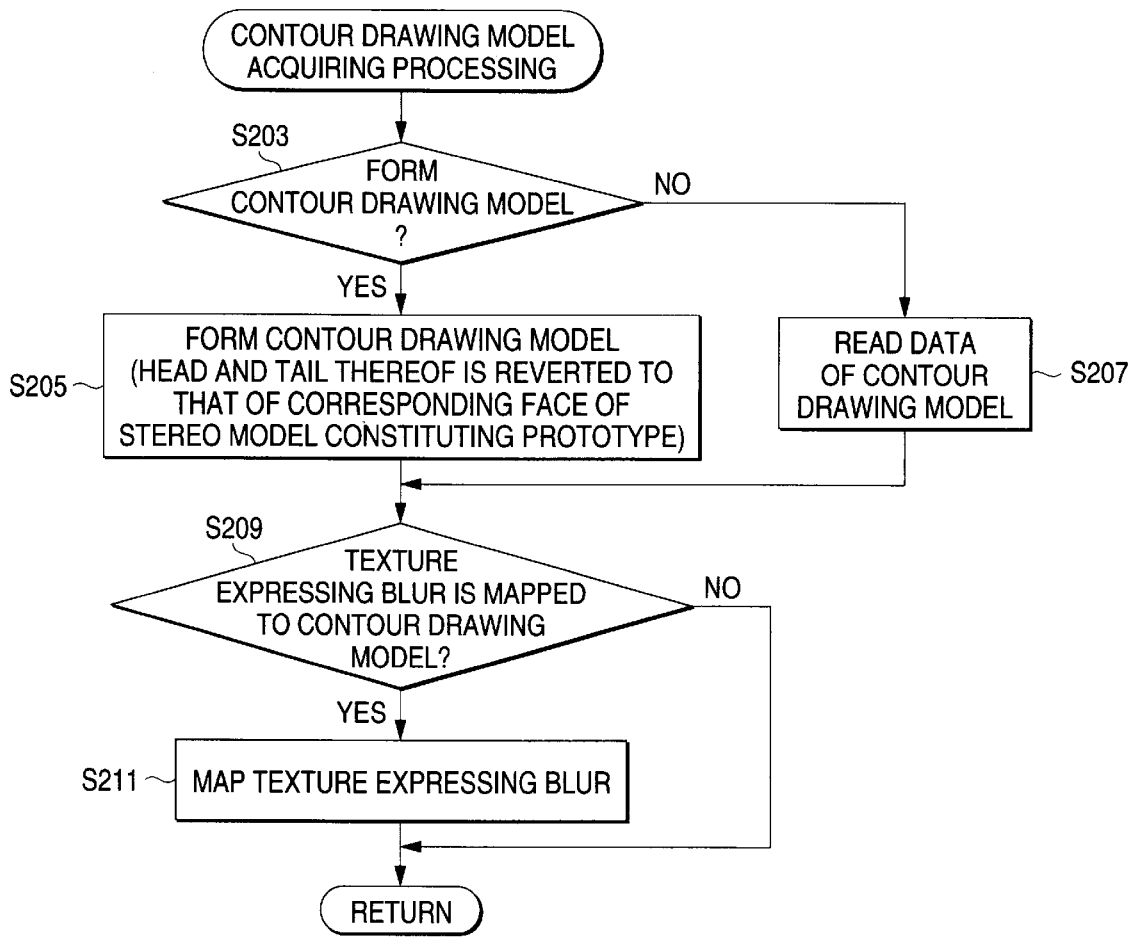
FIG. 22 is a flowchart showing a contour drawing model drawing processing in the first contour drawing processing and Embodiment 1.

FIG. 22 shows the processing of acquiring the contour drawing model included in the initial setting (step S2) of FIG. 4. Here, at first, it is determined whether the contour drawing model is to be formed (step S203). Because there are present a case of previously preparing the contour drawing model and a case of forming the contour drawing model at this stage. The determination is executed by determining whether the contour drawing model in correspondence with the stereo model is stored in CD-ROM 131. When it is determined that the contour drawing model is stored therein, it is determined that the contour drawing model is not formed and when it is determined that the contour drawing model is not stored therein, it is determined that the contour drawing model is formed.

When it is determined that the contour drawing model is not formed, data of the contour drawing model stored in CD-ROM 131 is read (step S207). According to the respective polygon of the contour drawing model, as explained above in reference to FIG. 18, head and tail thereof is reverted to that of the polygon in correspondence with the stereo model. Further, the size of the read contour drawing model is defined to be larger than the corresponding stereo model. Further, color of the contour drawing model is defined by color darker than that of the corresponding stereo model.

When it is determined that the contour drawing model is formed, a processing of forming the contour drawing model is carried out (step S205). Similar to step S207, also in the case of forming the contour drawing model at this stage, according to the respective polygon of the contour drawing model, as explained above in reference to FIG. 13, head and tail thereof is reverted to that of the corresponding polygon of the stereo model.

The size of the contour drawing model is formed to be larger than that of the corresponding stereo model. For example, there is formed the contour drawing model which is enlarged by moving apexes thereof in normal line directions of respective apexes of the stereo model. When the contour drawing model is larger than the stereo model, the contour line is drawn further boldly and when the contour drawing model is only slightly larger than the stereo model, the contour line is drawn further finely.

Further, there may be formed the contour drawing model which is enlarged by moving faces thereof in normal line directions of respective faces of the stereo model. Further, there may be formed the contour drawing model which is enlarged by moving respective apexes of the stereo model centering on the reference position normally defined in the stereo model.

Further, at this time point, the size of the contour drawing model may be formed by a size the same as a size of the corresponding stereo model. In this case, the contour drawing model is enlarged during a time period after acquiring the contour drawing model by the contour drawing model, until the arranging matrix of the contour drawing model is set by the contour drawing model arranging processing, mentioned later. Or, in setting the arranging matrix of the contour drawing model in the contour drawing model arranging processing, the arranging matrix may be determined to include enlargement conversion of the arranging matrix. Conversely, in arranging the stereo model, the arranging matrix of the stereo model may be determined such that the arranging matrix of the stereo model includes contraction conversion.

Meanwhile, color of material of the respective polygon of the contour drawing model is formed by color darker than color for material of the respective polygon of the corresponding stereo model. Further, at this time point, the color of the formed contour drawing model may not be defined. Or, color of material of the respective polygon of the contour drawing model may be the same as the color of material of the respective polygon of the corresponding stereo model. In this case, in the processing of drawing the contour drawing model, the color of the contour drawing model is not considered and the contour drawing model is drawn by separately defined color such as black or the like or color of texture expressing blur.

Next, it is determined whether texture expressing blur is mapped in the contour drawing model (step S209). When the contour drawing model is formed at step S205, based on data of the corresponding stereo model, the determination is executed. Meanwhile, when the contour drawing model is read at step S207, the determination is executed based on data of the read contour drawing model. When it is determined that texture expressing blur is mapped, at step S211, texture expressing blur is mapped in the contour drawing model. That is, texture coordinates (U, V) are set to the respective apexes of the polygon.

Figure 23:
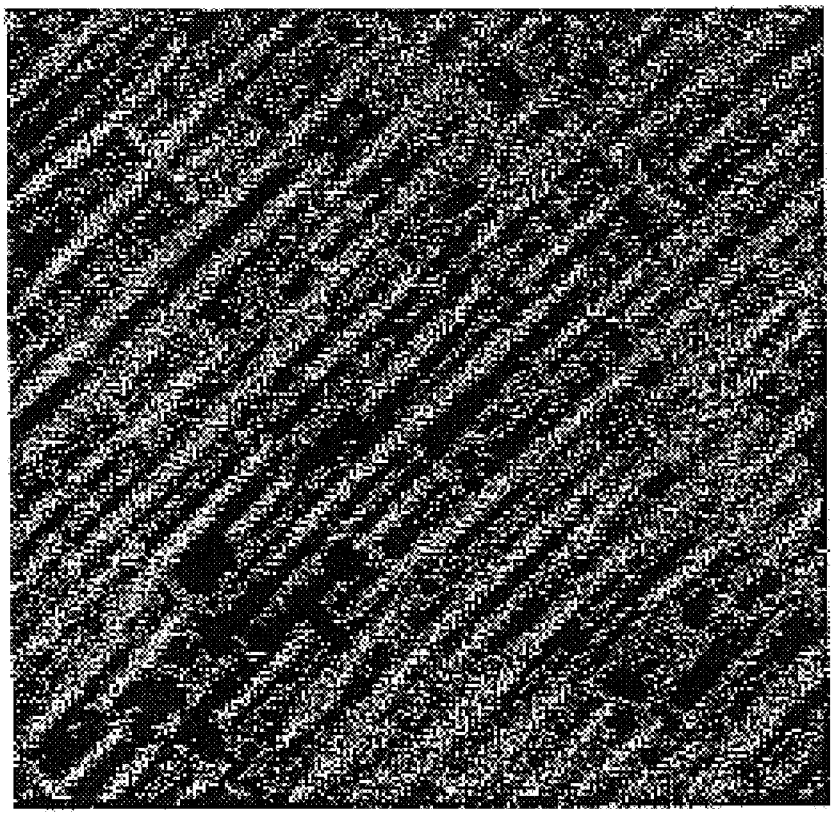
FIG. 23 shows an example of a texture for carrying out blurred expression.

Further, as described above, texture expressing blur is provided with a pattern including a change in brightness or transparency. FIG. 23 shows an example of a texture including a change in brightness. This is a texture having a pattern in which white hatched lines are finely drawn in a black matrix. Brightness of the black portion is low, brightness at the white portion is high and therefore, the texture shown by FIG. 23 includes a change in the brightness.

According to the invention, the contour line is drawn by cutting out portions of the contour drawing model as lines. That is, when the contour drawing model mapped with texture is drawn as the contour line, a line in correspondence with a line cut out from the contour drawing model as the contour line, is cut out from the texture and is drawn. At this occasion, when the line is cut out from the texture substantially in the vertical direction or substantially in the horizontal direction, any line also includes a change in brightness. By drawing such a line as a contour line, the contour line including the change in the brightness is drawn. That is, blur of the contour line is expressed and the contour line in further hand-writing tone is drawn.

In the case of the texture shown in FIG. 23, even when a line is cut out in any direction, the line includes the change in the brightness. However, depending on a direction of cutting out the line, there also is a case in which the brightness hardly changes. It can be adjusted which portion of the contour drawing model is drawn as the contour line in which direction and accordingly, according to the texture expressing blur, the pattern is adjusted mainly in accordance with the direction of cutting out the contour drawing model.

Further, when the contour line is drawn by the contour drawing model mapped with texture having a pattern including a pattern including a change in transparency, the contour line includes a change in transparency. At a portion having high transparency, in accordance with a rate thereof, color proximate to color of a background is drawn and at a portion having low transparency, color proximate to color of the texture, for example, black or the like is drawn. Thereby, a contour line including a change in light and shade is drawn and blur of the contour line is expressed.

When it is determined that the texture expressing blur is not mapped and when the processing of mapping the texture has been finished, the contour drawing model acquiring processing is finished.

(Contour Drawing Model Arranging Processing)

At step S25 of FIG. 20, the arranging matrix of the stereo model expressing the unprocessed character and the contour drawing model is set and there is carried out the processing of arranging the contour drawing model by the arranging matrix. Normally, the reference position of the contour drawing model is provided at a position in correspondence with the reference position of the stereo model. Further, the arranging matrix of the contour drawing model is set such that the reference position of the contour drawing model is arranged at the reference position of the stereo model or at a vicinity thereof.

Here, there is set the arranging matrix including rotation conversion in which when the direction of the stereo model is changed, also the contour drawing model corresponds thereto. When the shape of the stereo model is changed, the deformation processing is carried out such that the contour drawing model corresponds thereto.

At this stage, when the size of the contour drawing model is the same as that of the stereo model, the contour drawing model is enlarged. Specifically, the arranging matrix of the contour drawing model is set such that respective apexes of the contour drawing model are subjected to enlargement conversion in accordance with a predetermined enlargement rate centering on the reference position of the contour drawing model. Or, conversely, the stereo model may be contracted. That is, in this case, the arranging matrix of the stereo model is set such that respective apexes of the stereo model are subjected to contraction conversion in accordance with a predetermined contraction rate centering on the reference position of the stereo model.

Thereby, finally, the relatively large contour drawing model is arranged to include the stereo model. Depending on a relationship between arrangement positions, directions, shapes and the like of the two models, there can also occur a case in which the contour drawing model does not include completely the stereo model. However, also in this case, the contour line is drawn at a portion including thereof.

Further, it is not necessarily needed to set the arranging matrix at this stage and respective elements necessary for apex conversion such as arrangement coordinates, a direction and an enlargement and contraction rate and the like may be fixed. Also in this case, actual apex conversion is carried out at a stage of a processing of drawing the respective model.

(Contour Drawing Model Drawing Processing)

Figure 24:
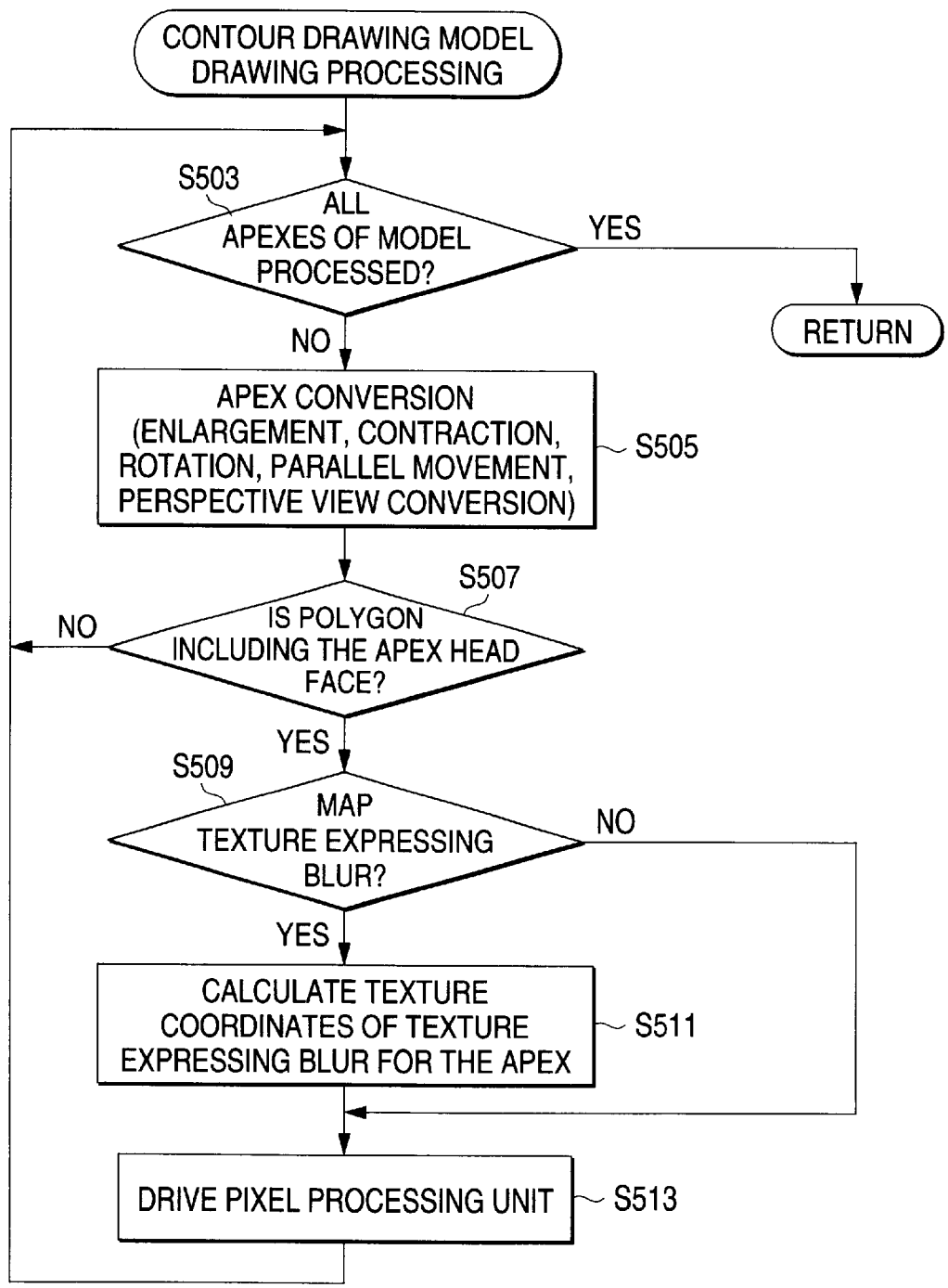
FIG. 24 is a flowchart of a contour drawing model drawing processing of the first contour drawing processing and Embodiment 1.

In FIG. 24 showing a flow of a processing of drawing a contour drawing model, processings explained below are repeatedly carried out until all of apexes of the contour drawing model have been processed (step S503). A first processing of the processings repeatedly carried out, is an apex conversion (enlargement, contraction, notation, parallel movement, perspective view conversion) processing for one apex (step S505). Here, the arranging matrix calculated at step S25 (FIG. 20) is used in the apex conversion. Further, with regard to initial two apexes, steps other than steps S505, S509 and S511 are not executed.

Here, caution is required in that light source calculation is not executed with regard to the contour drawing model. The reason is that a contour line is drawn regardless of a position of a light source or the like and it is useless to carry out the light source calculation. For example, there is a case in which color of material of a contour drawing model is disregarded. When the size of a contour drawing model is the same as that of a stereo model, there is a case in which in accordance with an arranging matrix set in an arranging processing, a contour drawing model is subjected to enlargement conversion at this stage.

Figure 25:
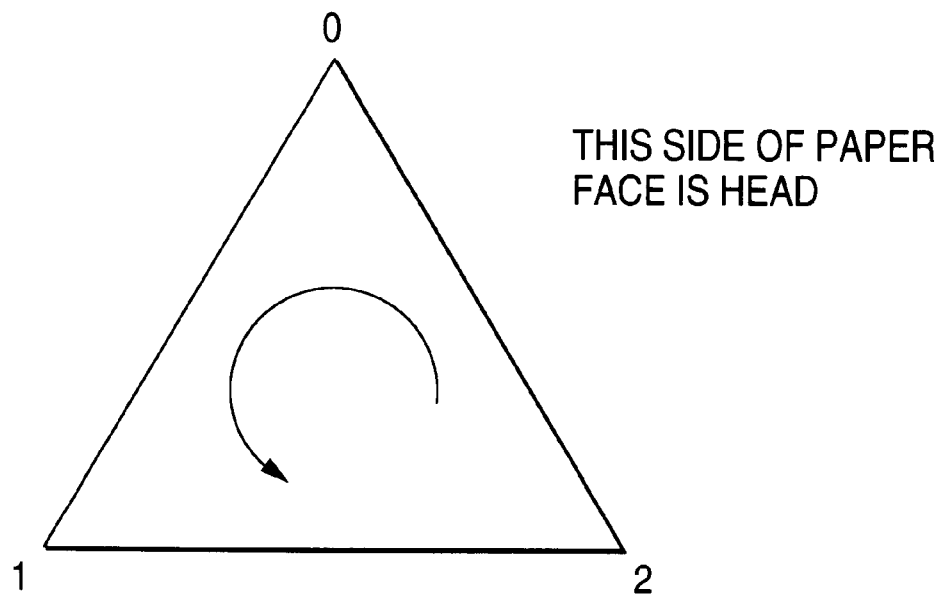
FIG. 25 is a schematic view for explaining head and tail determination of a triangular polygon.

Further, there is carried out a processing of determining whether a polygon (face) including the apex is a head face (step S507). According to the determination, in the case of a triangular polygon, it is determined to which direction the triangular polygon constituted by two apexes processed prior to the apex is directed. FIG. 25 shows an example of a triangular polygon constituting a stereo model for explaining a head and tail determining method. According to the example, in the drawing, an apex number of an upper apex is 0, an apex number of an apex on a lower left side is 1 and an apex number of an apex on a lower right side is 2. That is, the apex numbers are provided in the counterclockwise direction from the upper apex.

According to the contour drawing processing, a face in which the apex numbers of the respective apexes of a triangular polygon seem to be provided in the counterclockwise direction, is defined as a head face (so-to-speak right hand system). Therefore, in the case of the triangular polygon, a face on this side of paper face constitutes a head face. When there is a normal line vector in the direction of the head face, by a sign of inner product of the normal vector and a view line vector, head and tail of the triangular polygon can be determined. That is, when the sign of the inner product is negative, with regard to a view point position, the triangular polygon directs a head face and when the sign of the inner product is positive, with regard to the view point position, the triangular polygon directs a tail face.

Actually, as shown by FIG. 26, there is calculated outer product a'b of a vector "a" from the apex 0 to the apex 1 projected to the screen and a vector "b" from the apex 0 to the apex 2 projected to the screen and it is determined whether the face is the head face by a direction of a vector "n" constituting a result of the outer product. The vector "n" is in parallel with z axis and it is determined whether the face is the head face by inspecting a sign of z component of the vector "n". That is, when the sign is positive, the face is head and when the sign is negative, the face is tail. On the left side of FIG. 26, the numbers of the apexes of the triangle constitute the counterclockwise direction, and the vector "n" as the result of the outer product is directed in the positive direction of z axis and accordingly, the face is head. Meanwhile, on the right side of FIG. 26, the numbers of the apexes of the triangle constitute the clockwise direction, the vector "n" as the result of the outer product is directed in the negative direction of z axis and accordingly, the face is tail.

Figure 27:
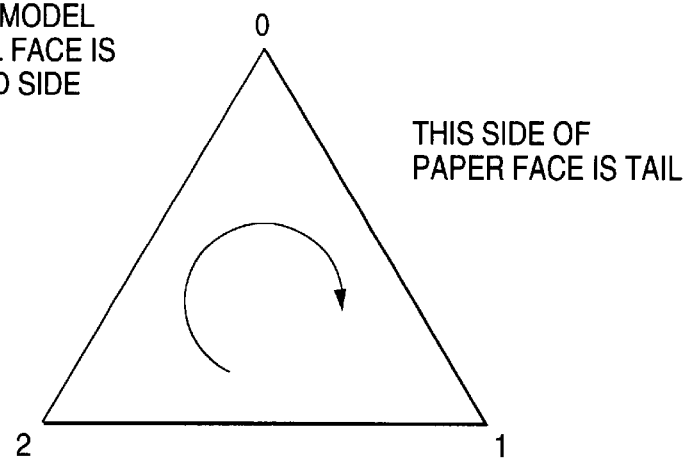
FIG. 27 is a schematic view for explaining head and tail determination of a triangular polygon in the first contour drawing processing.

In the case of the contour drawing model in the contour drawing processing, head and tail of a face of the contour drawing model is reverse to that of a corresponding polygon of the stereo model. FIG. 27 shows a polygon which corresponds to the polygon of FIG. 25 and head and tail of which is reverted. Respective apexes of a triangular polygon shown in FIG. 27 are provided with apex numbers of 0, 1, 2 in an order of upper middle, lower right and lower left. That is, apex numbers are attached to a corresponding triangular polygon in an order reverse to that of FIG. 27. That is, in FIG. 27, it is determined that this side of paper face is a tail face. Further, according to the contour drawing processing, the head and tail determination is carried out at this stage, however, it is also possible that the head and tail determination is carried out prior to the stage.

When the polygon (face) including the apex is the tail face, the operation returns to step S503. When the polygon (face) including the apex is the head face, it is determined whether texture expressing blur is mapped (step S509).

This signifies texture mapping with regard to the polygon. When the texture expressing blur is mapped, texture coordinates of texture for expressing blur are calculated (step S511). When texture mapping is carried out, apexes of the polygon have already been designated with texture coordinates (U, V), however, when the polygon is arranged obliquely to the screen, the texture may be displayed to distort on the screen. In order to avoid the distortion, there is carried out a texture perspective processing. According to the texture perspective processing, for example, by using Q=1/w ("w" designates a depth from the screen), new texture coordinates (S, V) are calculated. Notations S and V can be calculated by putting, for example, S=U'Q, T=V'Q. Calculated (S, V) are set as texture coordinates in correspondence with apexes of the polygon. When the texture expressing blur is not mapped, the operation proceeds to step S513.

Figure 17:
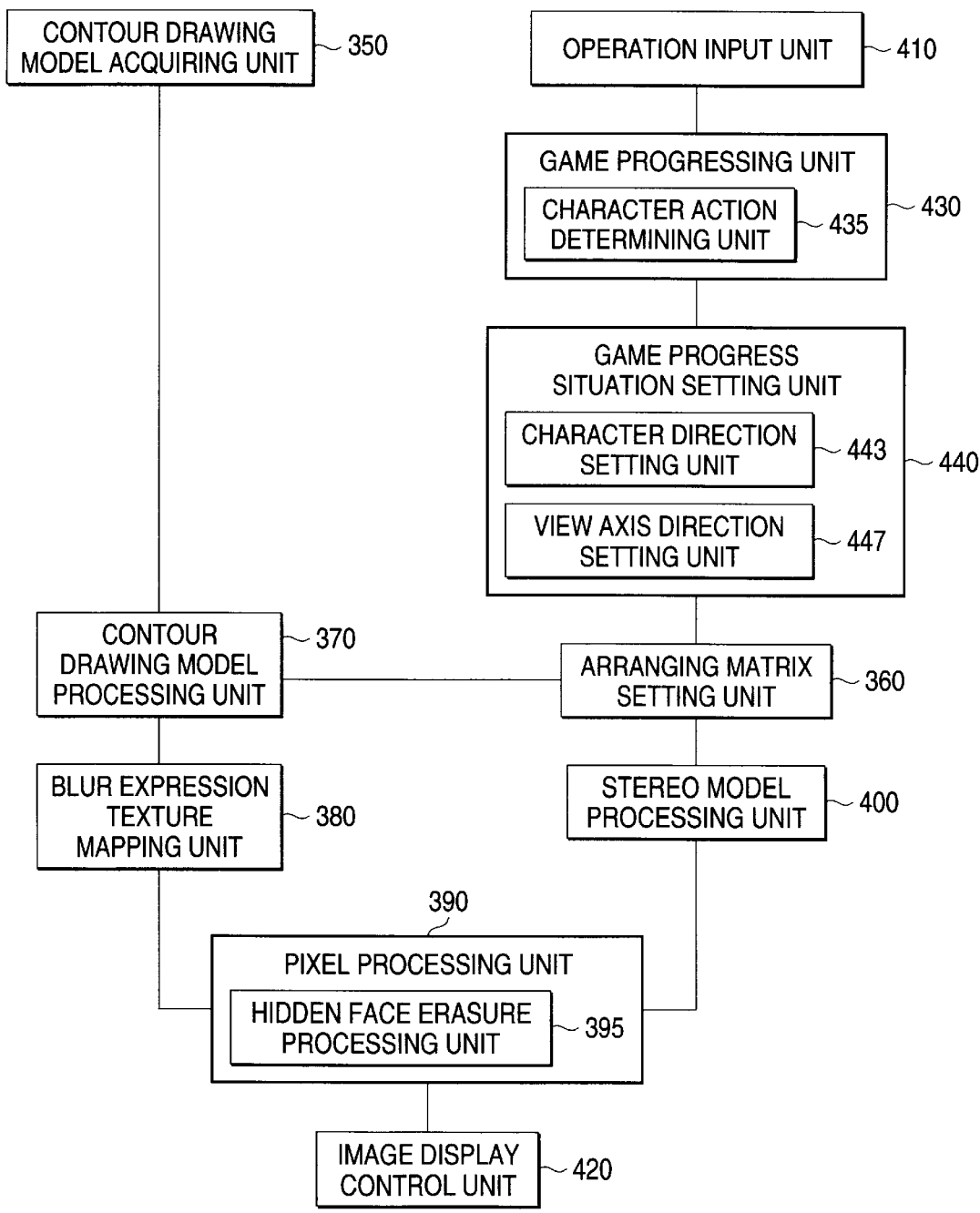
FIG. 17 is a functional block diagram of a first contour drawing processing.

Further, for example, the pixel processing unit 390 shown in FIG. 17 is driven (step S513). As described above, the pixel processing unit 390 forms data at the respective pixels at inside of the triangular polygon by interpolating data of the respective apexes of the triangular polygon. Data of the respective apexes are color of material, screen coordinate values, and texture coordinate values when step S511 is executed. Data at the respective pixel are color of material and pixel color when step S511 is executed.

However, it is also possible to set color of the contour line at the respective pixel by disregarding color of material at the time point. Further, it is also possible to set color of the respective apex in consideration of color of material. The pixel processing unit 390 draws a display image by further using data at the respective pixels at inside of the formed triangular polygon. At this occasion, hidden face erasure is carried out using the Z buffer.

Although there is shown an example of using the Z buffer for the hidden face erasure, with regard to a simple model as shown by FIG. 18, there may be executed a hidden face erasure processing such as the Z sort method in which the Z buffer is not used. However, in the case of a further complicated model, for example, in the case inwhich the hand of a person is arranged in front of the body, when the hidden face erasure using the Z buffer is not carried out, it is difficult to accurately draw the contour line.

(Stereo Model Drawing Processing)

Figure 28:
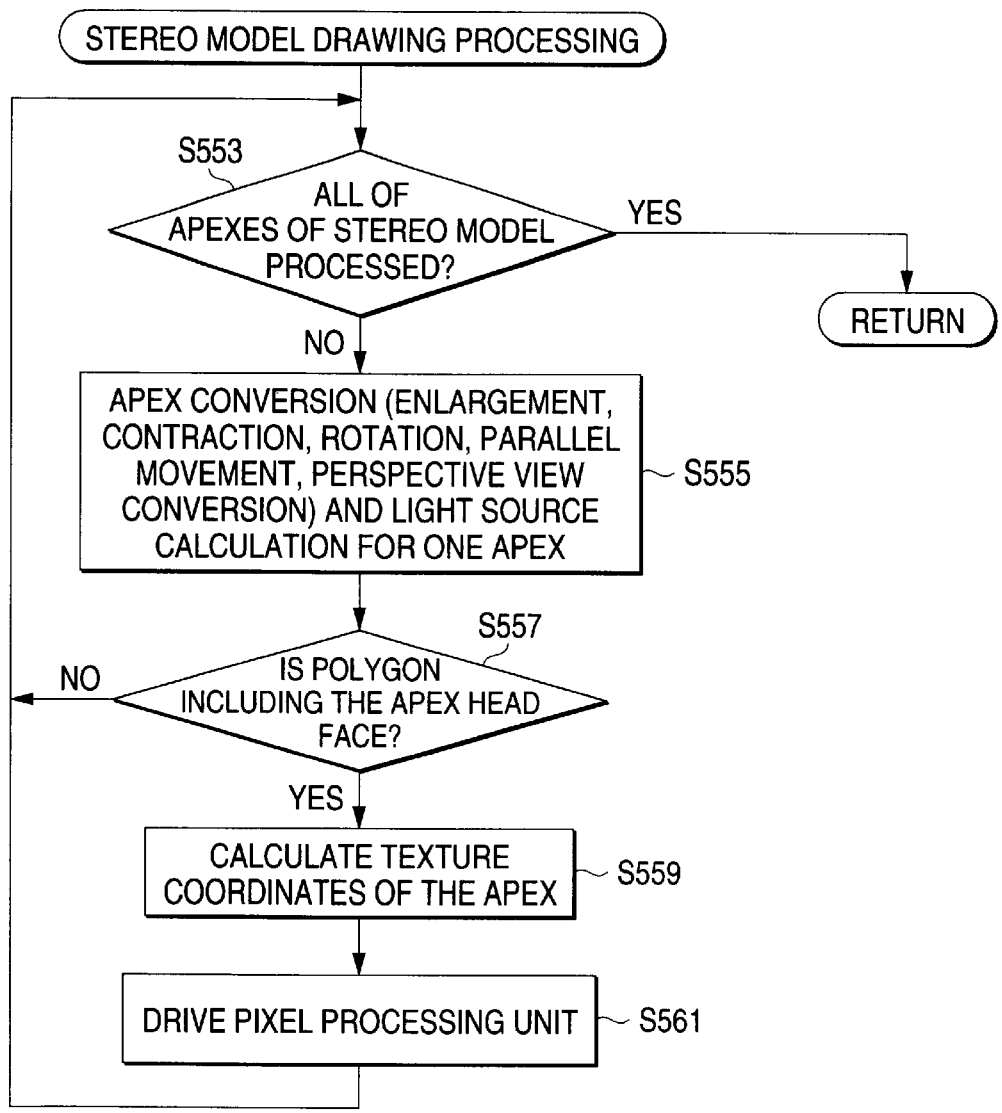
FIG. 28 is a flowchart of a stereo model drawing processing in the first and the second contour drawing processings.

FIG. 28 shows a flow of a processing of drawing a stereo model common to the contour drawing processing and (3) contour drawing processing (part 2), shown below. Here, following processings are repeatedly carried out until all of apexes of a stereo model have been processed (step S533). A first one of repeated processings is apex conversion (enlargement, contraction, rotation, parallel movement, perspective view conversion) and light source calculation with regard to one apex (step S555). Further, with regard to initial two apexes, processings other than steps S555 and S559 are not carried out.

In the apex conversion, there is used the arranging matrix set at step S25 (FIG. 20). However, in the case in which the size of the contour drawing model is the same as that of the stereo model, there also is a case in which the contour drawing model is relatively enlarged by contracting the size of the stereo model. In this case, there is executed contraction conversion at step S555. Further, the stereo model can simply be contracted by moving respective apexes thereof toward center of the stereo model along normal lines thereof.

Next, it is determined whether a polygon (face) including the apex is a head face (step S557). According to the determination, in the case of a triangular polygon, it is determined by to which direction a triangular polygon constituted by two apexes processed prior to the apex is directed. According to the determination, there can be used the method explained in the processing of drawing the contour drawing model. Further, although according to the contour drawing processing, head and tail determination is carried out at this stage, the head and tail determination can be carried out prior to the stage.

When the polygon (face) including the apex is a tail face, the operation returns to the step S553. When the polygon (face) including the apex is the head face, there is carried out a processing of calculating texture coordinates of the apex (step S559). When the texture mapping processing is carried out, the apexes of the polygon are already designated with texture coordinates (U, V), as the texture perspective processing, in this case, by using Q=1/w (w designates depth from screen), there is carried out the calculation of S=U'Q, T=V'Q. However, it is arbitrary whether the texture mapping is executed.

Further, the pixel processing unit 390 shown in, for example, FIG. 17 is driven (step S561). As mentioned above, the pixel processing unit 390 forms data at respective pixel at inside of the triangular polygon by interpolating data of the respective apex of the triangular polygon. Data of the respective apex are color of material, screen coordinate values and texture coordinate values. Further, data at respective pixel are color of material and texture color. Further, the pixel processing unit 390 draws a display image by using data at respective pixels at inside of the formed triangular polygon. At this occasion, the hidden face erasure is carried out by using the Z buffer.

When the above-described processings are executed, the stereo model for expressing a character of a game or the like is rendered as in a normal case, according to the contour drawing model introduced by the contour drawing processing, a portion of a face thereof rearward from the stereo model which is not hidden by the stereo model, is drawn and accordingly, the portion is rendered as a contour line. According to the contour drawing processing, only by introducing the contour drawing model, a processing substantially similar to that in a normal stereo model is executed to thereby enable to simply draw the contour line. In this way, according to the contour drawing processing, a game image attached with a contour line in accordance with operation input can be formed in real time.

(3) Contour Drawing Processing (Part 2)

Also in the second contour drawing processing, a contour line is attached to a stereo model for expressing a character of a game or the like.

Figure 29:
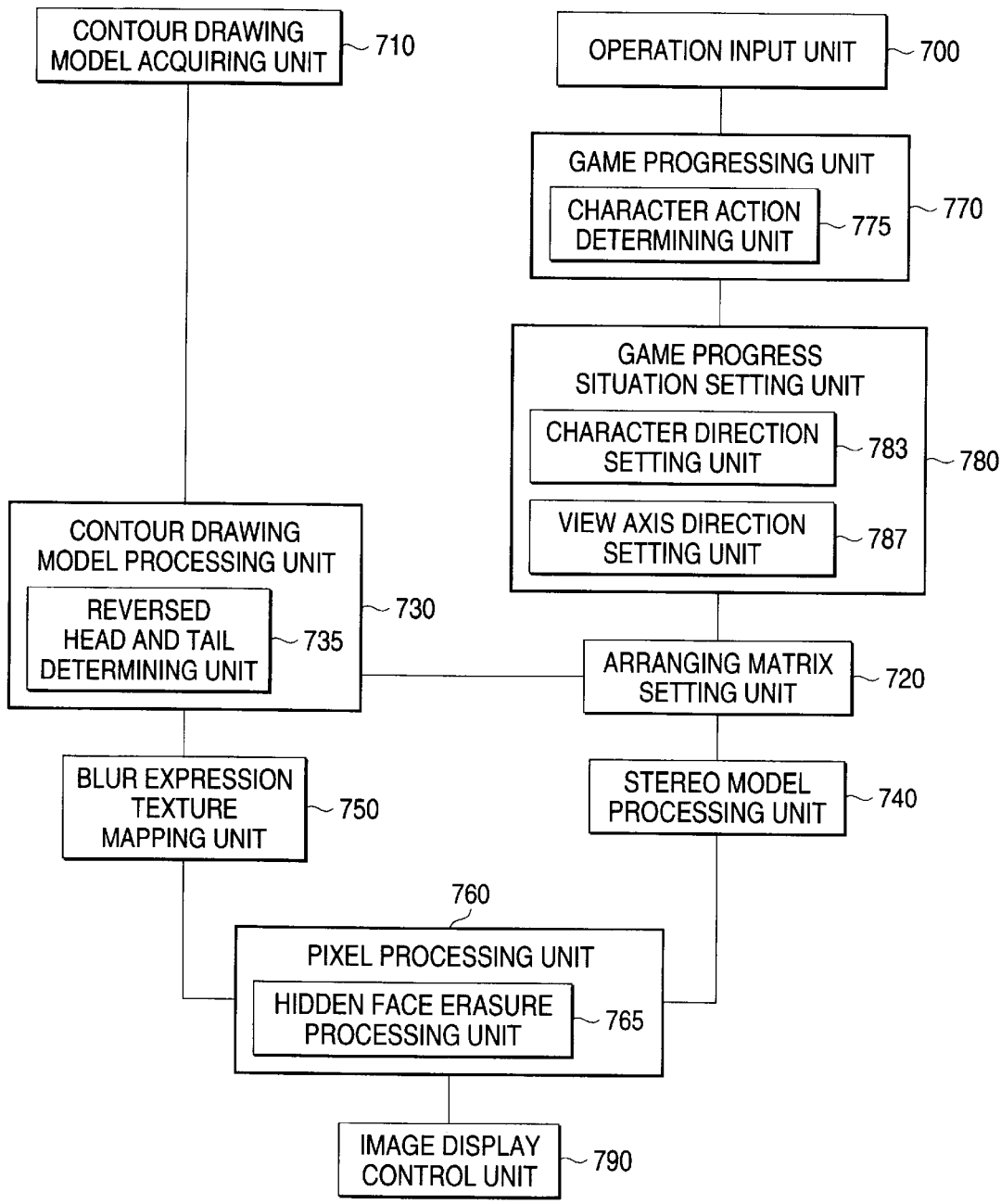
FIG. 29 is a functional block diagram of the second contour drawing processing.

An explanation will be given of an outline of the second contour drawing processing in reference to a functional block diagram of FIG. 29. A game apparatus according to the second contour drawing processing includes an operation input unit 700, a game progressing unit 770 including a character action determining unit 775, a game progress situation setting unit 780 including a character direction setting unit 783 and a view axis direction setting unit 787, an arranging matrix setting unit 720, a stereo model processing unit 740, a contour drawing model acquiring unit 710, a contour drawing model processing unit 730 receiving an arranging matrix from the arranging matrix setting unit 720 and including a reversed head and tail determining unit 735, a blur expression texture mapping unit 750, a pixel processing unit 760 receiving data from the blur expression texture mapping unit 750 and the stereo model processing unit 740 and including hidden face erasure processing unit 765 and an image display control unit 790.

The operation input unit 700 outputs operation information of button, lever or the like of the operation input unit 700 operated by a player of a game to the game progressing unit 770.

The game progressing unit 770 determines content of progressing the game such as action of a character, a change in a view point position, a change in a direction of a view axis, or movement of a position of a light source, a change in a direction of light ray or the like based on the information from the operation input unit 700 and gives instruction to the game progress situation setting unit 780. The character action determining unit 775 in the game processing unit 770 is provided with a function of particularly determining action of a character based on the information from the operation input unit 700.

The game progress situation setting unit 780 calculates and sets a position, a direction and a shape of the character, the position of the view point or the direction of the view axis, the position of the light source, the direction of the light ray and an increase or a decrease of physical strength in accordance with the action of the character or the like in accordance with the content of progressing the game instructed by the game progressing unit 770. The character direction setting unit 783 in the game progress situation setting unit 780 is provided with a function of particularly determining a direction with regard to a view point of the character in accordance with the content of progressing the game instructed by the game progressing unit 770. Meanwhile, the view axis direction setting unit 787 in the game progress situation setting unit 780 is provided with a function of particularly setting the direction of the view axis in accordance with the content of progressing the game instructed by the game progressing unit 770.

The arranging matrix setting unit 720 carries out a processing of determining an arranging matrix of a stereo model for expressing the character in accordance with position coordinates and a direction of the character and the position of the view point set by the game progress situation setting unit 780. The arranging matrix is a matrix for executing parallel movement, rotation and perspective view conversion of the stereo model.

When a contour drawing model which is large relative to the stereo model is acquired and a reference position of the contour drawing model is present at a position in correspondence with a reference position of the stereo model, the arranging matrix determined by the arranging matrix setting unit 720 can commonly be used by the stereo model processing unit 740 and the contour drawing model processing unit 730. When the arranging matrix can commonly be used, one storing area for the arranging matrix may be prepared for respective character and therefore, the operation is efficient.

However, there also is a case in which the arranging matrix is not commonly used or cannot be commonly used. In that case, an arranging matrix of the stereo model and an arranging matrix of the contour drawing model are formed and respectively stored to storing areas. Further, when the arranging matrix cannot commonly be used as described later, there also is a case in which one storing area of an arranging matrix is prepared, immediately before the arranging matrix is used by the stereo model processing unit 740 and the contour drawing model processing unit 730, a setting operation is carried out such that an arranging matrix of the stereo model includes contraction conversion or an arranging matrix of the contour drawing model includes enlargement conversion.

The contour drawing model acquiring unit 710 forms a contour drawing model in correspondence with a stereo model constituted by, for example, a triangular polygon. Further, when the contour drawing model has previously been formed, the contour drawing model acquiring unit 710 reads a contour drawing model which is previously formed and is constituted by a triangular polygon. According to the second contour drawing processing, different from the previously-described contour drawing processing (hereinafter, may be referred to as first contour drawing processing), head and tail of respective polygon of the acquired contour drawing model is the same as that of a polygon in correspondence with the stereo model. Further, the contour drawing model is larger than the stereo model and is defined by predetermined coloring for a contour line. Further, although the contour drawing model must finally be large relative to the stereo model, there is a case in which a size of an object for drawing a contour at this stage is the same as that of a stereo model. In this case, the contour drawing model is processed to draw to be large relative to the stereo model before the contour drawing model and the stereo model are drawn.

Figure 30:
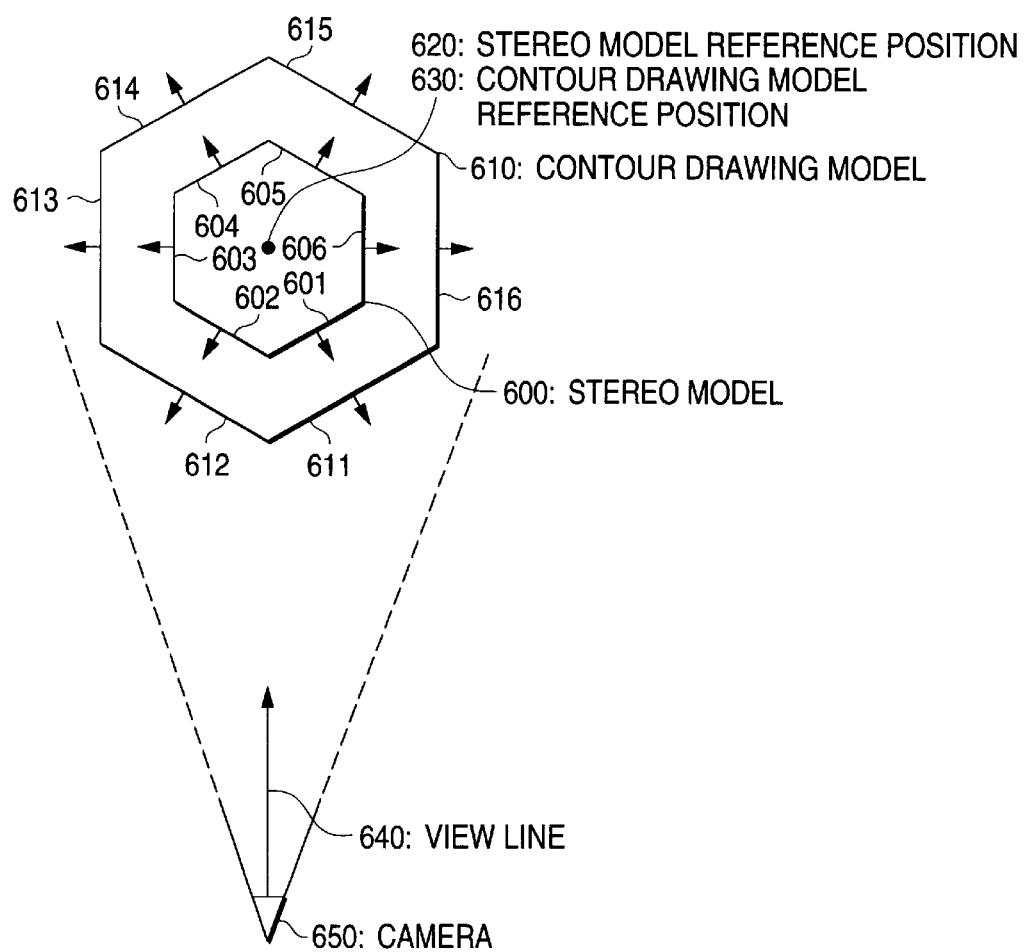
FIG. 30 is a schematic view for explaining a positional relationship among a camera, a stereo model and a contour drawing model in the second contour drawing processing in which directions in which surfaces of the stereo model and the contour drawing model are directed are shown by arrow marks.

Further, there also is a case in which color of the contour drawing model succeeds color of material of a corresponding stereo model as it is. In this case, color for drawing is separately designated. The reference position of the contour drawing model is normally defined to dispose at the reference position of the corresponding stereo model or at a vicinity thereof. For example, FIG. 30 shows a case in which a contour drawing model 610 is defined to be larger than a stereo model 600. According to FIG. 30, arrow mark directions of respective faces thereof designate head faces. Outer sides of respective faces in a hexagonal shape of both of the stereo model 600 and the contour drawing model 610, constitute head faces.

Both of a stereo model reference position 620 constituting the reference position of the stereo model 600 and a contour drawing model reference position 630 constituting the reference position of the contour drawing model 610 are defined at centers of the respective models. Further, the contour drawing model 610 is defined to be larger than the stereo model 600 centering on the contour drawing model reference position 630.

The contour drawing model processing unit 730 executes apex conversion (enlargement, contraction, rotation, parallel movement, perspective view conversion) with regard to respective apexes of the contour drawing model by using the arranging matrix by the arranging matrix setting unit 720 and executes head and tail determination of the respective polygon of the contour drawing model. However, different from the above-described contour drawing processing, the head and tail determination is carried out by the reversed head and tail determining unit 735. Further, in this case, light source calculation is not executed. For example, in the case in which the contour drawing model having a size the same as that of the stereo model is acquired at the contour drawing model acquiring unit 710, the contour drawing model processing unit 730 executes apex conversion for enlarging the contour line drawing model. Also in the case of enlarging the contour line drawing model at this stage, the relationship between the stereo model and the contour drawing model is as shown by FIG. 30.

Further, in the case of the contour drawing model of the second contour drawing processing, a determination reference in determining a surface and a rear face with regard to respective faces of the contour drawing model is reversed. For example, consider a case in which as shown by FIG. 25, when a surface of a polygon is viewed from a camera, apex numbers are attached to apexes of respective polygon such that apex numbers of the respective apexes constitute the counterclockwise direction. In this case, according to a head and tail determination with regard to a model other than the contour drawing model, when the polygon is viewed from the camera, in the case in which the order of the apex numbers are distributed in the counterclockwise direction, it is determined that the polygon directs the surface to the camera. Meanwhile, according to the head and tail determination with regard to the contour drawing model, when the polygon is viewed from the camera, in the case in which the order of the apex numbers are distributed in the clockwise direction, it is determined that the polygon directs the surface to the camera. In the example of FIG. 30, only faces 613, 614, 615 and 616 directing arrow marks in directions the same camera 650 as the direction of a view line 640 constitute drawing objects. Although these faces are normally out of drawing objects since the faces are tail faces, according to the second contour drawing processing, these faces are dealt with as the drawing objects. Thereby, faces 611 and 612 disposed on outer sides of the stereo model 600 and proximate to a camera 650 are out of drawing objects and accordingly, the stereo model 600 is normally drawn. Further, when a direction from the stereo model 600 of the camera 650 is made positive, it is known that with regard to a face of the contour drawing model constituting a drawing object, an outer side thereof (direction of head face) is a face directed in a negative direction. Further, hidden face erasure is carried out by the hidden face erasure processing unit 765 of the pixel processing unit 760 and accordingly, even when faces constitute drawing objects, all of the faces are not drawn.

The blur expression texture mapping unit 750 executes a processing for mapping blurred expression texture for the contour drawing model such that a contour drawing which is drawn as a result constitutes a blurred line. Further, it is not necessary needed that a contour line is blurred, the processing of the blur expression texture mapping unit 750 is selectively executed.

The stereo model processing unit 740 carries out a processing of the stereo model. That is, the stereo model processing unit 740 executes apex conversion (enlargement, contraction, rotation, parallel movement, perspective view conversion) and light source calculation to respective apexes of the stereo model by using the arranging matrix by the arranging matrix setting unit 720 and carries out head and tail determination of respective polygon of the stereo model. When a size of the contour drawing model after having been processed by the contour drawing model processing until 740 is the same as that of the stereo model, the stereo model processing unit 740 executes apex conversion for contracting the size of the stereo model such that the stereo model becomes small relative to the contour drawing model. In this case, also in the case of contracting the size, the relationship between the stereo model and the contour drawing model is as shown by FIG. 30.

Further, head and tail determination of face is carried out similar to normal determination, that is, contrary to the case of the contour drawing model, among faces of the stereo model 600, faces thereof directing arrow marks in directions the same as the direction of the view line 640 of the camera 650 are excluded from drawing objects. In the example of FIG. 30, faces 603, 604, 605 and 606 on a rear side in view from the camera 650 are excluded from drawing objects. In this case, there also is carried out a processing for texture mapping of the stereo model as necessary.

The pixel processing unit 760 carries out a processing of drawing respective pixels. For example, the pixel processing unit 760 calculates color of the respective pixels at inside of the polygon by interpolating color of apex of the polygon and determines color of the respective pixel while executing hidden face erasure processing using the Z buffer method.

The pixel processing unit 760 executes the processing with regard to faces constituting drawing objects at the contour drawing model processing unit 720 and the stereo model processing unit 740.

For example, in the case of FIG. 30, faces 601 and 602 of the stereo model 600 the most proximate to the camera 650 are drawn and the four faces 613, 614, 615 and 616 of the contour drawing model remote from the camera 650 are drawn. The four face of the contour drawing model 610 are extruded to the left and to the right from the stereo model 600 in view from the camera 650 and accordingly, only extruded portions are drawn without being subjected to hidden face erasure. The extruded portions constitute contour lines. Further, the pixel processing unit 760 determines color in consideration of color of material of the contour drawing model. Further, there also is a case in which the color of the material is totally disregarded and color of the contour line (black or dark color for contour line) constitutes color of the contour drawing model.

Finally, the image display control unit 790 designates a drawing area for displaying an image on the display screen written with data by the pixel processing unit 760. The drawing area is normally classified in two, one of them is used for display and other thereof is used for writing. Further, when writing to the writing area has been finished, the writing area is used to switch to the display area and the display area is used to switch to the writing area. The image display control unit 790 controls the switching operation.

(Premise)

Also in the second contour drawing processing, there is a case in which data of a contour drawing model is previously formed and stored to CD-ROM 131 and in executing a game, the data is read from CD-ROM 131. The example of data written to CD-ROM 131 shown by FIG. 19 stays the same also in the second contour drawing processing at a level shown by FIG. 19.

The program area 132 is stored with a program for executing the invention by a computer. A detailed description will be given later of content of the program.

The system data area 133 is stored with various data to be processed by the program stored to the program area 132, mentioned above. The data area 134 is stored with data including the stereo model data 137 and the contour drawing model data 135. However, when a contour drawing model is formed by a contour drawing model acquiring processing, mentioned later, it is not necessary to store the contour drawing model data 135. Further, data of texture for expressing blur or the like is also stored to the image data area 134.

The contour drawing model data 135 is previously formed from the stereo model data 137 and is provided with following characteristic.

That is, the size of a contour drawing model is defined to be larger than that of a stereo model. For example, according to the contour drawing model, apexes thereof are moved in normal line directions of corresponding respective apexes of the stereo model by a length of 2 percent of a total length of the stereo model and is defined to enlarge by about 2 percent as a whole. When the enlargement rate is larger, the contour line is drawn further boldly and when the enlargement rate is smaller and the contour drawing model is enlarged slightly, the contour line is drawn further finely. Further, when the contour drawing model is defined to enlarge not uniformly but partially, only the contour line at the further enlarged portion is drawn boldly. Adjustment of the size is normally carried out by a producer and accordingly, the contour line reflecting intention of the producer can be drawn.

Color of material of respective polygon of the contour drawing model is set to color having chroma the same as that of the stereo model and brightness lower than that of the stereo model. Further, there also is the case in which all of respective polygons are set to single color such as black. Further, there also is the case in which a setting is carried out for mapping texture for expressing blur. Color of material is adjusted by the producer and therefore, the contour line can be drawn by color intended by the producer. Further, head and tail of respective polygon of the contour drawing model in the second contour drawing processing is not reverted. This is a point different from the above-described contour drawing processing.

Further, the size of the contour drawing model may be defined to be a size the same as that of the corresponding stereo model. In this case, after acquiring the contour drawing model acquiring processing, mentioned later, the contour drawing model is enlarged during a time period until an arranging matrix of the contour drawing model is set by a contour drawing model arranging processing, mentioned later. Or, the arranging matrix may be determined such that when the arranging matrix of the contour drawing model is set by the contour drawing model arranging processing, the arranging matrix includes enlargement conversion. Conversely, the arranging matrix of the stereo model may be determined such that when the stereo model is arranged, the arranging matrix of the stereo model includes contraction conversion.

Further, color of material of respective polygon of the contour drawing model may be the same as color of material of respective polygon of the corresponding stereo model. In this case, in the processing of drawing the contour drawing model, mentioned later, for example, the contour drawing model is drawn by separately defined color such as black.

The sound data 136 is stored with data for outputting sound. Further, the sound processing is not directly related to the invention and accordingly, it is not necessary to store data to the sound data area 136.

Next, an explanation will be given of a processing flow of the second contour drawing processing.

(Total Processing Flow)

The processing flow at the level shown by FIG. 4 stays the same with that in the second contour drawing processing. When a game is started, initial setting is carried out (step S2). In a processing of the initial setting, there is included a processing of acquiring data of a stereo model for expressing a character to be drawn. Further, there also is included a processing of acquiring data of a contour drawing model. Next, there is carried out operation of button, lever or the like of the operation input portion 700 by a player of the game (step S3). Further, based on information of the operation input at step S3, there is carried out a game progress processing for determining content of progressing the game such as action of a character in which, for example, the character moves to the left or the character attacks or the like, a change in a view point position, a change in a direction of a view axis, or movement of a light source position, a change in a direction of light ray or the like (step S4).

Thereafter, in accordance with the content of progressing the game determined at step S4, there is carried out a game progress situation setting processing for setting a position, a direction and a shape of the character, the position of the view point or the direction of the view axis, the position of the light source or the direction of the light ray, further, an increase or a decrease of physical strength in accordance with action of the character and the like (step S5). Next, there is carried out a game image drawing processing for drawing a game image in accordance with the game progress situation (step S6). A detailed description will be given later of the game image drawing processing.

Further, there is carried out a game image display processing for displaying the game image drawn by the game image drawing processing at step S6 (step S7).

Next, it is determined whether the game is over (step S8). At the game progress situation setting processing executed in accordance with the operation input at step S3 (step S5), when physical strength of a self character operated by the player of the game is reduced and set to 0, a condition of game over is satisfied. At step S8, the physical strength of the self character operated by the player of the game is inspected and it is determined whether the game is over. When the physical strength of the self character is not 0, the operation returns to step S3 and awaits for successive operation input. Meanwhile, when the game is over, the game is finished. Further, even after the game is over, a result thereof is displayed on the display screen at step S7 and accordingly, the player can grasp the final situation of the game from the display screen.

Further, the processing flow expressing the outline of the game image drawing processing (step S6 (FIG. 4)) shown by FIG. 20 stays the same as that of the second contour drawing processing at the level shown by FIG. 20. There is carried out a background model drawing processing for drawing a background model for expressing a background portion in the game image (step S22). The drawing processing is the same as the conventional drawing processing and accordingly, a detailed description will not be given here. Further, the following steps S24 through S27 are repeated until all of characters have been drawn (step S23).

A first one of the repeated steps is a step of executing a deformation processing for deforming an unprocessed character (step S24). Motion of the unprocessed character is determined by the game progress processing at step S4 in accordance with the operation input executed at step S3 of FIG. 4. Further, there is executed a processing of deforming the stereo model for expressing the unprocessed character set by the game progress situation setting processing at step S6 executed further in accordance therewith. Further, in the second contour drawing processing, in accordance with the processing of deforming the stereo model, a processing of deforming the contour drawing model is also executed.

A second one of the repeated steps is a step of setting an arranging matrix of the unprocessed character (step S25). The arranging matrix is a matrix for parallel movement, rotation and perspective view conversion of the stereo model expressing the unprocessed character and is formed based on position coordinates and a direction of the character and the position of the view point set by the game progress situation setting processing at step S5. As described above, when the contour drawing mode is already defined to be large relative to the stereo model and the reference position of the contour drawing model is the same as the reference position of the stereo model, the arranging matrix of the stereo model can also be used for the contour drawing model. When the condition is not satisfied, arranging matrices may be set to respectives of the stereo model and the contour drawing model. Further, there also is the case in which an arranging matrix including enlargement conversion is set to the contour drawing model in the contour drawing model drawing processing, mentioned later, further, there also is the case in which an arranging matrix including contraction conversion is set to the stereo model in the stereo model drawing processing.

Further, a third one of the repeated steps is a step of executing a contour drawing model drawing processing for drawing the contour drawing model (step S26). A detailed description will be given later of the contour drawing model drawing processing.

A fourth one of the repeated steps is a step of executing a stereo model drawing processing for drawing the stereo model for expressing the unprocessed character (step S27). A detailed description will be given later of the stereo model drawing processing.

After all of the characters have been drawn, there is carried out a window drawing processing for drawing a window for displaying capability of the character or the like to a user (step S28). The window drawing processing is the same as conventional drawing processing and accordingly, a detailed description will not be given here.

The structure of the character data explained in reference to FIG. 21 stays the same as that of the first contour drawing processing and includes a numerical value of maximum physical strength 10, a numerical value of current physical strength 12, a numerical value of attack force 14, a numerical value of defence force 16, coordinates (x, y, z) of the reference position 18, rotational angles around X, Y, Z axes constituting direction 20 of the character, pointer 22 to motion data, pointer 24 to model data of the stereo model and point 26 to model data of the contour drawing model. The model data of the contour drawing model differs from that of the first contour drawing processing as explained in the second contour drawing processing (premise).

Next, an explanation will be given of a simple example with regard to progress of a game story in accordance with operation input of the player of the game (FIG. 7 and FIG. 8).

FIG. 7 shows the example of the display screen 120 for displaying an image of a game for progressing the story by making the character fight against enemy character in a virtual three-dimensional space by operating the self character C101 by the player of the game. In this case, the image of the self character C101 from the right front direction is displayed. On the left side of the screen, the enemy character 1 (C111) and the enemy character 2 (C113) emerge.

At this occasion, the position of the view point is determined by the game progress situation setting processing (step S5) in accordance with the positional relationship between the self character and the enemy character and the direction of the self character. Further, with regard to the respective characters, from the position of the view point, non-photorealistic images attached with contour lines are formed to the characters and displayed on the display screen 120.

In accordance with the operation input of the player from the operation input unit 700 (FIG. 29), the self character attacks the enemy character. Meanwhile, the enemy character attacks the self character in accordance with the predetermined algorism.

FIG. 8 shows the display screen 120 when the player of the game moves the self character C101 in the left direction of the display screen by operating the operation input unit 700.

Action of the character of (move in the left direction of the display screen) is determined by the game progress processing (step S4 of FIG. 4) in response to the operation input. In accordance with the action of the character, the direction, the position and the shape of the character are determined by the game progress situation setting processing (step S5 of FIG. 4). In the example of FIG. 8, the direction of the character is determined to the left direction relative to the display screen and the position of the character is moved similarly in the left direction relative to the display screen. Further, the shape of the character is set with a shape for expressing running motion.

In this way, even when the game progress situation of the direction, the position or the like of the character is changed, the contour line is drawn to the character.

(Contour Drawing Model Acquiring Processing)

Figure 31:
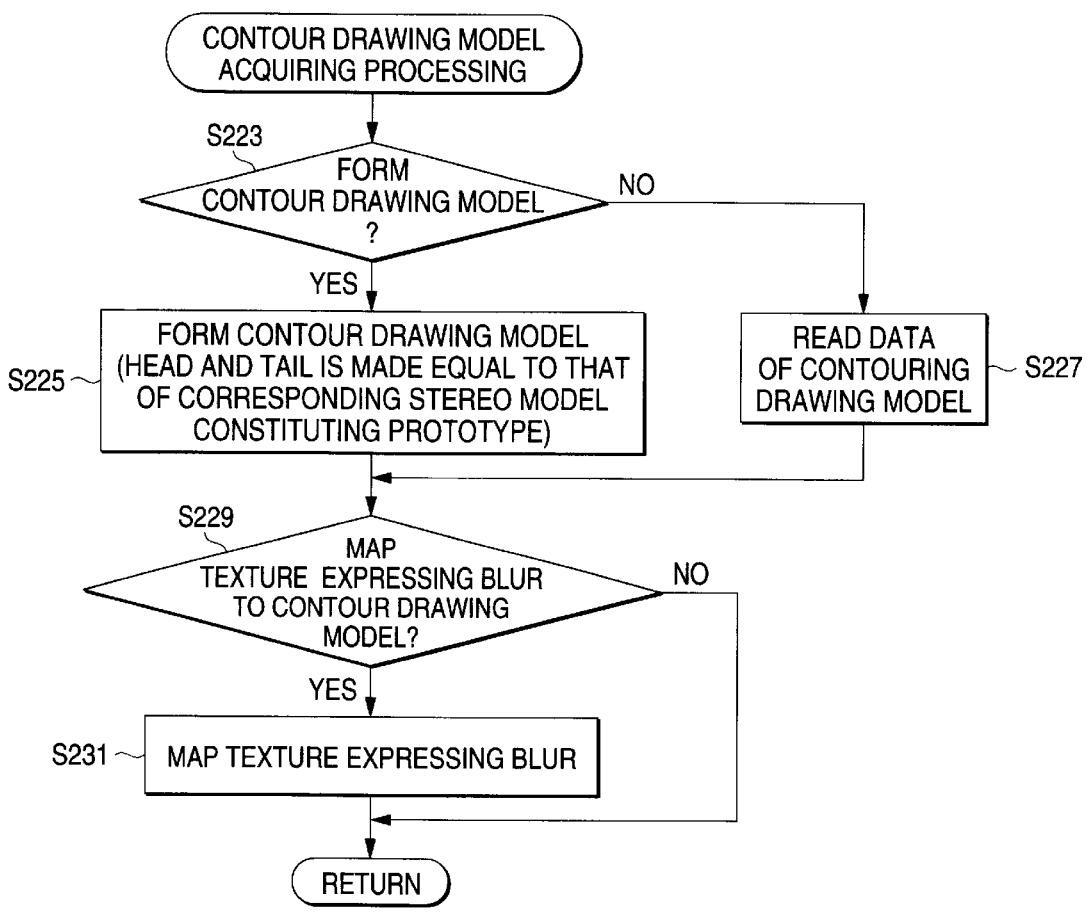
FIG. 31 is a flowchart of a contour drawing model acquiring processing in the second contour drawing processing and Embodiment 2.

The processing of acquiring the contour drawing model included in the initial set (step S2) of FIG. 4 is shown in FIG. 31. Here, firstly, it is determined whether the contour drawing model is to be formed (step S223). The reason is that there are present a case of previously preparing the contour drawing model and a case of forming the contour drawing model at this stage. The determination is executed by determining whether the contour drawing model in correspondence with the stereo model is stored to CD-ROM 131. When it is determined that the contour drawing model is stored thereto, it is determined that the contour drawing model is not formed and when it is determined that the contour drawing model is not stored thereto, it is determined that the contour drawing model is formed.

When it is determined that the contour drawing model is not formed, data of the contour drawing model stored to CD-ROM 131 is read (step S277). According to respective polygon of the contour drawing model, as explained above in reference to FIG. 30, different from the first contour drawing processing, head and tail thereof is the same as that of the corresponding polygon of the stereo model. Further, the size of the read contour drawing model is defined to be larger than that of the stereo model. Further, color of the contour drawing model is defined by color darker than that of the corresponding stereo model.

When it is determined that the contour drawing model is formed, there is carried out a processing of forming the contour drawing model (step S225). Similar to step S227, also when the contour drawing model is formed at this stage, according to the respective polygon of the contour drawing model, head and tail thereof is made to be the same as that of the corresponding polygon of the stereo model (refer to FIG. 30).

The size of the contour drawing model is formed to be larger than that of the corresponding stereo model. For example, there is formed, for example, the contour drawing model apexes of which are moved to enlarge in normal line directions of respective apexes of the stereo model. When the contour drawing model is larger than the stereo model, the contour line is drawn further boldly and when the contour drawing model is slightly larger than the stereo model, the contour line is drawn further finely.

Further, there may be formed the contour drawing model which is enlarged by moving faces of the stereo model in normal line directions of the respective faces. Further, there may be formed the contour drawing model which is enlarged by moving respective apexes of the stereo model centering on the reference position normally defined in the stereo model.

Further, at this time point, the size of the contour drawing model may be formed by a size the same as a size of the corresponding stereo model. In this case, after acquiring the contour drawing model by the contour drawing model acquiring processing, the contour drawing model is enlarged during a time period until the arranging matrix of the contour drawing model is set by the contour drawing model arranging processing, mentioned later. Or, when the arranging matrix of the contour drawing model is set by the contour drawing model arranging processing, the arranging matrix may be determined to include enlargement conversion thereof. Conversely, when the stereo model is arranged, the arranging matrix of the stereo model may be determined such that the arranging matrix of the stereo model includes contraction conversion.

Meanwhile, color of material of respective polygon of the contour drawing model is formed by color which is darker than color of material of the respective polygon of the corresponding stereo model. Further, at this time point, color of the formed contour drawing model may not be defined. Or, color of material of the respective polygon of the contour drawing model may be the same as color of material of the respective polygon of the corresponding stereo model. In this case, in the processing of drawing the contour drawing model, color of the contour drawing model is not considered and the contour drawing model is drawn by color separately defined such as black or a color of texture for expressing blur.

Next, it is determined whether texture for expressing blur is mapped to the contour drawing model (step S299). When the contour drawing model is formed at step S225, the determination is executed based on data of the corresponding stereo model. Meanwhile, when the contour drawing model is read at the step S227, the determination is executed based on data of the read contour drawing model. When it is determined that the texture for expressing blur is mapped, texture expressing blur is mapped to the contour drawing model at step S231. That is, respective apexes of the polygon are set with texture coordinates (U, V).

Further, as described above, the texture for expressing blur is texture having a pattern including a change in brightness or transparency and is a texture shown by, for example, FIG. 23. When it is determined that the texture for expressing blur is not mapped and when the processing of mapping the texture has been finished, the contour drawing model acquiring processing is finished.

(Contour Drawing Model Arranging Processing)

The arranging matrix of the stereo model and the contour drawing model for expressing the unprocessed character is set at step S25 of FIG. 20 and the processing of arranging the contour drawing model is carried out by the arranging matrix. Normally, the reference position of the contour drawing model is provided at a position in correspondence with the reference position of the stereo model. Further, the arranging matrix of the contour drawing model is set such that the reference position of the contour drawing model is arranged at the position of arranging the reference position of the respective model or at a vicinity thereof.

In this case, when the direction of the stereo model is changed, there is set the arranging matrix including rotation conversion such that the contour drawing model corresponds thereto. When the shape of the stereo model is changed, the deformation processing is carried out such that the contour drawing model corresponds thereto.

When the contour drawing model is provided with the size the same as that of corresponding stereo model at this stage, the contour drawing model is enlarged. Specifically, the arranging matrix of the contour drawing model is set such that respective apexes of the contour drawing model are subjected to enlargement conversion in accordance with a predetermined enlargement rate. Or, conversely, the stereo model may be contracted. That is, in this case, the arranging matrix of the stereo model is set such that respective apexes of the stereo model are subjected to contraction conversion in accordance with a predetermined contraction rate centering on the reference position of the stereo model.

Thereby, finally, the relatively large contour drawing model is arranged to include the stereo model. There can also be a case in which the contour drawing model does not completely include the stereo model by relationships of arrangement positions, directions, shapes or the like of the two models. However, even in such a case, the contour line is drawn with regard to included portions.

Further, it is not necessarily needed that the arranging matrix is set at this stage but respective elements necessary for apex conversion of arranged coordinates, directions, enlargement and contraction rate or the like may be fixed. Also in this case, actual apex conversion is carried out at a stage of a processing of drawing the respective models.

(Contour Drawing Model Drawing Processing)

Figure 32:
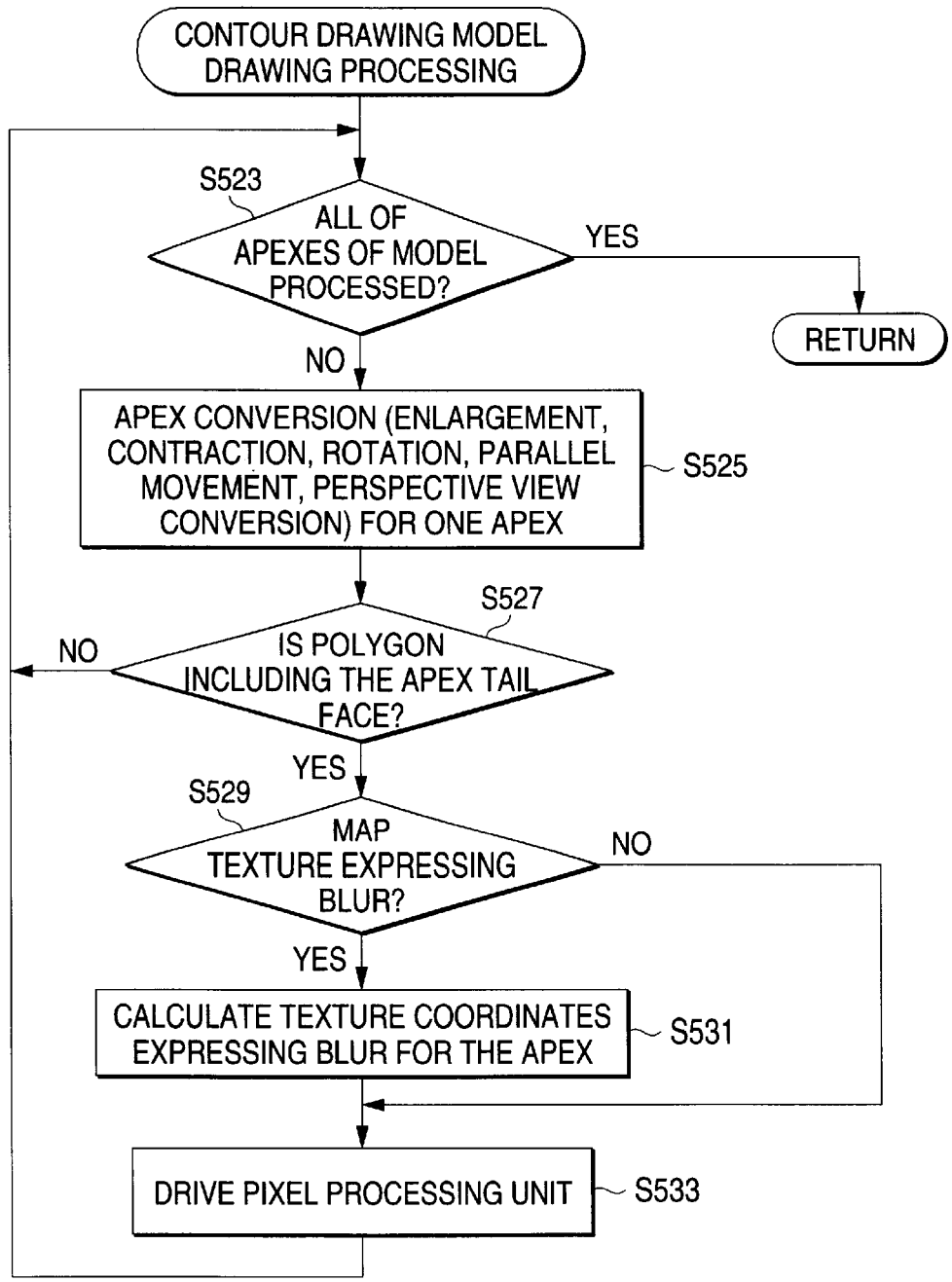
FIG. 32 is a flowchart of a contour drawing model drawing processing in the second contour drawing processing and Embodiment 2.

In FIG. 32 expressing a drawing processing flow of the contour drawing model, processings explained below are repeated until all of apexes of the contour drawing model have been processed (step S523). A first one of the repeated processing is apex conversion (enlargement, contraction, rotation, parallel movement, perspective view conversion) with regard to one apex (step S525). Further, with regard to initial two apexes, steps other than S525, S529 and S531 are not executed.

Caution is required here that light source calculation is not executed with regard to the contour drawing model. The reason is that the contour line is not related to a position of a light source and it is useless to carry out light source calculation (depending on cases, there is a case in which color of material of the contour drawing model is finally disregarded). When the size of the contour drawing model is the same as that of the stereo model, there also is a case in which the contour drawing model is subjected to enlargement conversion at this stage in accordance with the arranging matrix set by the arranging processing.

Further, a polygon (face) including the apex is subjected to a determining processing of whether the face is a tail face by normal determination reference (step S527). Although normally, only a head face constitutes a drawing object, in the case of the contour drawing model of the second contour drawing processing, the tail face constitutes the drawing object by normal determination reference. In the case of a triangular polygon, the determination of the step is carried out by to which direction a triangular polygon constituted by two apexes processed prior to the apex is directed.

As shown by FIG. 25, for example, by the normal determination reference, this side of paper face is defined as head face when respective apexes of a triangular polygon attached with apex numbers in the counterclockwise direction (so-to-speak right hand system). According to the second contour drawing processing, the reference of head and tail determination is reversed and it is determined that this side of paper face is head face when the apex numbers are attached in the clockwise direction. Only a face which is determined as head face by the reverted head and tail determination reference constitutes the drawing object. The reason is that as a result, the head face in the determination reference of second contour drawing processing, is determined as tail face by the normal determination reference.

Figure 33:
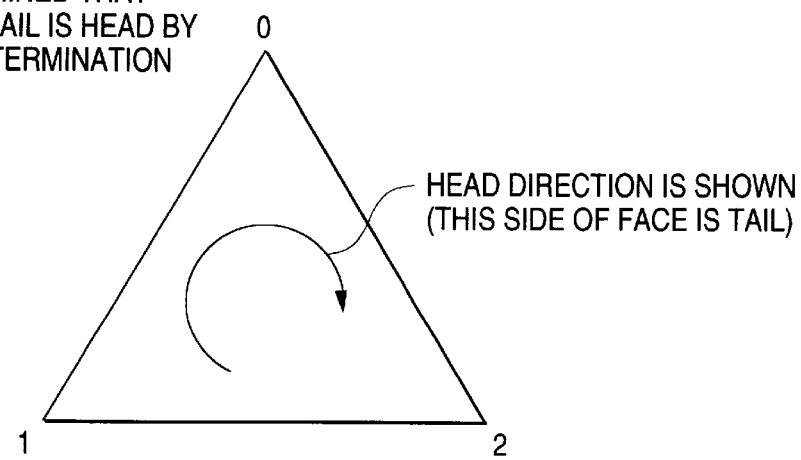
FIG. 33 is a schematic view for explaining head and tail determination of a triangular polygon in the second contour drawing processing.

FIG. 33 shows an example of a triangular polygon constituting a determination object. Respective apexes of the triangular polygon shown in FIG. 33 are provided with apex numbers of 0, 1, 2 in an order of upper side, lower left side and lower right side in the drawing. Although in the example of FIG. 33, this side of paper face constitutes head face by the way of attaching the apex numbers, according to the reverted determination reference, this side of paper face constitutes tail face. In the case of tail face by the reverted determination reference, the face is normally head face and accordingly, the face is out of the drawing object. Further, although according to the second contour drawing processing, at this stage, the head and tail determination is carried out, it is also possible to carry out the head and tail determination prior to the stage.

When the polygon (face) including the apex is the head face under the normal determination reference, the operation returns to step S523. When the polygon (face) including the apex is the tail face under the normal determination reference, there is carried out a processing of determining whether texture expressing blur is mapped (step S529). This signifies texture mapping with regard to the polygon. When the texture expressing the blur is mapped, there is executed a processing of calculating texture coordinates of the texture for expressing the blur (step S531). As texture perspective processing, in this case, by using Q=1/w ("w" designates a depth from the screen), there is carried out calculation of S=U'Q, T=V'Q. When the texture for expressing the blur is not mapped, the operation proceeds to step S533.

Further, the pixel processing unit 760 shown, for example, by FIG. 31 is driven (step S533). As described above, according to the pixel processing unit 760, data of respective apexes of a triangular polygon are interpolated and data of respective pixels at inside of the triangular polygon are formed. Data of respective apex are color of material, screen coordinate values and texture coordinate values when step S531 is executed. Further, data at respective pixel are color of material and pixel color when step S531 is executed. However, at this time point, it is also possible to set color of the contour line at respective apex by disregarding color of material. Further, it is also possible to set color of respective apex in consideration of color of material. The pixel processing unit 760 draws a display image by using data at respective pixels at inside of the formed triangular polygon. At this occasion, hidden face erasure is carried out by using the Z buffer.

(Stereo Model Drawing Processing)

The processing of drawing the stereo model is not changed from that of the first contour drawing processing (FIG. 28). That is, following processings are repeatedly executed until all of apexes of the stereo model have been processed (step S553). A first one of the repeated processings is apex conversion (enlargement, contraction, rotation, parallel movement, perspective view conversion) and light source calculation with regard to one apex (step S555). When the size of the contour drawing model is the same as the size of the stereo model, there also is a case in which the contour drawing model is relatively enlarged by contracting the stereo model. In this case, contraction conversion is executed at step S555.

Next, there is executed a processing of determining whether the polygon (face) including the apex is a head face (step S557). According to the determination, it is determined in the case of a triangular polygon by to which direction a triangular polygon constituted by two apexes processed before the apex is directed. When the polygon (face) including the apex is a tail face, the operation returns to step S553. When the polygon (face) including the apex is the head face, there is executed a processing of calculating texture coordinates of the apex (step S559). Further, the pixel processing unit 760 shown by, for example, FIG. 31 is driven (step S561).

As described above, data at respective pixels at inside of the triangular polygon are formed by interpolating data of the respective apexes of the triangular polygon by the pixel processing unit 760. Data of the respective apex are color of material, screen coordinate values and texture coordinate values. Data at the respective pixel are color of material and pixel color. Further, the pixel processing unit 760 draws a display image by using data at respective pixels at inside of the formed triangular polygon. At this occasion, hidden face erasure is carried out by using the Z buffer.

When the above-described processing is carried out, the stereo model for expressing a character of a game or the like is rendered as in a normal case and according to the contour drawing model introduced by the second contour drawing processing, a portion at inside of a face rearward from the stereo model which is not hidden by the stereo model is drawn and therefore, the portion is rendered as the contour line. According to the second contour drawing processing, the contour line can further simply be drawn by executing a processing substantially similar to that of a normal stereo model only by introducing the contour drawing model and reversing the head and tail determination of the contour drawing model. In this way, according to the second contour drawing processing, a game image attached with a contour line in accordance with operation input can be formed in real time.

1. Hardware Constitution

Figure 34:
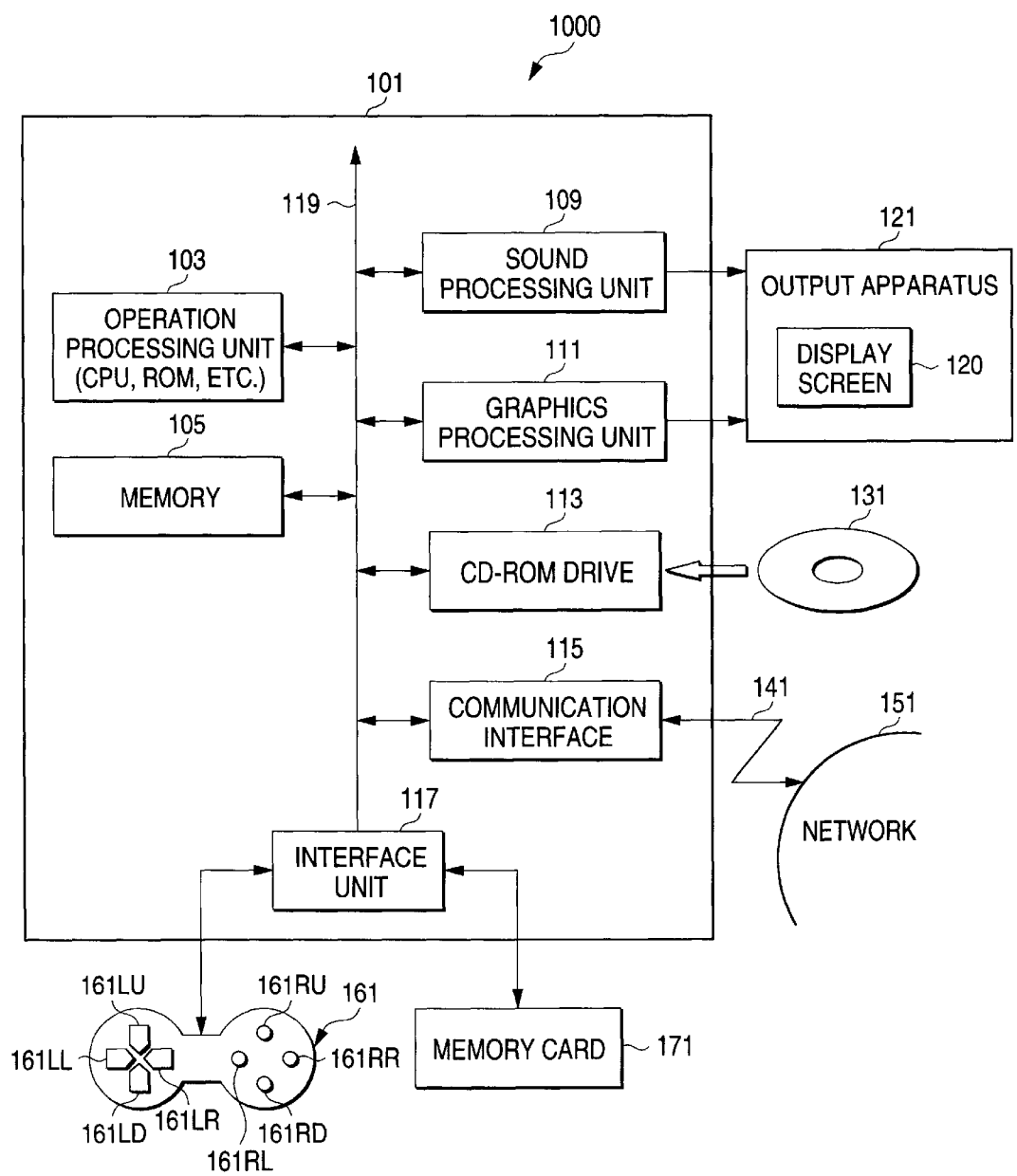
FIG. 34 is a block diagram showing an example of a game machine for household use executing a program according to the invention.

Next, FIG. 34 shows an example of a household game machine 1000 for executing a computer program when the invention is implemented by a computer program. The household game machine 1000 includes a household game main body 101 and the household game machine main body 101 includes an operation processing unit 103 connected to an inner bus 119, a memory 105, a sound processing unit 109, a graphics processing unit 111, a CD-ROM drive 113, a communication interface 115 and an interface unit 117.

The sound processing unit 109 and the graphics processing unit 111 of the household game machine main body 101 are connected to an output apparatus 121 having a display screen 120. Further, the CD-ROM drive 113 can be mounted with CD-ROM 131. The communication interface 115 is connected to a network 151 via a communication medium 141. The interface unit 117 is connected with a key pad 161 having operation buttons 166LL, 166LR, 166LU, 166LD, 166RL, 166RR, 166RU and 166RD and a memory card 171.

The operation processing unit 103 includes CPU, ROM and the like, executes a program stored to CD-ROM 131 and controls the household game machine 1000. The memory 105 is a work area of the operation processing unit 103. The memory card 171 is a memory area for holding data referred by a program. When a program executed by the operation processing unit 103 instructs to make sound output, the sound processing unit 109 interprets the instruction and outputs a sound signal to the output apparatus 121.

The graphics processing unit 111 outputs a signal for displaying to the display screen 120 of the output apparatus 121 in accordance with drawing instruction outputted from the operation processing unit 103. The CD-ROm drive 113 reads programs and data in CD-ROM 131. The communication interface 115 is connected to the network 151 via the communication medium 141 and communication with other computer is carried out. The interface unit 117 outputs an input from the key pad 161 to the memory 105 and the operation processing unit 103 interprets thereof and executes operation processing.

Programs and data according to the invention are initially stored in, for example, CD-ROM 131. The programs and data are read by the CD-ROM drive 113 in execution and is loaded to the memory 105. The operation processing unit 103 processes the programs and data according to the invention which are loaded to the memory 105 and outputs drawing instruction to the graphics processing unit 115. Further, intermediary data is stored to the memory 105. The graphics processing unit 111 carries out processing in accordance with the drawing instruction from the operation processing unit 103 and outputs a signal for displaying on the display screen 120 of the output apparatus 121.

Figure 35:
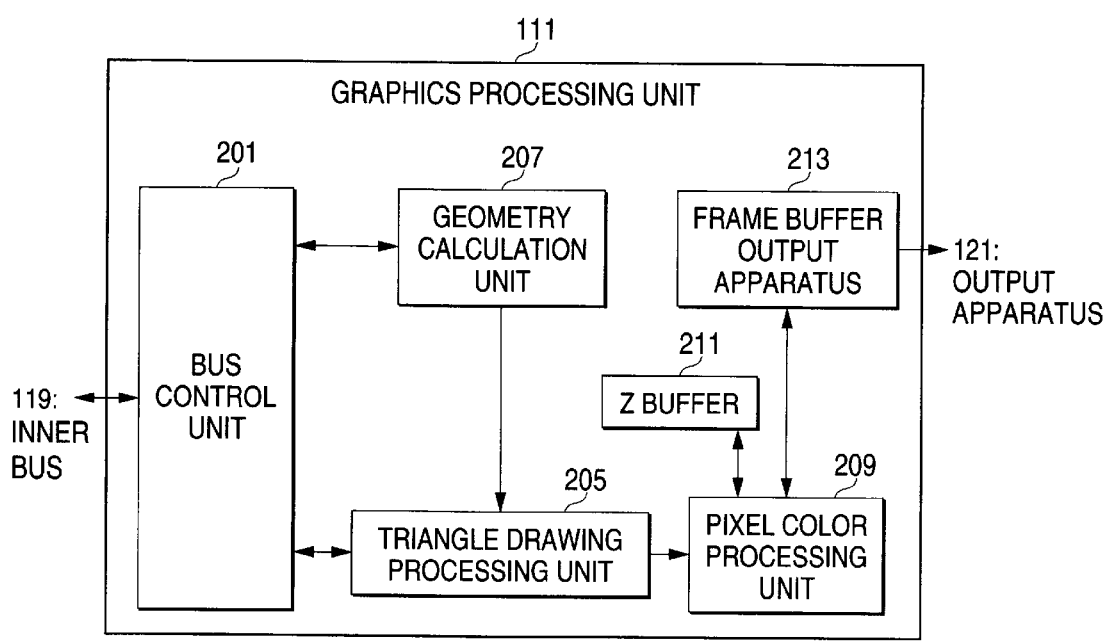
FIG. 35 is a block diagram showing an example of a graphics processing unit in FIG. 34.

Next, a detailed explanation will be given of an example of the graphics processing unit 111 shown in FIG. 34 in reference to FIG. 35. The graphics processing unit 111 includes a bus control unit 201 for exchanging with the inner bus 119, a geometry calculation unit 207 and a triangle drawing processing unit 205 for exchanging data with the bus control unit 201, a pixel color processing unit 209 for receiving data from the triangle drawing processing unit 205 and executing a processing, a Z buffer 211 for storing a Z value of respective pixel and used by the pixel color processing unit 209 and a frame buffer 213 for storing data for display screen from the pixel color processing unit 209. Further, a display signal from the frame buffer 213 is outputted to the output apparatus 121.

The bus control unit 201 of the graphics processing unit 111 receives drawing instruction outputted from the operation processing unit 103 via the inner bus 119 and outputs the drawing instruction to the geometry calculation unit 207 or the triangle drawing processing unit 205 in the graphics processing unit 111. Depending on cases, the bus control unit 201 also carries out a processing for outputting an output of the geometry calculation unit 207 or the triangle drawing processing unit 205 to the memory 105 via the inner bus 119. The geometry calculation unit 207 executes geometrical operation of coordinate transformation, light source calculation, rotation, contraction, enlargement or the like. The geometry calculation unit 207 outputs a result of geometrical operation to the triangle drawing processing unit 205.

The triangle drawing processing unit 205 interpolates data of respective apexes of a triangular polygon and forms data at the respective points at inside of the triangular polygon. The pixel color processing unit 209 writes a display image to the frame buffer 213 by using data at respective points at inside of the triangular polygon formed by the triangle drawing processing unit 205. At this occasion, hidden face erasure is carried out by using the Z buffer 211. According to the invention, particularly, the triangle drawing processing unit 205 forms an a value expressing transparency with regard to the respective point at inside of the triangular polygon and therefore, the pixel color processing unit 209 executes also a processing of storing color at the point to a predetermined position of the frame buffer 213 only when the α value falls in a constant range.

For example, when the operation processing unit 103 outputs drawing instruction for carrying out perspective view conversion and light source calculation to the graphics processing unit 111 with information with regard to a position and color of respective apex of the triangular polygon in the world coordinate system and light source as data, following processing are executed in the graphic processing unit 111.

The bus control unit 201 received with the drawing instruction, outputs the instruction to the geometry calculation unit 207. The geometry calculation unit 207 executes perspective view conversion and light source calculation and calculates a coordinate value (including Z value) in the screen coordinate system and color of the respective apex of the triangular polygon. The geometry calculation unit 207 outputs a result of the calculation to the triangle drawing processing unit 205. The triangle drawing processing unit 205 calculates the coordinate value (including Z value) at the respective pixel at inside of the triangular polygon by using the coordinate value (including Z value) and color at the respective apex of the triangular polygon. Further, the triangle drawing processing unit 205 outputs the coordinate value (including Z value) and color at the respective pixel to the pixel color processing unit 209.

The pixel color processing unit 209 reads current Z value of the pixel from the Z buffer 211 and compares the current Z value with the Z value outputted from the triangle drawing processing unit 205. When the outputted Z value is smaller than the current Z value, the pixel processing unit 209 stores the outputted Z value at a store position in the Z buffer 211 in correspondence with the pixel and stores color of the pixel at a store position in the frame buffer 213 in correspondence with the coordinate value of the pixel.

Respective embodiments shown below are executed by the household game machine 1000 shown by FIG. 34.

2. Embodiment 1

Embodiment 1 is a combination of the cel animation tone coloring processing and the first contour drawing processing. That is, as an example of a game image in the cel animation tone, a stereo model for expressing a character of a game or the like is attached with a contour line and colored in the cel animation tone.

Figure 36:
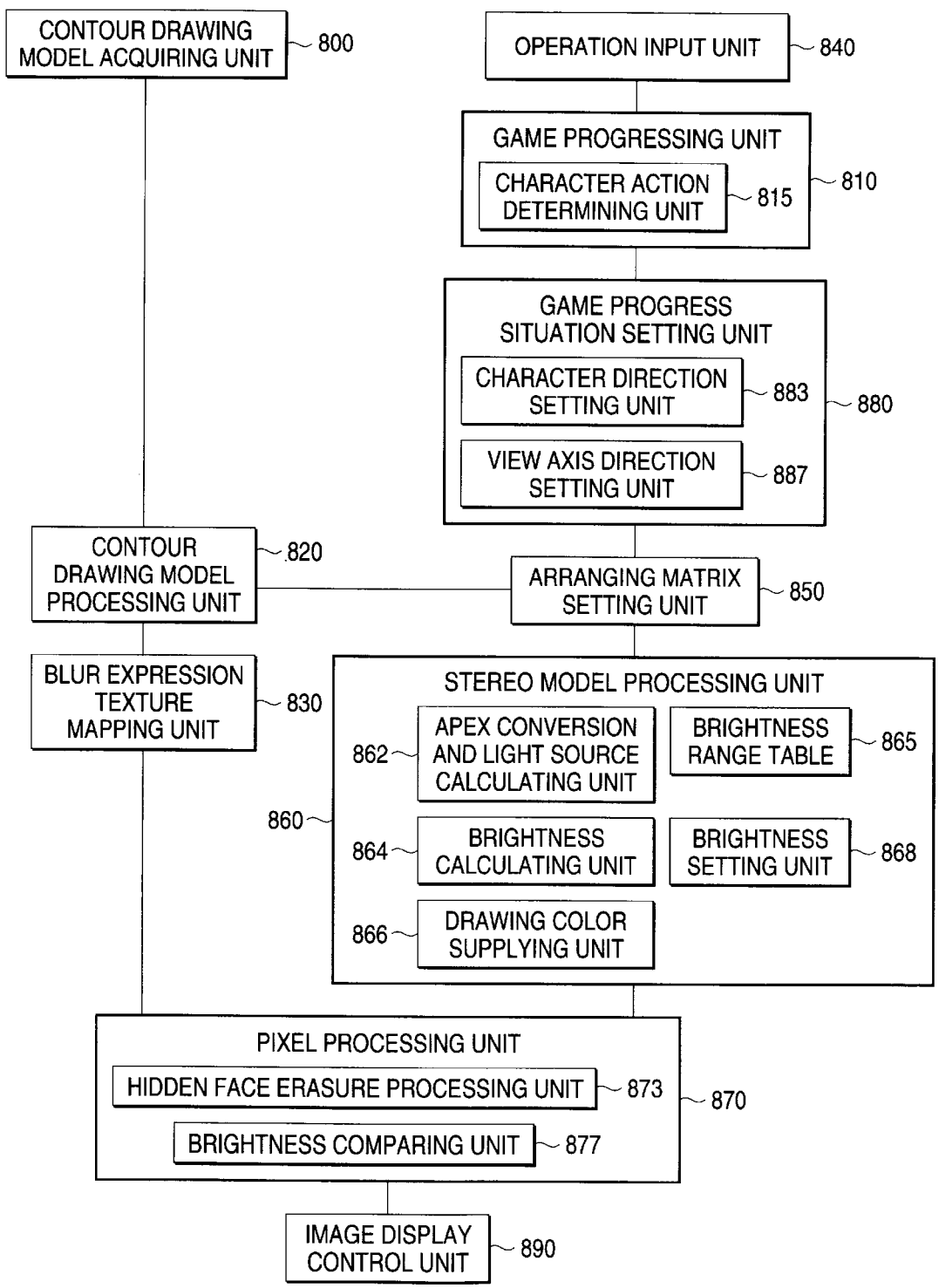
FIG. 36 is a functional block diagram of Embodiment 1.

As shown by FIG. 36, a game apparatus according to Embodiment 1 includes an operation input unit 840, a game progressing unit 810 including a character action determining unit 815, a game progress situation setting unit 880 including a character direction setting unit 883 and a view axis direction setting unit 887, an arranging matrix setting unit 850, a stereo model processing unit 860 including an apex conversion and light source calculating unit 862, a brightness calculating unit 864, a drawing color supplying unit 866, a brightness range table 865 and a brightness setting unit 868, a contour drawing model acquiring unit 800, a contour drawing model processing unit 820 receiving an arranging matrix from the arranging matrix setting unit 850, a blur expression texture mapping unit 830, a pixel processing unit 870 receiving data from the stereo model processing unit 860 and the blur expression texture mapping unit 830 and including a hidden face erasure processing unit 873 and a brightness comparing unit 877 and an image display control unit 890.

The operation input unit 840 is realized by, for example, the key pad 161 and the interface unit 117 of FIG. 34. The operation input unit 840 outputs operation information of button, lever or the like of the operation input unit 840 operated by a player of a game to the game progressing unit 810.

The game progressing unit 810 determines content of progressing the game such as action of a character, a change in a view point position, a change in a direction of a view axis, or movement of a position of a light source, a change in a direction of light ray or the like based on the information from the operation input unit 840 and gives instruction to the game progress situation setting unit. The character action determining unit 815 at inside of the game progressing unit 810 is provided with a function of particularly determining the action of the character based on the information from the operation input unit 840.

The game progress situation setting unit 880 calculates and sets a position, a direction and a shape of the character and the position of the view point or the direction of the view axis, the position of the light source, the direction of the light ray and an increase or a decrease of physical strength in accordance with the action of the character or the like in accordance with the content of progressing the game instructed by the game progressing unit 810. The character direction setting unit 883 at inside of the game progress situation setting unit 880 is provided with a function of particularly determining the direction with respect to the view point of the character in accordance with the content of progressing the game instructed by the game progressing unit 810. Meanwhile, the view axis direction setting unit 887 at inside of the game progress situation setting unit 880 is provided with a function of particularly setting the direction of the view axis in accordance with the content of progressing the game instructed by the game progressing unit 810.

The arranging matrix setting unit 850 executes a processing of determining an arranging matrix of a stereo model for expressing a character in accordance with position coordinates and a direction of the character and the position of the view point set by the game progress situation setting unit 880. The arranging matrix is a matrix for executing parallel movement, rotation and perspective view conversion of the stereo model.

When a contour drawing model which is large relative to the stereo model is acquired and a reference position of the contour drawing model is present at a position in correspondence with a reference position of the stereo model, the arranging matrix determined by the arranging matrix setting unit 850 can commonly be used by the stereo model processing unit 860 and the contour drawing model processing unit 820. When the arranging matrix can commonly be used, one store area for the arranging matrix may ba prepared for the respective character and accordingly, the operation is efficient.

However, there also is a case in which the arranging matrix is not commonly used or cannot commonly be used. In that case, an arranging matrix of the stereo model and an arranging matrix of the contour drawing model are formed and respectively stored to store areas. Further, when the arranging matrix cannot commonly be used as mentioned later, there also is the case in which one store area of an arranging matrix is prepared, immediately before using the arranging matrix in the stereo model processing unit 860 and the contour drawing model processing unit 820, a setting operation is carried out such that the arranging matrix of the stereo model includes contraction conversion or the arranging matrix of the contour drawing model includes enlargement conversion.

The contour drawing model acquiring unit 800 forms the contour drawing model in correspondence with the stereo model constituted by, for example, a triangular polygon. When the contour drawing model is previously formed, the contour drawing model acquiring unit 800 reads the contour drawing model which is previously formed and constituted by the triangular polygon. Further, according to respective polygon of the acquired contour model drawing model, head and tail thereof is reverse to that of corresponding polygon of the stereo model. Further, the contour drawing model is larger than the stereo model and is defined by predetermined coloring for a contour line. Further, although the contour drawing model must be large relative to the corresponding stereo model, there also is a case in which a size of the contour drawing model at this stage is the same as that of the stereo model. In this case, the contour drawing model is processed to be drawn to be large relative to the stereo model until the contour drawing model and the stereo model are drawn. Further, there also is a case in which color of the contour drawing model succeeds color of material of the corresponding stereo model as it is. In this case, color for drawing is separately designated.

The contour drawing model processing unit 820 executes apex conversion (enlargement, contraction, rotation, parallel movement, perspective view conversion) with regard to the respective apex of the contour drawing model by using the arranging matrix by the arranging matrix setting unit 850 and executes head and tail determination of the respective polygon of the contour drawing model. In the apex conversion, there is used the arranging matrix, mentioned above. Further, in this case, light source calculation is not executed. When the contour drawing model acquiring unit 100 acquires the contour drawing model having a size the same as that of the stereo model, the contour drawing model processing unit 820 executes apex conversion for enlarging the size of the contour line drawing model.

The blur expression texture mapping unit 830 executes a processing for mapping blur expression texture in the contour drawing model such that a drawn contour line becomes a blurred line as a result. The blur expression texture is a texture having a pattern including a change in brightness or transparency (refer to FIG. 23). Further, it is not necessarily needed that the contour line is blurred and accordingly, the processing of the blur expression texture mapping unit 830 is selectively executed.

The stereo model processing unit 860 executes a processing for providing coloring in the cel animation tone to the stereo model as an example of non-photorealistic rendering in cooperation with the pixel processing unit 870.

The apex conversion and light source calculating unit 862 of the stereo model processing unit 860 executes apex conversion (enlargement, contraction, rotation, parallel movement, perspective view conversion) with regard to respective apex of the triangular polygon constituting the stereo model arranged in a virtual three-dimensional space by using the arranging matrix by the arranging matrix setting unit 850 and executes light source calculation with regard to the respective apex of the triangular polygon subjected to apex conversion.

Further, the apex conversion and the light source calculating unit 862 of the stereo model processing unit 860 also carries out head and tail determination of the respective triangular polygon of the stereo model. Only a face directing a head face to the view point constitutes a drawing object.

The brightness calculating unit 864 of the stereo model processing unit 860 calculates brightness from color of the respective apex of the triangular polygon calculated by the apex conversion and the light source calculating unit 862. Normally, the apex conversion and the light source calculating unit 862 calculates color in the RGB system and therefore, the brightness calculating unit 864 calculates brightness Y by converting RGB into YIQ. The brightness of the respective apex of the triangular polygon is outputted to the pixel processing unit 870.

The brightness range table 865 is a table shown by, for example, FIG. 2 and is held in, for example, the memory 105. That is, the table paired with a threshold and reference brightness are set to three stages (levels) in this case such that a threshold 0.75 versus reference brightness 0.75, a threshold 0.5 versus reference brightness 0.50 and a threshold 0.00 versus reference brightness 0.25. Further, in this case, the brightness is provided with a real number value from 0 to 1. A range by an upper limit and a lower limit may be designated in place of the threshold (for example, refer to FIG. 3 ).

In reference to the brightness range table 865, the drawing color supplying unit 866 calculates drawing color in correspondence with the threshold. The drawing color in correspondence with the respective threshold is calculated by the reference brightness in correspondence with the threshold and information of color previously set to the respective triangular polygon of the stereo model. The drawing color supplying unit 866 outputs the calculated drawing color to the pixel processing unit 870.

Further, the drawing color supplying unit 866 may calculate the drawing color in execution, or may calculate drawing color previously and store the data. For example, when the brightness range table as shown by, for example, FIG. 2 is used, it is necessary to store three drawing color data of the respective polygon. For example, refer to FIG. 16.

The brightness range setting unit 868 selects one threshold of the brightness range table 865 and sets the threshold to the pixel processing unit 870. When the brightness range table 865 as shown by FIG. 2 is used as it is, the brightness range setting unit 868 sets the threshold one by one in turn from upper columns. When the range by the upper limit and the lower limit is designated in place of the threshold, the threshold can be selected and set at random.

When the triangular polygon constituting the drawing object of the contour drawing model is processed, the pixel processing unit 870 determines color of the respective pixel in the triangular polygon constituting the drawing object of the contour drawing model while executing the hidden face erasure processing by using the hidden face erasure processing unit 873 and outputs the color to the frame buffer 213.

Meanwhile, when the triangular polygon constituting the drawing object of the stereo model is processed, the pixel processing unit 870 firstly interpolates brightness at the respective apex of the triangular polygon outputted from the brightness calculating unit 864 and calculates brightness (brightness distribution in polygon) of the respective pixel at inside of the polygon. The calculation is carried out by, for example, the triangle processing unit 205 of FIG. 35.

Further, the brightness comparing unit 877 compares the brightness at the respective pixel with the threshold set by the brightness range setting unit 868. When the brightness at the pixel is equal to or larger than the threshold, the pixel processing unit 870 stores the pixel to the frame buffer 213 by drawing color based on the reference brightness in correspondence with the threshold. In the case of the drawing processing, the hidden face erasure processing is executed by using the hidden face erasure processing unit 873. When the brightness of the pixel is less than the threshold, the pixel is not stored to the frame buffer 213 at the stage. The drawing processing including the comparing processing is carried out by, for example, the pixel color processing unit 209 of FIG. 35. When the brightness range setting unit 868 sets all the thresholds of the brightness range table 865 to the pixel processing unit 870 and the pixel processing unit 870 executes a drawing processing with regard to all the pixels in the triangular polygon in correspondence therewith, inside of the polygon is painted to classify in three stages according to the example of FIG. 2. The processing is carried out with regard to all the triangular polygons of the stereo model.

According to the invention, there is a case in which hidden face erasure by the Z buffer 211 is utilized. Because, for example, when the stereo model is formed in a shape of a human being and the arm is disposed in front of the body, there is a case in which it is difficult to draw an accurate contour line when the Z buffer method is not used in view of a positional relationship between a face of the contour drawing object and a face of the stereo model.

In addition thereto, when the brightness range table 865 as shown by FIG. 2 is used as it is in the stereo model acquiring unit 860 and the pixel processing unit 870, the hidden face erasure by the Z buffer 211 is utilized. For example, in accordance with FIG. 2, the brightness which is equal to or larger than 0.75 is also equal to or larger than 0.5 and also equal to or larger than 0.0 and accordingly, it is necessary to set an upper limit value of the brightness range such that the drawing color is not painted overlappingly. When the brightness of a certain pixel is equal to or larger than 0.75, the pixel is drawn by drawing color in correspondence with the threshold 0.75 and the Z value of the pixel is stored to the Z buffer 211.

When the threshold becomes 0.5, the Z value of the pixel is read from the Z buffer 211 and is compared with the Z value of the same pixel to be written, however, naturally, these are the same and accordingly, the drawing color in correspondence with the threshold 0.5 is not written to the frame buffer 213 with regard to the pixel. The same goes with the threshold 0.0.

Further, the brightness at the apex of the polygon and the pixel at inside of the polygon, is normally dealt with as an attribute value of color (RGB) referred to as a used as transparency. Normally, the a value is defined in a range of 0–255 and accordingly, there is used an actual a value multiplied by brightness by 255. Therefore, the threshold (upper limit and lower limit values) of the brightness range table 865 may be a value in a range of 0–255.

Finally, the image display control unit 890 designates an area of the frame buffer to which the pixel processing unit 870 writes data for displaying on the display screen. The frame buffer is normally provided with two areas, one is used for display and other is used for writing. Further, when writing to the writing area has been finished, the writing area is used to switch to the display area and the display area is used to switch to the writing area. The image display control unit 890 controls the switching operation.

(Premise)

Also in Embodiment 1, there is a case in which data of the contour drawing model is previously formed and stored to CD-ROM 131 and the data is read from CD-ROM 131 in executing game. The example of data written to CD-ROM 131 shown by. FIG. 19 is the same as in Embodiment 1 at the level shown by FIG. 19.

The program area 132 is stored with a program for executing the invention by the household game machine 1000. A detailed description will be given of data of the content of the program.

The system data area 133 is stored with various data processed by the program stored to the program area 132, mentioned above. The image data area 134 is stored with data including the stereo model data 137 and the contour drawing model data 135. However, when the contour drawing model is formed in a contour drawing model acquiring processing, mentioned later, it is not necessary to store the contour drawing model data 135. Further, data of texture for expressing blur or the like is also stored to the image data area 134.

The contour drawing model data 135 is previously formed from the stereo model data 137 and is provided with following characteristic.

That is, the size of the contour drawing model is defined to be larger than that of the stereo model. Further, color of material of the respective polygon of the contour drawing mode is set to color having chroma the same as that of the stereo model and brightness lower than that of the stereo model. Further, there also is the case in which all of respective polygons are set to single color such as black. Further, there also is a case in which a setting for mapping texture for blur expression is carried out. Further, head and tail of the respective polygon of the contour drawing model is reversed. Specifically, the order by which apexes of the respective triangle constituting the contour drawing model is defined, is switched at one location.

Further, the size of the contour drawing model may be defined by a size the same as a size of the corresponding stereo model. In this case, after acquiring the contour drawing mode by a contour drawing model acquiring processing, mentioned later, the contour drawing model is enlarged during a time period until the arranging matrix of the contour drawing model is set by a contour drawing model arranging processing, mentioned later. Or, when the arranging matrix of the contour drawing model is set by the contour drawing model arranging processing, the arranging matrix may be determined such that the arranging matrix includes enlargement conversion. Conversely, in arranging the stereo model, the arranging matrix of the stereo model may be determined such that the arranging matrix of the stereo model includes contraction conversion.

Further, color of material of respective polygon of the contour drawing model may be the same as color of material of respective polygon of corresponding stereo model. In this case, in a processing of drawing the contour drawing model, mentioned later, for example, the contour drawing model is drawn by separately defined color such as black.

The sound data area 136 is stored with data for outputting sound from the sound output apparatus 125 by the sound processing unit 109 shown by FIG. 34.

Next, an explanation will be given of a processing flow with regard to Embodiment 1. The following processing is the processing which the operation processing unit 103 (FIG. 34) executes by controlling other elements in the household game machine main body 101.
(Total Processing Flow)

The processing flow at the level shown by FIG. 4 stays the same also in Embodiment 1. When a game is started, initial setting is carried out (step S2). The processing of the initial setting includes a processing of acquiring data of the stereo model expressing a character to be drawn. Further, Embodiment 1 also includes a processing of acquiring data of the contour drawing model. Next, there is carried out operation of button, lever or the like the key pad 161 by a player of the game (step S3). Further, there is carried out a game progress processing of determining content of progressing the game such as action of the character in which the character moves to the left or the character attacks or the like, a change in a view point position, a change in a direction of a view axis, or movement of a light source position, a change in a direction of light ray or the like based on information of the operation input at step S3 (step S4).

Thereafter, in accordance with the content of progressing the game determined at step S4, there is carried out a game progress situation setting processing for setting a game progress situation such as a position, a direction and a shape of the character, the position of the view point or the direction of the view axis, the position of the light source or the direction of the light ray and an increase or a decrease in physical strength in accordance with action of the character (step S5). Next, there is carried out a game image drawing processing for writing a game image in accordance with the game progress situation to the frame buffer 213 (step S6). A detailed description will be given later of the game image drawing processing.

Further, there is carried out a game image displaying processing for displaying the game image written to the frame buffer 213 by the game image drawing processing at step S6 (step S7). Normally, the frame buffer 213 is divided in two areas of a writing area and a display area and in this case, there is carried out a processing in which the writing area written with data by the game image drawing processing executed at step S6 is switched to the display area and the display area is switched to successive writing area.

Next, it is determined whether the game is over (step S8). In the game progress situation setting processing executed in accordance with the operation input at step S3 (step S5), when physical strength of a self character operated by a player of the game is reduced and set to 0, the condition of game over is satisfied. At step S8, the physical strength of the self character operated by the player of the game is inspected and it is determined whether the game is over. When the physical strength of the self character is not 0, the operation returns to step S3 and awaits for successive operation input. Meanwhile, when the game is over, the game is finished. Further, even when the game is over, since a result thereof is displayed on the display screen 120 at step S7, the player can grasp a final situation of the game from the display screen 120.

The processing flow showing an outline of the game image drawing processing (step S6 (FIG. 4)) shown in FIG. 20 stays the same also in Embodiment 1 at the level shown by FIG. 20. At first, there is carried out the background model drawing processing for drawing a background model for expressing a background portion in the game image (step S22). The drawing processing is the same as the conventional drawing processing and accordingly, a detailed description will not be given here. Further, the following steps S24 through S27 are repeated until all characters are drawn (step S23).

A first one of the repeated steps is a step of executing a deformation processing for deforming one unprocessed character (step S24). Motion of the unprocessed character in accordance with the operation input executed at step S3 of FIG. 4 is determined in the game progress processing at step S4. Further, there is executed the deformation processing of the stereo model for expressing the unprocessed character which is set in the game progress situation setting processing at step S6 executed in accordance therewith. Further, in Embodiment 1, there is also executed a deformation processing of the contour drawing model in accordance with the deformation processing of the stereo model.

A second one of the repeated steps is a step of setting an arranging matrix of the unprocessed character (step S25). The arranging matrix is a matrix for parallel movement, rotation and perspective view conversion of the stereo model for expressing the unprocessed character and is formed based on position coordinates and a direction of the character and the position of the view point set by the game progress situation setting processing at step S5. As described above, when the contour drawing model is already defined to be large relative to the stereo model and the reference position of the contour drawing model is the same as the reference position of the stereo model, the arranging matrix of the stereo model can be used also in the contour drawing model. When the condition is not satisfied, arranging matrices may be set to respectives of the stereo model and contour drawing model. Further, there also is the case in which there is set an arranging matrix including enlargement conversion with regard to the contour drawing model in the contour drawing model drawing processing, mentioned later. Further, there also is the case in which an arranging matrix including contraction conversion is set to the stereo model in the stereo model drawing processing.

Further, a third one of the repeated steps is a step of executing the contour drawing model drawing processing for drawing the contour drawing model (step S26). A description will be given later of the contour drawing model drawing processing.

A fourth one of the repeated steps is a step of executing the stereo model drawing processing for drawing the stereo model for expressing the unprocessed character (step S17). A description will be given later of the stereo model drawing processing.

After all the characters have been drawn, there is executed the window drawing processing for drawing a window for displaying capability of the character or the like to a user (step S28). The window drawing processing is also the same as the conventional drawing processing and therefore, a detailed description will not be given there.

The structure of the character data explained in reference to FIG. 21 stays the same as in the first contour drawing processing and includes a numerical value of maximum physical strength 10, a numerical value of current physical strength 12, a numerical value of attack force 14, a numerical value of defence force 16, coordinates (x, y, z) of reference position 18, rotational angles around X, Y and Z axes constituting direction 20 of character, pointer 22 to motion data, pointer 24 to model data of the stereo model and pointer 26 to model data of the contour drawing model. The character data is held, for example, in the memory 105. Further, for example, when the model data of the stereo model is stored to CD-ROM 131, the pointer 24 to the model data of the stereo model is a front address of the model data when the model data is read from CD-ROM 131 to the memory 105. Similarly, for example, when the model data 135 (FIG. 19) of the contour drawing model is stored to CD-ROM 131, the pointer 26 to the model data of the contour drawing model is a front address of the model data when the model data is read from CD-ROM 131 to the memory 105. Further, there is a case in which the model data of the contour drawing model is formed in execution and in that case, the front address of the memory 105 stored with the model data of the formed contour drawing model becomes the pointer 26.

Next, an explanation will given of a simple example (FIG. 7 and FIG. 8) with regard to progress of a game story in accordance with the operation input of the player of the game.

FIG. 7 shows the example of the display screen 120 displaying an image of the game for progressing a story while making the self character fight against the enemy character in a virtual three-dimensional space by operating the self character C101 by the player of the game. In this case, there is displayed the image of the self character C101 from the right front side. On the left side of the display screen, the enemy character 1 (C111) and the enemy character 2 (C113) emerge.

In this case, the position of the view point is determined by the game progress situation setting processing (step S5) in accordance with the positional relationship between the self character and the enemy character and the direction of the self character. Further, with regard to the respective characters, from the position of the view point, there are formed non-photorealistic images attached with contour lines and colored in the cel animation tone and the images are displayed on the display screen.

In accordance with the operation input of the player from the key pad 161, the self character attacks the enemy character. Meanwhile, the enemy character attacks the self character in accordance with a predetermined algorism.

FIG. 8 shows the display screen 120 when the self character C101 is moved in the left direction of the display screen by depressing the operation button 161LL of the key pad 161 by the player of the game.

In accordance with the operation input, action of the character of "move in the left direction of the display screen" is determined by the game progress processing (step S4 of FIG. 4). In accordance with the action of the character, the direction, the position and the shape of the character is determined by the game progress situation setting processing (step S5 of FIG. 4). According to the example of FIG. 8, the direction of the character is determined to the left direction relative to the display screen and the position of the character is moved similarly in the left direction relative to the display screen. Further, the shape of the character is set with a shape for expressing running motion.

In this way, even when the game progress situation of the direction, the position or the like of the character is changed, the character is drawn as an image in the cel animation tone drawn with the contour line.

(Contour Drawing Model Acquiring Processing)

The processing of acquiring the contour drawing model shown by FIG. 22 stays the same also in Embodiment 1. Here, firstly, it is determined whether the contour drawing model is to be formed (step S203). Because there are present a case in which the contour drawing model is previously prepared and a case in which the contour drawing model is formed at this stage. The determination is executed by determining, for example, whether the contour drawing model in correspondence with the stereo model is stored to CD-ROM 131.

When it is determined that the contour drawing model is not formed, data of the contour drawing model stored to CD-ROM 131 is read (step S207). According to the respective polygon of the contour drawing model, head and tail thereof is reversed to that of the corresponding polygon of the stereo model. Further, the size of the read contour drawing model is defined to be larger than that of the corresponding stereo model. Further, the color of the contour drawing model is defined by color darker than that of the corresponding stereo model.

When it is determined that the contour drawing model is formed, there is carried out the processing of forming the contour drawing model (step S205). Similar to step S207, also when the contour drawing model is formed at this stage, according to the respective polygon of the contour drawing model, head and tail thereof is reverse to that of the corresponding polygon of the stereo model.

The size of the contour drawing model is formed to be larger than that of the corresponding stereo model. For example, there is formed the contour drawing model which is enlarged by moving apexes thereof in normal line directions of respective apexes of the stereo model. When the contour drawing model is larger than the stereo model, the contour line is drawn further boldly and when the contour drawing model is slightly larger than the stereo model, the contour line is drawn further finely.

Further, there may be formed the contour drawing model which is enlarged by moving faces thereof in normal line directions of respective faces of the stereo model. Further, there may be formed the contour drawing model which is enlarged by moving respective apexes of the stereo model centering on the reference position normally defined in the stereo model.

Further, at this time point, the contour drawing model may be formed such that the size of the contour drawing model is the same as the size of the corresponding stereo model. In this case, after acquiring the contour drawing model by the contour drawing model acquiring processing, the contour drawing model is enlarged during a time period until the arranging matrix of the contour drawing model is set by the contour drawing model arranging processing, mentioned later. Or, when the arranging matrix of the contour drawing model is set by the contour drawing model arranging processing, the arranging matrix may be determined such that the arranging matrix includes enlargement conversion. Conversely, when the stereo model is arranged, the arranging matrix of the stereo model may be determined such that the arranging matrix of the stereo model includes contraction conversion.

Meanwhile, color of material of the respective polygon of the contour drawing model is formed by color darker than color of material of the respective polygon of the corresponding stereo model. Further, at this time point, the color of the formed contour drawing model may not be defined. Or, color of material of the respective polygon of the contour drawing model may be the same as color of material of the respective polygon of the corresponding stereo model. In this case, in the processing of drawing the contour drawing model, color of the contour drawing model is not considered, for example, the contour drawing model is drawn by separately defined color of black or the like or color of texture for expressing blur.

Next, it is determined whether texture for expressing blur is mapped in the contour drawing model (step S209). When the contour drawing model is formed at step S205, the determination is executed based on data of the corresponding stereo model. Meanwhile, when the contour drawing model is read at step S207, the determination is executed based on data of the read contour drawing model. When it is determined that texture for expressing blur is mapped, texture for expressing blur is mapped in the contour drawing model at step S211. That is, texture coordinates (U, V) are set at respective apex of the polygon.

Further, as described above, texture for expressing blur is provided with a pattern including a change in brightness or transparency. An example shown in FIG. 23 of texture including a change in brightness is provided with a pattern in which white hatched lines are finely drawn in a black matrix. Brightness at the black portion is low, brightness at the white portion is high and accordingly, the texture shown by FIG. 23 includes the change in brightness. Thereby, blur of the contour line is expressed and the contour line further in the hand writing tone is drawn.

When it is determined that texture for expressing blur is not mapped and when the processing of mapping the texture has been finished, the operation processing unit 103 finishes the contour drawing model acquiring processing.

(Contour drawing model arranging processing)

At step S25 of FIG. 20, the arranging matrix for the stereo model and the contour drawing model for expressing the unprocessed character is set and there is carried out the processing of arranging the contour drawing model by the arranging matrix. The reference position of the contour drawing model is provided at a position in correspondence with the reference position of the stereo model. Further, the arranging matrix of the contour drawing model is set such that the reference position of the contour drawing model is arranged at the reference position of the stereo model or a vicinity thereof.

At this occasion, when the direction of the stereo model is changed, the contour drawing model is set with the arranging matrix including rotation conversion in correspondence therewith. When the shape of the stereo model is changed, a deformation processing carried out such that the contour drawing model corresponds therewith.

When the contour drawing model is provided with a size the same as that of the stereo model at this stage, the contour drawing model is enlarged. Specifically, the arranging matrix of the contour drawing model is set such that respective apexes of the contour drawing model are subjected to enlargement conversion in accordance with a predetermined enlargement rate centering on the reference position of the contour drawing model. Or, conversely, the stereo model may be contracted. That is, in this case, the arranging matrix of the stereo model is set such that respective apexes of the stereo model are subjected to contraction conversion in accordance with a predetermined contraction rate centering on the reference position of the stereo model.

Thereby, finally, the relatively large contour drawing model is arranged to include the stereo model. There can occur also a case in which the contour drawing model does not completely include the stereo model depending on a relationship of arranging positions, directions, shapes or the like of the two models. However, also in such a case, the contour line is drawn with regard to included portions.

Further, at this stage, it is not necessarily needed to set the arranging matrix but respective elements necessary for apex conversion of arranged coordinates and direction and enlargement or contraction rate or the like may be fixed. Also in this case, actual apex conversion is executed at the stage of the processing of drawing the respective models.

(Contour Drawing Model Drawing Processing)

The drawing processing flow of the contour drawing model shown by FIG. 24 can also be used in Embodiment 1. In FIG. 24, processings explained below are repeatedly carried out until all of apexes of the contour drawing model have been processed (step S503). A first one of the repeatedly executed processings is apex conversion (enlargement, contraction, rotation, parallel movement, perspective view conversion) processing with respect to one apex (step S505). Here, the arranging matrix calculated at step S25 (FIG. 20) is used in the apex conversion. Further, with regard to initial two apexes, steps other than steps S505, S509 and S511 are not executed.

For example, the processing is executed by the geometry calculation unit 207 instructed by the operation processing unit 103. In this case, the geometry calculation unit 207 does not execute light source calculation with regard to the contour drawing model. When the size of the contour drawing model is the same as that of the stereo model, there also is the case in which in accordance with the arranging matrix set by the arranging processing, at this stage, the contour drawing model is subjected to enlargement conversion.

Further, there is carried out the processing of determining whether the polygon (face) including the apex is a head face (step S507). With regard to the head and tail determination, a description has been given in the first contour drawing processing and therefore, an explanation thereof will be omitted. Further, it is also possible to carry out the head and tail determination prior to the stage.

Further, when the polygon (face) including the apex is the tail face, the operation returns to step S503. When the polygon (face) including the apex is the head face, it is determined whether texture expressing blur is mapped (step S509).

This signifies texture mapping with regard to the polygon. When texture expressing blur is mapped, there is calculated texture coordinates of texture for expressing blur with respect to the apex (step S511). When the texture mapping is carried out, the apex of the polygon is already designated with texture coordinates (U, V), however, when the polygon is arranged obliquely to the screen, there is a case in which the texture is displayed to distort on the screen.

In order to avoid the distortion, there is carried out texture perspective processing. According to the texture perspective processing, for example, by using Q=1/w ("w" designates a depth from the screen) new texture coordinates (S, V) are calculated. Notations S and V can be calculated by, for example, setting S=U'Q, T=V'Q. The calculated (S, V) are set as texture coordinates in correspondence with apex of the polygon. When texture for expressing blur is not mapped, the operation proceeds to step S513.

Further, for example, the triangle drawing processing unit 205 and the pixel color processing unit 209 (FIG. 35) included in the pixel processing unit 870 are driven (step S513). As described above, the triangle drawing processing unit 205 interpolates data of respective apex of the triangular polygon and forms data at the respective pixel at inside of the triangular polygon. Data of the respective apex are color of material, screen coordinate values, and texture coordinate values when step S511 is carried out. Data at the respective pixel are color of material and pixel color when step S511 is executed.

However, it is also possible to set color of the contour line at respective apex by disregarding color of material. Further, it is also possible to set color of the respective apex in consideration of color of material. In either of th cases, color of the contour line is set to color darker than color for drawing the stereo model by the stereo model drawing processing, mentioned later. Further, when the brightness range table as shown by FIG. 2 is used by the stereo model drawing processing, the color of the contour line is set by color darker than color calculated based on the lowest reference brightness 0.25. The pixel color processing unit 209 writes the display image to the frame buffer 213 by using data at the respective pixel of the triangular polygon formed by the triangle drawing processing unit 205. At this occasion, the hidden face erasure is carried out by using the Z buffer 211.

Although there is shown the example of using the Z buffer 211 in the hidden face erasure, there may be executed a hidden face erasure processing such as the Z sort method in which the Z buffer 211 is not used with regard to a simple model as shown by FIGS. 13A and 13B. However, in the case of a further complicated model in which, for example, the hand of a person is arranged in front of the body or the like, when the hidden face erasure using the Z buffer 211 is not carried out, it is difficult to accurately draw the contour line.

(Stereo Model Drawing Processing)

The flow of the processing of drawing the stereo model shown in FIG. 9 can also be used in Embodiment 1. First, initial setting is executed (step S603). In the initial setting, a brightness range table in correspondence with the stereo model (for example, FIG. 2 or FIG. 3) is acquired. Next, there is carried out apex conversion (enlargement, contraction, rotation, parallel movement, perspective view conversion) and light source calculation with regard to one apex (step S605). The step is executed by, for example, the geometry calculation unit 207 by instruction from the operation processing unit 103. Data of the stereo model is stored to, for example, CD-ROM 131 and data previously read by the memory 105 is used.

Apex conversion is executed by using the arranging matrix set at step S25 of FIG. 20. However, when the contour drawing model is provided with a size the same as that of the stereo model, there also is a case in which the contour drawing model is relatively enlarged by contracting the size of the stereo model. In this case, at step S605, contraction conversion is executed. Further, the stereo model can simply be contracted by moving apexes thereof toward center of the stereo model along normal lines thereof.

Further, according to light source calculation in the stereo model drawing processing described above in reference to FIG. 9, there are two methods, that is, (A) a method in consideration of color of material defined at the polygon and (B) a method not in consideration of the color of the material and both of them can be used also in Embodiment 1. However, an explanation thereof will be omitted here.

Next, it is determined whether the polygon including the apex directs its surface to a camera (step S607). The determination is executed in the case of triangular polygon by to which direction the triangular polygon constituted by the apex and two apexes processed therebefore is directed. In the determination, there can be used the method explained in the processing of drawing the contour drawing model. Further, although according to the stereo model drawing processing, head and tail determination is carried out at this stage, it is also possible to carry out the head and tail determination prior to the stage.

When the polygon (face) including apex is tail face, the operation returns to step S605. When the polygon (face) including the apex is head face, there is calculated brightness at the apex subjected to apex conversion and light source calculation (step S609). In calculating the brightness, the YIQ conversion is executed.

After step S609, there is calculated drawing color of the polygon including the apex subjected to apex conversion and light source calculation (step S611). The drawing color of the polygon is calculated from the reference brightness in correspondence with the brightness range stored to the brightness range table and the color of the polygon.

When there are three of the reference brightness (Tn) (T1, T2, T3) three of the drawing color are calculated. Further, when the color of the polygon is not held as color of the YIQ system, that is, when the color of the polygon is held as color of the RGB system, there is executed a calculation of converting from RGB to YIQ by the conversion matrix, shown above.

Next, one of the brightness ranges of the brightness range table is selected (step S613). Further, although in Embodiment 1, there is used the brightness range table shown by FIG. 2 is used, the brightness range table as shown by FIG. 3 can also be used. The table is held in, for example, the memory 105. When such a brightness range table is used, the brightness range including the upper limit and the lower limit can be selected and set at random. When a comparison between the brightness of the respective pixel and the two brightness values of the upper limit and the lower limit cannot simply be carried out in the brightness comparison processing, explained below, the brightness range is selected in turn from upper columns of FIG. 3. Further, in this case, the processing is carried out only by the lower limit value.

Thereafter, the brightness at the apex of the polygon is interpolated, and the brightness (brightness distribution in polygon) at the respective pixel at inside of the polygon is calculated. Although color of the apex is also interpolated, all of the three apexes are provided with the same drawing color and therefore, the result remains the same even after the interpolation. Further, when the brightness at the pixel falls in a selected brightness range, the pixel is drawn by the drawing color in correspondence with the selected brightness range (step S615). The interpolation processing of the brightness and the drawing processing of the respective pixel are executed by, for example, instruction from the calculation processing unit 103 by the triangle drawing processing unit 205 in FIG. 35. The comparing processing of whether the brightness at the respective pixel falls in the selected brightness range, is executed, for example, by the pixel color processing unit 209. The steps S613 and S615 are repeated until the processing has been carried out with respect to all of the brightness ranges (step S617).

For example, when the pixel color processing unit 209 cannot deal with the two brightness values of the upper limit and the lower limit, by also using the Z buffer 211, the same effect can be achieved. Although the Z buffer 211 is used for hidden face erasure, according to Embodiment 1, by also using the Z buffer 211, an effect similar to that in the case of comparing with the upper limit value of the brightness is achieved. The processing using the Z buffer is carried out by the pixel color processing unit 209 by, for example, instruction from the calculation processing unit 103.

The above steps S605 through S617 are repeated until the processing is carried out with respect to all the apexes of the stereo model and, as a result, are repeated until the processing is carried out with respect to all of the polygons (step S619).

(Stereo Model Drawing Processing (Part 2))

The flow of the second stereo model processing shown by FIG. 15 can also be used in Embodiment 1. In FIG. 15, firstly, initial setting is carried out (step S633). According to the initial setting, there is acquired the brightness range table in correspondence with the stereo model (for example, FIG. 2 or FIG. 3). Further, the drawing color of the stereo model stored to CD-ROM 131 is read by the memory 105. Next, there is carried out apex conversion (enlargement, contraction, rotation, parallel movement, perspective view conversion) and light source calculation with regard to one apex (step S635). The step is executed by the geometry calculation unit 207 by instruction from the operation processing unit 103. Data of the stereo model is stored to, for example, CD-ROM 131 and data previously read by the memory 105 is used.

Enlargement, contraction, rotation, parallel movement or perspective conversion is carried out by using the arranging matrix set at step S25 of FIG. 20. The step is executed by the geometry calculation unit 207 by instruction from, for example, the calculation processing unit 103. However, when the contour drawing model is provided with a size the same as that of the stereo model, there is a case in which the contour drawing model is relatively enlarged by contracting the stereo model. In this case, at step S635, contraction conversion is executed. Further, the size can simply be contracted by moving respective apexes toward the center of the stereo model along normal lines thereof.

Further, the two methods of light calculation described in another stereo model drawing processing are applicable as they are also in the stereo model drawing processing (part 2).

Next, it is determined whether the polygon (face) including the apex is head face (step S637). The determination is executed in the case of a triangular polygon by to which direction the triangular polygon constituted by two apexes processed prior to the apex is directed. In the determination, there can be used the method explained in the processing of drawing the contour drawing model. Further, although according to the stereo model drawing processing (part 2), at this stage, head and tail determination is carried out, it is also possible to carry out the head and tail determination prior to the stage.

When the polygon (face) including the apex is the tail face, the operation returns to step S635. When the polygon (face) including the apex is the head face, there is calculated brightness at the apex subjected to apex conversion and light source calculation (step S639). In calculating the brightness, the YIQ conversion is executed.

Further, drawing color of the polygon including the apex subjected to apex conversion and light source calculation is read from the memory 105 (step S641). Although data of the read drawing color is previously calculated, the calculation method in previously calculating the data may be either of the two methods explained in another stereo model drawing processing or may be other method. Further, the drawing color may be defined one by one.

Next, one of the brightness ranges of the bright range table is selected (step S643). Further, although according to the embodiment, the brightness range table shown by FIG. 2 is used, the brightness range table as shown by FIG. 3 can also be used. When such a brightness range table is used, the brightness range including the upper limit and the lower limit can be selected and set at random. When the comparison between the brightness of the respective pixel and the two brightness values of the upper limit and the lower limit cannot be simply carried out in the brightness comparing processing, explained below, the brightness range is selected, for example, in turn from upper columns of FIG. 3. Further, in this case, the processing is carried out only by the upper limit value.

Thereafter, the brightness at the apex of the polygon is interpolated and the brightness at the respective pixel at inside of the polygon (brightness distribution in the polygon) is calculated. Although color of the apex is also interpolated, all of the three apexes are provided with the same drawing color and accordingly, even when the color of the apex is interpolated, the result remains the same. Further, when the brightness of the pixel falls in the selected brightness range, drawing is carried out by the drawing color in correspondence with the selected brightness range (step S645). The processing of interpolating the brightness is carried out by, for example, the triangle drawing processing unit 205 in FIG. 35. The comparison processing of whether the brightness at the respective pixel falls in the selected brightness range, is executed by, for example, the pixel color processing unit 209. The steps S643 and S645 are repeated until the processing is carried out with regard to all of the presence ranges (step S647).

For example, when the pixel color processing unit 209 cannot deal with the two brightness values of the upper limit and the lower limit, by also using the Z buffer 211, the same effect can be achieved. Although the Z buffer 211 is used in hidden face erasure, according to the embodiment, by also using the Z buffer 211, an effect similar to that in the case of comparing with the upper limit value of the brightness is achieved.

Further, there also is the case in which a value of the smallest lower value of the brightness range table is not 0.0. In order to eliminate a portion which is not colored at all in the polygon, in repeating step S647 of FIG. 15, step S645 is executed by setting the lower limit value to 0.0 at a final repetition.

As described above, steps S635 through S647 are repeated until the processing is carried out with respect to all the apexes of the stereo model and, as a result, repeated until the processing is carried out with respect to all the polygons (step S649).

When the above-described processing is executed, all of the polygons of the stereo model are painted to classify by predetermined stages of brightness and with regard to the stereo model, the image in the cel animation tone can be provided. Further, according to the contour drawing model introduced in Embodiment 1, a portion of a face rearward from the stereo model which is not hidden by the stereo model, is drawn and accordingly, the portion is rendered as the contour line. According to Embodiment 1, in drawing the contour line, the contour line can simply be drawn by executing the processing substantially to a normal rendering processing by only introducing the contour drawing model.

Figure 37:
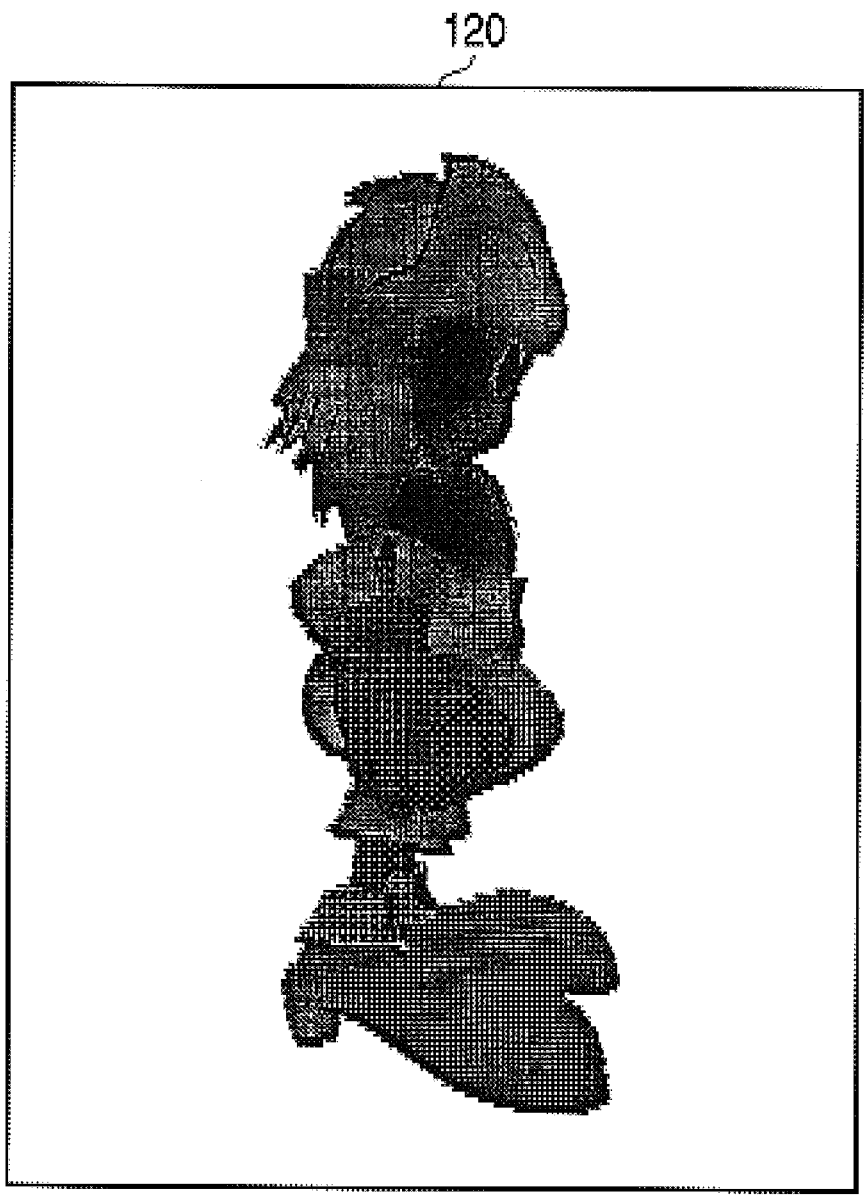
FIG. 37 shows a display example of only a self character shown in FIG. 7 in a state directed to the right direction of a display screen 120.

In FIG. 37, there is shown an example of the display screen 120 when only self character is drawn in the game image drawing processing of Embodiment 1. In FIG. 37, there is drawn the self character in a state in which the self character is directed to the right direction of the display screen.

When the player depresses the operation button 166LL from the state in which the self character is directed to the right direction of the display screen, in response thereto, it is determined that the self character moves in the left direction of the display screen and there is carried out a processing in which the self character is directed gradually in the left direction and moves in the left direction.

Figure 38:
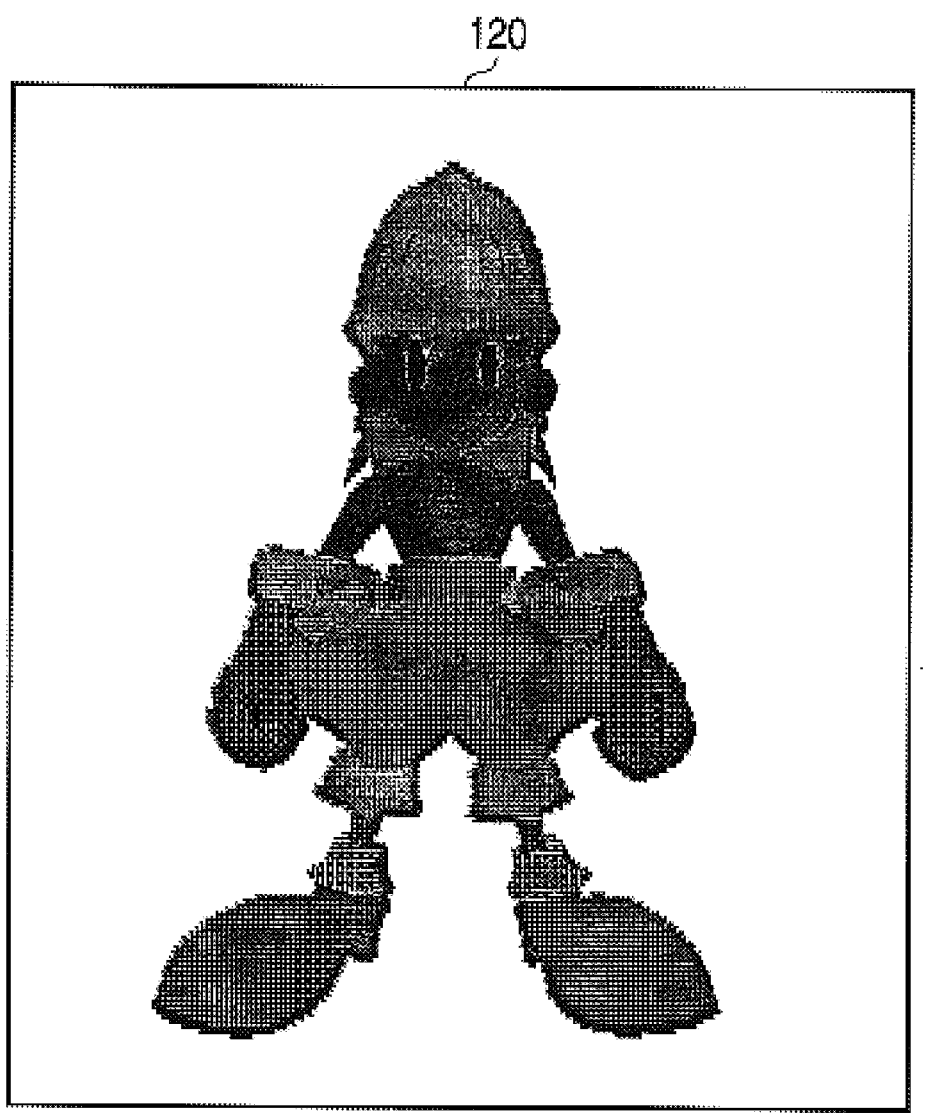
FIG. 38 shows a display example in which the self character is in the midst of changing a direction by moving the rightfoot rearwardly to direct in the left direction of the display screen 120.

FIG. 38 shows an example of the display screen 120 in which the self character is in the midst of changing the direction by drawing the rightfoot rearwardly to be directed to the left direction of the display screen from the state shown by FIG. 37. According to the example, the self character rotates by way of the direction directed to the front side of the display screen and accordingly, according to the display screen shown by FIG. 38, there is shown a state in which the character is directed to the front side of the display screen.

Figure 39:
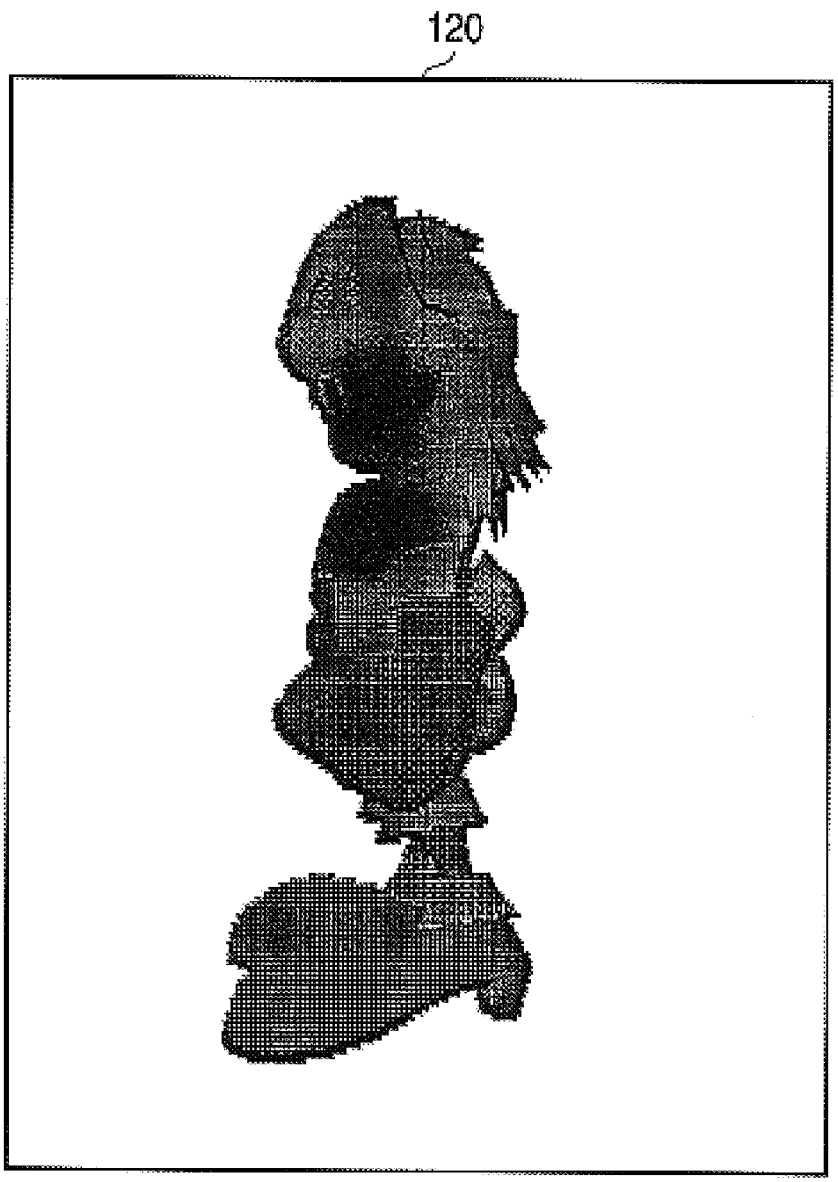
FIG. 39 shows a display example in a state in which the self character is directed to the left direction of the display screen by moving the leftfoot from a state shown by FIG. 38.

FIG. 39 shows an example of the display screen 120 in a state in which the self character is directed to the left direction of the display screen by moving the leftfoot from the state shown by FIG. 38. In this way, even when the self character moves in accordance with the operation input, the game image in the cel animation tone can be provided in real time.

Figure 40:
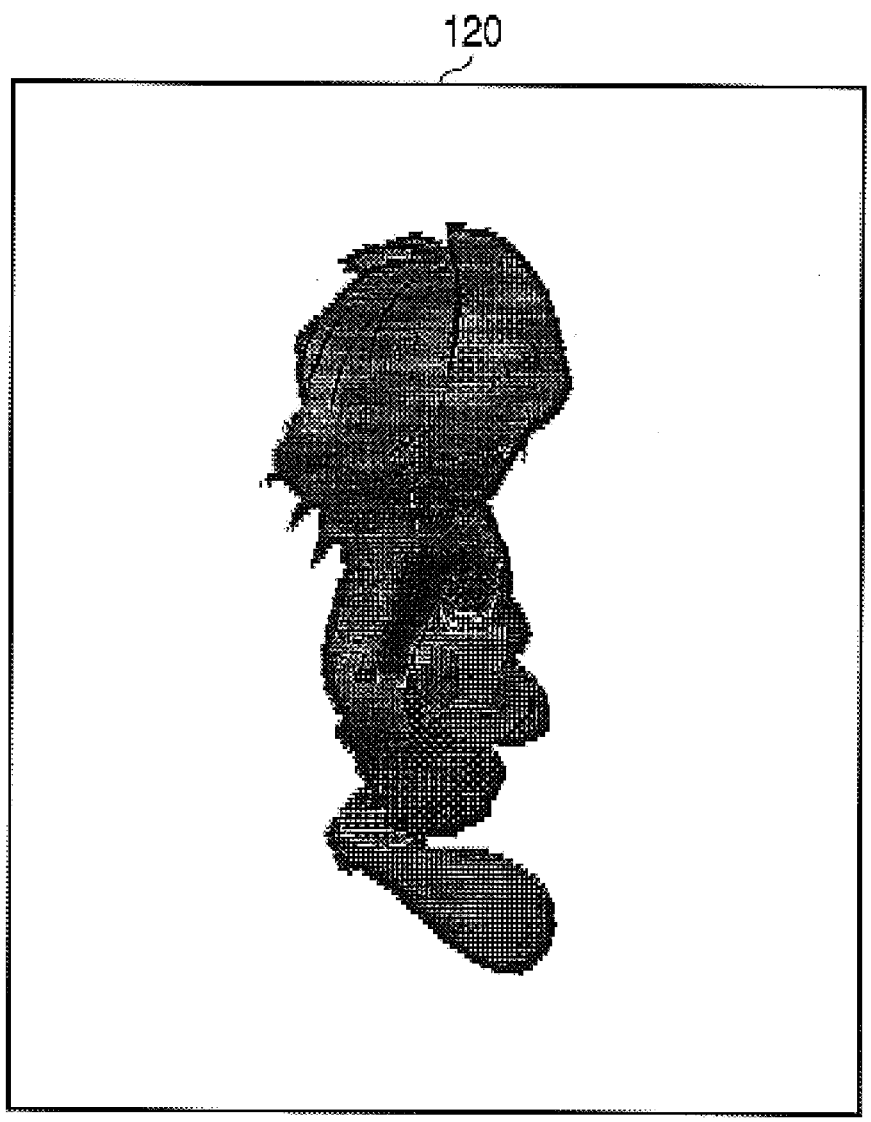
FIG. 40 shows a display example of a state in which a camera is moved upwardly in response to operation of an operation button by a player from the state of FIG. 37.

Meanwhile, FIG. 40 shows an example of the display screen 120 in a state in which a camera is moved upwardly in response to operation of the operation button 166RU by the player from the state of FIG. 37. The image of the self character from above is displayed.

Figure 41:
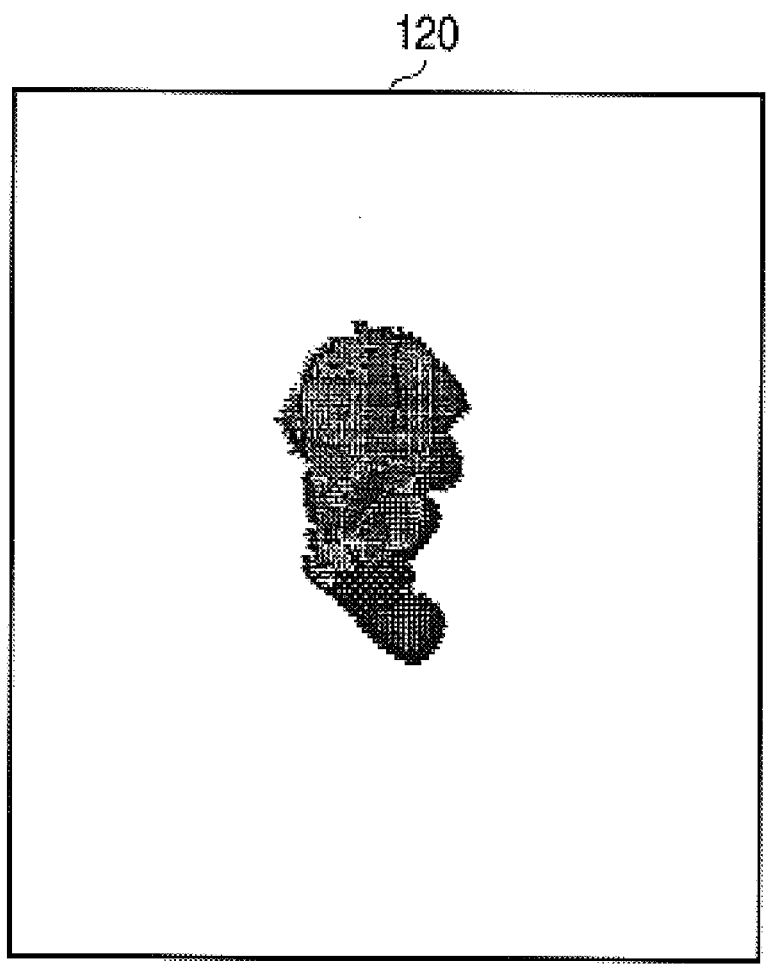
FIG. 41 shows a display example of a state in which the player further operates the operation button to thereby move the camera further upwardly from the state of FIG. 40.

FIG. 41 shows an example of display screen 120 in a state in which the camera is moved further upwardly by further operating the operation button 166RU by the player from the state of FIG. 40. Further, since a distance between the self character and the camera is increased, the self character is displayed comparatively smaller than in FIG. 37 and FIG. 40. In this way, when the camera is moved in response to the operation input, that is, even when the view point is switched, the game image in the cel animation tone can be provided in real time.

In this way, by using the CG technology, the game image in the self animation tone attached with the contour line in accordance with the operation input can be provided in real time.

3. Embodiment 2

In Embodiment 2, the cel animation tone coloring processing and the second contour drawing processing are combined. That is, the stereo model for expressing a character of a game or the like is attached with a contour line and colored in the cel animation tone.

Figure 42:
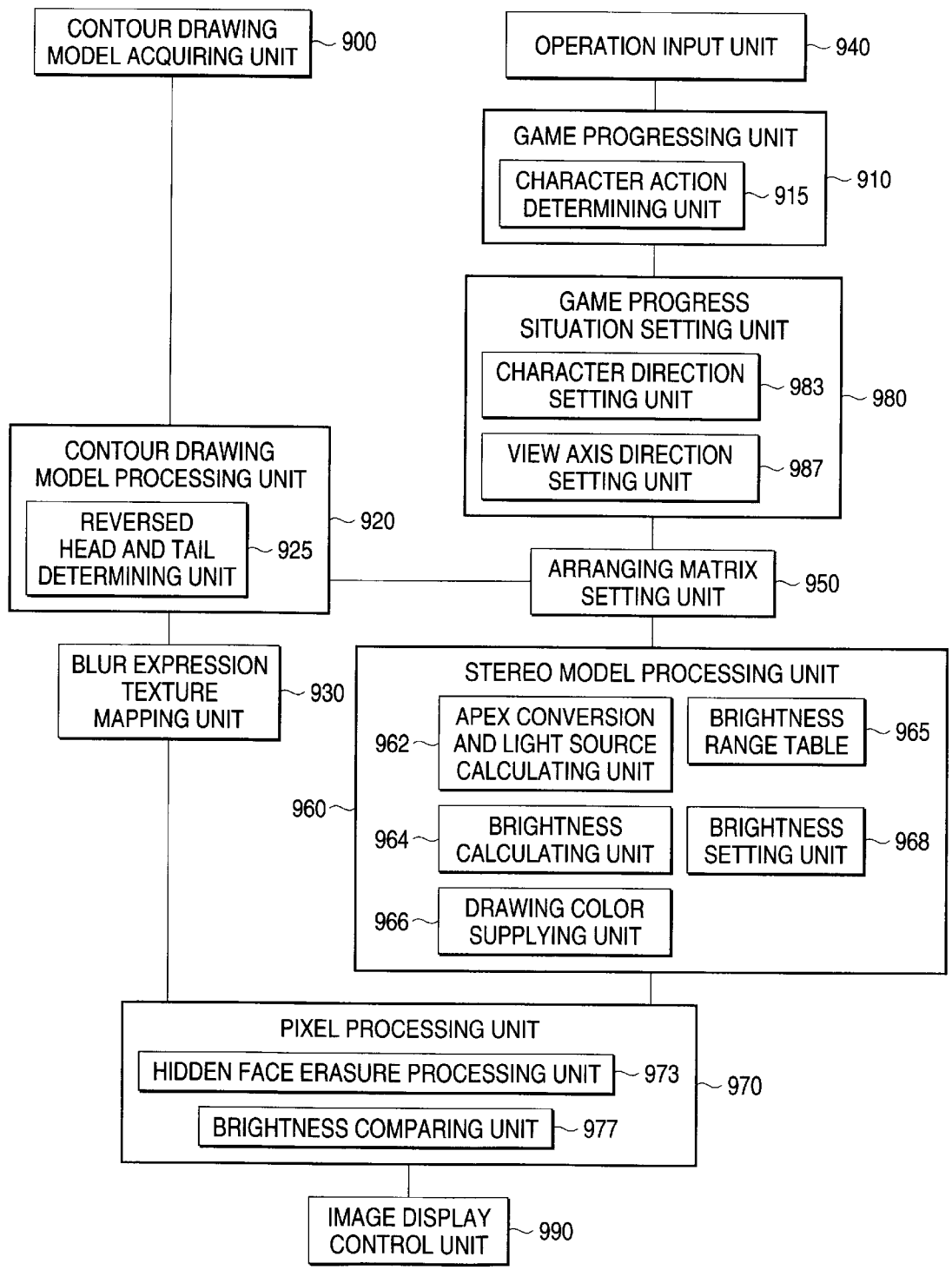
FIG. 42 is a functional block diagram of Embodiment 2.
Figure 43:
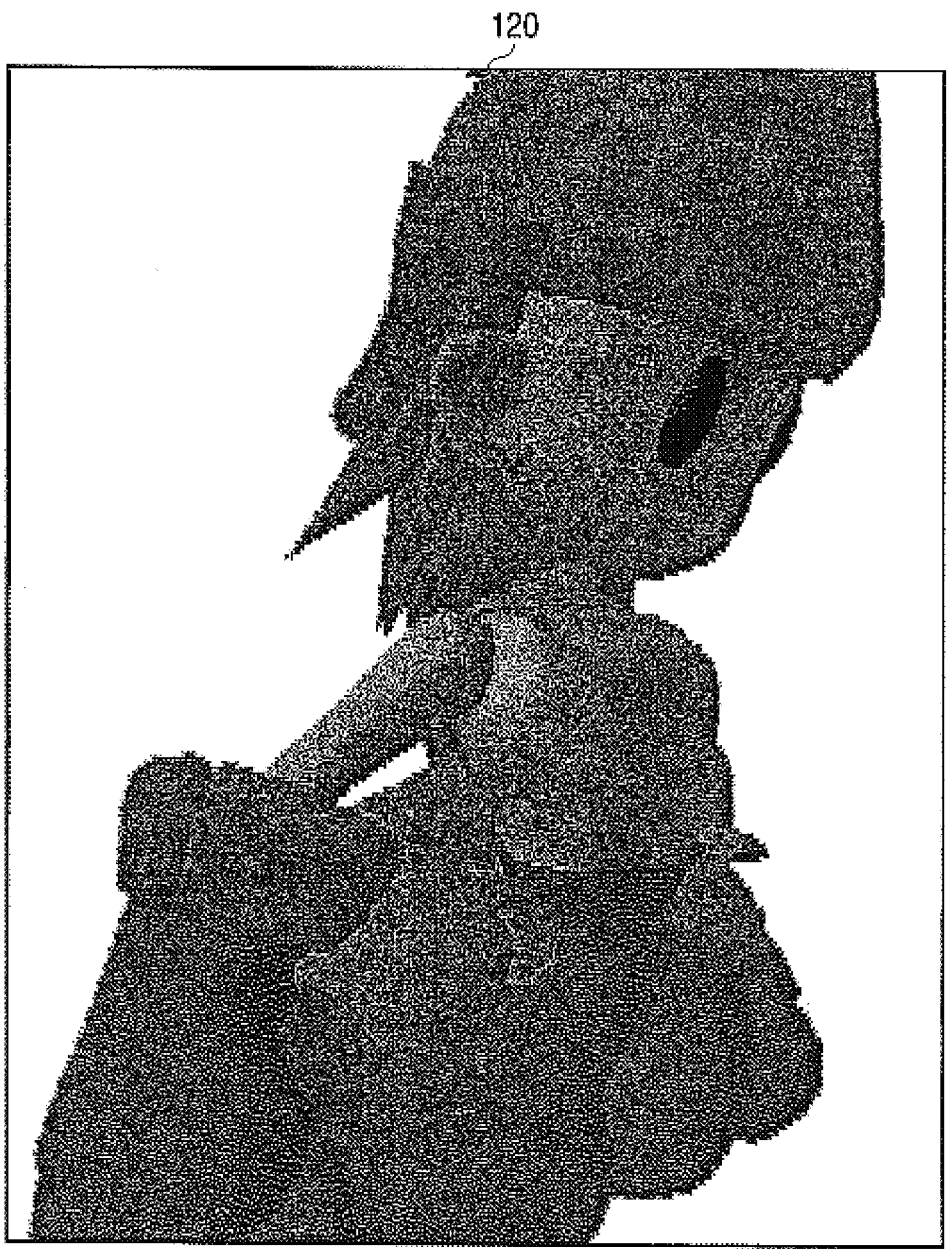
FIG. 43 shows a display example of an image rendered by using conventional technology.

As shown by FIG. 42, a game apparatus according to Embodiment 2, includes an operation input unit 940, a game progressing unit 910 including a character action determining unit 915, a game progress situation setting unit 980 including a character direction setting unit 983 and a view axis direction setting unit 987, an arranging matrix setting unit 950, a stereo model processing unit 960 including an apex conversion and light source calculating unit 962, a brightness calculating unit 964, a drawing color supplying unit 966, a brightness range table 965 and a brightness setting unit 968, a contour drawing model acquiring unit 900, a contour drawing model processing unit 920 receiving an arranging matrix from the arranging matrix setting unit 950 and including a reversed head and tail determining unit 925, a blur expression texture mapping unit 930, a pixel processing unit 970 receiving data from the stereo model processing unit 960 and the blur expression texture mapping unit 930 and including a hidden face erasure processing unit 973 and a brightness comparing unit 977 and an image display control unit 990.

The operation input unit 940 is realized by, for example, the key pad 161 and the interface unit 117 of FIG. 34. The operation input unit 940 outputs operation information of button, lever or the like of the operation input unit 940 operated by a player of a game to the game progressing unit 910.

The game progressing unit 910 determines content of progressing the game such as action of a character, a change in a view point position, a change in a direction of a view axis, or movement in a position of a light source, a change in a direction of light ray or the like based on information from the operation input unit 940 and gives instruction to the game progress situation setting unit. The character action determining unit 915 in the game progressing unit 910 is provided with a function of particularly determining the action of the character based on the information from the operation input unit 940.

The game progress situation determining unit 980 calculates and sets a position, a direction and a shape of the character, the position of the view point or the direction of the view axis, the position of the light source, the direction of the light ray and an increase or a decrease of physical strength in accordance with the action of the character in accordance with the content of progressing the game instructed by the game progressing unit 910. The character direction setting unit 983 in the game progress situation setting unit 980 is provided with a function of particularly determining a direction with respect to the view point of the character in accordance with the content of progressing the game instructed by the game progressing unit 910. Meanwhile, the view axis direction setting unit 987 in the game progress situation setting unit 980 is provided with a function of particularly setting the direction of the view axis in accordance with the content of progressing the game instructed by the game progressing unit 910.

The arranging matrix setting unit 950 executes a processing of determining the arranging matrix of the stereo model for expressing the character in accordance with position coordinates and a direction of the character and the position of the view point set by the game progress situation setting unit 980. The arranging matrix is a matrix for executing parallel movement, rotation and perspective view conversion of the stereo model.

When the contour drawing model which is large relative to the stereo model is acquired and the reference position of the contour drawing model is present at the position in correspondence with the reference position of the stereo model, the arranging matrix determined by the arranging matrix setting unit 950 can commonly be used by the stereo model processing unit 960 and the contour drawing model processing unit 920. When the arranging matrix can be used commonly, one store area for the arranging matrix may be prepared for the respective character and accordingly, the operation is efficient.

However, there also is the case in which the arranging matrix is not commonly used or cannot be commonly used. In that case, an arranging matrix of the stereo model and an arranging matrix of the contour drawing model are formed and are stored respectively in store areas. Further, when the arranging matrix cannot be commonly used, there also is a case in which one store area of the arranging matrix is prepared, immediately before the arranging matrix is used by the stereo model processing unit 960 and the contour drawing model processing unit 920, a setting is carried such that the arranging matrix of the stereo model includes contraction conversion or the arranging matrix of the contour drawing model includes enlargement conversion.

The contour drawing model acquiring unit 900 forms the contour drawing model in correspondence with, for example, the stereo model constituted by a triangular polygon. Further, when the contour drawing model has previously been formed, the contour drawing model acquiring unit 900 reads the contour drawing model which is previously formed and constituted by the triangular polygon. According to the respective polygon of the acquired contour drawing model, head and tail thereof is the same as that of the corresponding polygon of the stereo model. Further, the contour drawing model is larger than the stereo model and is defined by predetermined coloring for a contour line. Further, although the contour drawing model must finally be large relative to the corresponding stereo model, there is a case in which the size of the contour drawing object at this stage is the same as the stereo model. In this case, the contour drawing model is processed to be drawn to be large relative to the stereo model until the contour drawing model and the stereo model are drawn.

Further, there also is the case in which color of the contour drawing model succeeds color of material of the corresponding stereo model as it is. In this case, color for drawing is separately designated. The reference position of the contour drawing model is normally defined to dispose at the difference position of the stereo model or a vicinity thereof.

The contour drawing model processing unit 930 executes apex conversion (enlargement, contraction, rotation, parallel movement, perspective view conversion) by using the arranging matrix by the arranging matrix setting unit 950 with regard to respective apex of the contour drawing model and executes head and tail determination of the respective polygon of the contour drawing model. The above-described arranging matrix is used in the apex conversion. The head and tail determination is carried out by the reversed head and tail determining unit 925. Further, in this case, light source calculation is not executed. When the contour drawing model having a size the same as that of the stereo model is acquired by the contour drawing model acquiring unit 900, the contour drawing model processing unit 920 executes apex conversion for enlarging the contour line drawing model.

The blur expression texture mapping unit 930 executes a processing for mapping blur expression texture in the contour drawing model such that the contour line drawn as a result constitutes a blurred line. The blur expression texture is the texture having a pattern including a change in brightness or transparency (refer to FIG. 23). Further, it is not necessarily needed that the contour line is blurred and accordingly, the blur expression texture mapping unit 930 is selectively operated.

The stereo model processing unit 960 executes a processing of providing the stereo model with coloring in a cel animation tone as an example of non-photorealistic rendering in cooperation with the pixel processing unit 970.

The apex conversion and light source calculating unit 962 of the stereo model processing unit 960 executes apex conversion (enlargement, contraction, rotation, parallel movement, perspective view conversion) by using the arranging matrix by the arranging matrix setting unit 950 with regard to the respective apex of the triangular polygon constituting the stereo model arranged in a virtual three-dimensional space and carries out light source calculation with regard to the respective apex of the triangular polygon subjected to the apex conversion.

Further, the apex conversion and light source calculating unit 962 of the stereo model processing unit 960 also executes head and tail determination of the respective triangular polygon of the stereo model. Only a face directing head face to the visual point constitutes a drawing object.

The brightness calculating unit 964 of the stereo model processing unit 960 calculates brightness from color at respective apex of the triangular polygon calculated by the apex conversion and light source calculating unit 962. The apex conversion and light source calculating unit 962 normally calculates color in the RGB system and accordingly, the brightness calculating unit 964 calculates brightness Y by converting RGB into YIQ. The brightness at the respective apex of the triangular polygon is outputted to the pixel processing unit 970.

The brightness range table 965 is a table as shown by, for example, FIG. 2. That is, this is a table paired with threshold and reference brightness and in this case, there are set three stages (levels) such that threshold 0.75 versus reference brightness 0.75, threshold 0.5 versus reference brightness 0.50 and threshold 0.00 versus reference brightness 0.25. Further, in this case, the brightness is provided with a real number value from 0 to 1. A range by an upper limit and a lower limit may be designated in place of the threshold (for example, refer to FIG. 3).

The drawing color supplying unit 966 calculates drawing color in correspondence with the respective threshold in reference to the brightness range table 965. The drawing color in correspondence with the respective threshold is calculated by reference brightness in correspondence with threshold and information of color previously set to respective triangular polygon of the stereo model. The drawing color supplying unit 966 outputs the calculated drawing color to the pixel processing unit 970.

Further, the drawing color supplying unit 966 may calculate the drawing color in execution or may previously calculate the drawing color and store the data. For example, when the brightness range table as shown by FIG. 2 is used, it is necessary to store three drawing color data for respective polygon. For example, refer to FIG. 16.

The brightness range setting unit 968 selects one threshold of the brightness range table 965 and sets the threshold to the pixel processing unit 970. When the brightness range table 965 as shown by FIG. 2 is used as it is, the brightness range setting unit 968 sets brightness one by one in turn from upper columns. When the range by the upper limit and the lower limit is set in place of the threshold, the brightness can be selected and set at random.

When the triangular polygon constituting the drawing object of the contour drawing model is processed, the pixel processing unit 970 determines color of respective pixel in the triangular polygon constituting the drawing object of the contour drawing model while executing hidden face erasure processing by using the hidden face erasure processing unit 973 and writes the color to the frame buffer 213.

Meanwhile, when the triangular polygon constituting the drawing object of the stereo model is processed, firstly, the pixel processing unit 970 interpolates brightness at respective apex of the triangular polygon outputted from the brightness calculating unit 964 and calculates brightness in the respective pixel at inside of polygon (brightness distribution in polygon).

Further, the brightness comparing unit 977 compares brightness at the respective pixel with the threshold set by the brightness range setting unit 968. When the brightness at the pixel is equal to or larger than the threshold, the pixel processing unit 970 draws the pixel by drawing color based on the reference brightness in correspondence with the threshold. In the drawing processing, the hidden face erasure processing is also executed by using the hidden face erasure processing unit 973. When the brightness at the pixel is less than the threshold, the pixel is not drawn at this stage. When the brightness range setting unit 968 sets all of thresholds of the brightness range table 965 to the pixel processing unit 970 and in correspondence therewith, the pixel processing unit 970 executes drawing processing with regard to all of pixels in the triangular polygon, the inside of the triangular polygon is painted to classify in three stages according to example of FIG. 2. The processing is executed to all of triangular polygons of the stereo model.

According to the invention, there is a case in which hidden face erasure by the Z buffer 211 is utilized in the hidden face erasure processing. For example, when the stereo model is formed in a shape of a human being and the arm is disposed in front of the body or the like, there is a case in which it is difficult to draw an accurate contour line when the Z buffer method is not used in view of a positional relationship between faces of the contour drawing object and the stereo model.

In addition thereto, when the brightness range table 965 as shown by FIG. 2 is used as it is by the stereo model processing unit 960 and the pixel processing unit 970, hidden face erasure by the Z buffer 211 is utilized. For example, in accordance with FIG. 2, brightness equal to or larger than 0.75 is also equal to or larger than 0.5 and equal to or larger than 0.0 and accordingly, it is necessary to set an upper limit value of the brightness range such that the drawing color is not painted overlappingly. When brightness of a certain pixel is equal to or larger than 0.75, the pixel is drawn by drawing color in correspondence with threshold 0.75 and the Z value of the pixel is stored to the Z buffer 211.

When the threshold becomes 0.5, the Z value of the pixel is read from the Z buffer 211 and compared with the Z value of the same pixel to be written, however, naturally, these are the same and accordingly, drawing color in correspondence with the threshold 0.5 is not written to the frame buffer 213 with regard to the pixel. The same goes with the threshold 0.0.

Further, the brightness at apex of the polygon and pixel at inside of polygon is dealt with as an attribute value of color (RGB) referred to as a normally used as transparency. Normally, the a value is defined by a range of 0–255 and accordingly, the actual a value multiplied by brightness by 255 is used. Therefore, the threshold (upper limit and lower limit value) of the brightness range table 375 may be a value in a range of 0–255.

Finally, the image display control unit 420 designates an area of the frame buffer which is written with data by the pixel processing unit 390 for displaying on the display screen. The frame buffer is normally provided with two areas, one is used for display and other is used for writing. Further, when writing to the writing area has been finished, the writing area is used to switch to the display area and the display area is used to switch to the writing area. The image display control unit 420 controls the switching operation.

(Premise)

Also in Embodiment 2, there is a case in which data of the contour drawing model is previously formed and stored to CD-ROM 131 and the data is read from CD-ROM 131 in executing a game. The example of data written to CD-ROM 131 shown in FIG. 19 stays the same also in Embodiment 2 at the level shown by FIG. 19.

The program area 132 is stored with a program for executing the invention by the household game machine 1000. A description will be given later of content of the program.

The system data area 133 is stored with various data processed by the program stored in the program area 132, mentioned above. The image data area 134 is stored with data including the stereo model data 137 and the contour drawing model data 135. However, when the contour drawing model is formed in a contour drawing model acquiring processing, mentioned later, it is not necessary to store the contour drawing model data 135. Further, data of texture for expressing blur or the like is also stored in the image data area 134.

The contour drawing model data 135 is previously formed by the stereo model data 137 and is provided with following characteristic.

That is, the size of the contour drawing model is defined to be larger than that of the stereo model. For example, according to the contour drawing model, apexes thereof are moved in normal line directions of the respective apexes of the corresponding stereo model by a length of 2 percent of a total length of the stereo model and the contour drawing model is defined to enlarge by about 2 percent as a whole. When the enlargement rate is larger, a contour line is drawn further boldly and when the enlargement rate is smaller and the contour drawing model is slightly enlarged, the contour line is drawn further finely. Further, when the contour drawing model is defined to enlarge further not uniformly but partially, only the contour line at the further enlarged portion is drawn boldly. Adjustment of the size is carried out normally by a producer of the stereo model and accordingly, the contour line reflecting the intention of the producer can be drawn.

Further, color of material of respective polygon of the contour drawing model is set to color having chroma the same as that of the stereo model and brightness lower than that of the stereo model. Further, there also is the case in which all of respective polygons are set to single color of black or the like. Further, there also is the case in which setting is carried out to map blurred expression texture. Color of material is adjusted by the producer and therefore, the contour line is drawn by color intended by the producer. Further, head and tail of respective polygon of the contour drawing model in Embodiment 2 is not reversed. This is the point different from Embodiment 1.

Further, the size of the contour drawing model may be defined to be the same as the size of the corresponding stereo model. In this case, after acquiring the contour drawing model by a contour drawing model acquiring processing, mentioned later, the contour drawing model is enlarged during a time period until an arranging matrix of the contour drawing model is set by a contour drawing model arranging processing, mentioned later. Or, in setting the arranging matrix of the contour drawing model by the contour drawing model arranging processing, the arranging matrix may be determined such that the arranging matrix includes enlargement conversion. Conversely, when the stereo model is arranged, the arranging matrix of the stereo model may be determined such that the arranging matrix of the stereo model includes contraction conversion.

Further, color of material of respective polygon of the contour drawing model may be the same as color of material of respective polygon of the corresponding stereo model. In this case, in the drawing processing of the contour drawing model, mentioned later, for example, the contour drawing model is drawn by separately defined color such as black or the like.

The sound data area 136 is stored with data for outputting sound from the sound output apparatus 125 by the sound processing unit 109 shown by FIG. 34. Further, the sound processing is not directly related to the invention and therefore, it is not necessary to store data in the sound data area 136.

Next, an explanation will be given of a processing flow with regard to Embodiment 2. The following processing is a processing which the operation processing unit 103 (FIG. 34) executes by controlling other element in the household game machine main body 101.

(Total Processing Flow)

The processing flow at the level shown by FIG. 4 stays the same also in Embodiment 2. When the game is started, initial setting is carried out (step S2). The initial setting processing includes a processing of acquiring data of the stereo model for expressing a character to be drawn. Further, Embodiment 2 includes also a processing of acquiring data of the contour drawing model. Next, operation of button, lever or the like of the key pad 161 is carried out by a player of the game (step S3). Further, there is carried out a game progress processing for determining content of progressing the game such as action of a character in which, for example, the character moves to the left or the character attacks or the like, a change in a view point position, a change in a direction of a view axis, or movement of a light source position, a change in a direction of light ray or the like based on information of the operation input at step S3 (step S4).

Thereafter, in accordance with the content of progressing the game determined at step S4, there is carried out a game progress situation setting processing for setting a game progress situation such as a position, a direction and a shape of the character, the position of the view point or the direction of the view axis, the position of the light source or the direction of the light ray and an increase or a decrease of physical strength in accordance with action of the character in accordance with the content of progressing the game determined at step S4 (step S5). Next, there is carried out a game image drawing processing for writing a game image in accordance with the game progress situation to the frame buffer 213 (step S6). A description will be given later of the game image drawing processing.

Further, there is carried out a game image display processing for displaying the game image written to the frame buffer 213 by the game image drawing processing at step S6 (step S7). Normally, the frame buffer 213 is divided in two areas of a writing area and a display area and in this case, there is executed a processing in which the writing area written with data by the game image drawing processing executed at step S6 is switched to the display area and the display area is switched to successive writing area.

Next, it is determined whether the game is over (step S8). When in the game progress situation setting processing (step S5) executed in accordance with the operation input at step S3, physical strength of a self character operated by the player of the game is reduced and set to 0, the condition of game over is satisfied. At step S8, the physical strength of the self character operated by the player of the game is inspected and it is determined whether the game is over. When the physical strength of the self character is not 0, the operation returns to step S3 and awaits for successive operation input. Meanwhile, when the game is over, the game is finished. Further, even when the game is over, a result thereof is displayed on the display screen 120 at step S7 and accordingly, the player can grasp a final situation of the game from the display screen 120.

Further, the processing flow expressing an outline of the game image drawing processing (step S6 (FIG. 4)) shown in FIG. 20, stays the same also in Embodiment 2 at the level shown in FIG. 20. There is executed the background model drawing processing for drawing a background model for expressing a background portion in the game image (step S22). The drawing processing is the same as the conventional drawing processing and accordingly, a detailed description will not be given here. Further, following steps S24 through S27 are repeated until all of characters are drawn (step S23).

A first one of the repeated steps is the step of executing a deformation processing for deforming one unprocessed character (step S24). Motion of the unprocessed character is determined by the game progress processing at step S4 in accordance with the operation input executed at the step S3 of FIG. 4. Further, there is executed a processing of deforming the stereo model for expressing the unprocessed character, which is set by the game progress situation setting processing at step S6 executed further in accordance therewith. Further, in Embodiment 2, a processing of deforming the contour drawing model is also executed in accordance with the processing of deforming the stereo model.

A second one of the repeated steps is a step for setting an arranging matrix of the unprocessed character (step S25). The arranging matrix is a matrix for parallel movement, rotation and perspective view conversion of the stereo model for expressing the unprocessed character and is formed by position coordinates and a direction of the character and the position of the view point set by the game progress situation setting processing at step S5. As described above, when the contour drawing model is already defined to be large relative to the stereo model and the reference position of the contour drawing model is the same as the reference position of the stereo model, the arranging matrix of the stereo model can be used also for the contour drawing model. When the condition is not satisfied, arranging matrices may be set to respectives of the stereo model and the contour drawing model. Further, there also is a case in which an arranging matrix including enlargement conversion is set to the contour drawing model by a contour drawing model drawing processing, mentioned later. Further, there also is a case in which an arranging matrix including contraction conversion is set to the stereo model in the stereo model drawing processing.

Further, a third one of the repeated steps is a step of executing the contour drawing model drawing processing for drawing the contour drawing model (step S26). With regard to the contour drawing model drawing processing, a detailed description has been given of the second contour drawing processing and therefore, a simple explanation will be given as follows.

A fourth step of the repeated steps is a step of executing the stereo model drawing processing for drawing the stereo model for expressing the unprocessed character (step S27). Also with regard to the stereo model drawing processing, a detailed description has been given in Embodiment 1 and accordingly, a simple explanation will be given as follows.

After all of characters have been drawn, there is executed a window drawing processing for drawing a window for displaying capability of the character or the like to a user (step S28). Also the window drawing processing is the same as the conventional drawing processing and therefore, a detailed description will not be given here.

A structure of the character data explained in reference to FIG. 21 is the same as that in the second contour drawing processing and includes a numerical value of maximum physical strength 10, a numerical value of current physical strength 12, a numerical value of attack force 14, a numerical value of defence force 16, coordinates (x, y, z) of the reference position 18, rotational angles around X, Y and Z axes constituting direction 20 of the character, pointer 22 to motion data, pointer 24 to model data of the stereo model and pointer 26 to model data of the contour drawing model.

Next, an explanation will be given of a simple example (FIG. 7 and FIG. 8) with regard to a progress of a game story in accordance with the operation input of the player of the game.

FIG. 7 shows the example of the display screen 120 for displaying the image of the game for progressing the story while making the self character fight against enemy character in a virtual three-dimensional space by operating the self character C101 by the player of the game. In this case, the image of the character C101 from the front right side is displayed. On the left side of the display screen, the enemy character 1 (C111) and the enemy character 2 (C113) emerge.

Here, the position of the view point is determined by the game progress situation setting processing (step S5) in accordance with the positional relationship between the self character and the enemy character and the direction of the self character. Further, with regard to the respective character, a non-photorealistic image is formed from the position of the view point and is displayed on the display screen 120.

The self character attacks the enemy character in accordance with the operation input of the player from the key pad 161. Meanwhile, the enemy character attacks the self character in accordance with a predetermined algorism.

FIG. 8 shows the display screen 120 when the self character C101 is moved in the left direction of the display screen by operating the input apparatus 161 by the player of the game from the state of the display screen shown in FIG. 7.

Action of the character of "move in the left direction of the display screen" in response to the operation input is determined by the game progress processing (step S4 of FIG. 4). In accordance with action of the character, the direction, the position and the shape of the character are determined by the game progress situation setting processing (step S5 of FIG. 4). According to the example of FIG. 8, the direction of the character is set to the left direction relative to the display screen and the position of the character is moved similarly in the left direction relative to the display screen. Further, the shape of the character is set with the shape for expressing running motion.

In this way, even when the game progress situation of the direction or the position of the character or the like is changed, the character is drawn as the image in the cel animation tone along with the contour line.

(Contour Drawing Model Acquiring Processing)

The processing of acquiring the contour drawing model included in the initial setting (step S2) of FIG. 4 and shown by FIG. 31 is used also in Embodiment 2. In this case, firstly, it is determined whether the contour drawing model is to be formed (step S223). When it is determined that the contour drawing model is not formed, data of the contour drawing model stored in CD-ROM 131 is read (step S277).

When it is determined that the contour drawing model is formed, there is executed the processing of forming the contour drawing model (step S225). When the contour drawing model is formed at this stage, according to respective polygon of the contour drawing model, head and tail thereof is made the same as that of the corresponding polygon of the stereo model (refer to FIG. 30). The size of the contour drawing model is formed to be larger than that of the corresponding stereo model. Meanwhile, color of material of respective polygon of the contour drawing model is formed by color darker than color of material of respective polygon of the corresponding stereo model.

Next, it is determined whether texture for expressing blur is mapped to the contour drawing model (step S299). When it is determined that texture for expressing blue is not mapped and when the processing of mapping texture has been finished, the operation processing unit 103 finishes the drawing model acquiring processing.

(Contour Drawing Model Arranging Processing)

At step S25 of FIG. 20, the arranging matrix of the stereo model and the contour drawing model for expressing the unprocessed character is set and the processing for arranging the contour drawing model is carried out by the arranging matrix. Normally, the reference position of the contour drawing model is set at a position in correspondence with the reference position of the stereo model. Further, the arranging matrix of the contour drawing model is set such that the reference position of the contour drawing model is arranged at the position arranged with the reference position of the stereo model or at a vicinity thereof.

In this case, when the direction of the stereo model is changed, the arranging matrix including rotation conversion is set such that also the contour drawing model corresponds thereto. When the shape of the stereo model is changed, the deformation processing is carried out such that the contour drawing model corresponds thereto.

Thereby, finally, the relatively large contour drawing model is arranged to include the stereo model.

(Contour Drawing Model Drawing Processing)

The drawing processing flow of the contour drawing model shown in FIG. 32 is used also in Embodiment 2. In this case, processings explained below are repeated until all of apexes of the contour drawing model are processed (step S523). A first one of the repeated processings is apex conversion (enlargement, contraction, rotation, parallel movement, perspective view conversion) with respect to one apex (step S525). Caution is required here to that light source calculation is not executed to the contour drawing model.

Further, there is executed the determination processing of whether polygon (face) including the apex is a tail face under normal determination reference (step S527). Although normally, only a head face constitutes a drawing object, in the case of the contour drawing model of Embodiment 2, the tail face constitutes the drawing object under the normal determination reference.

When polygon (face) including the apex is the head face under normal determination reference, the operation returns to step S523. When the polygon (face) including the apex is the tail face under normal determination reference, there is executed the determination processing of whether texture expressing blur is mapped (step S529). The step signifies texture mapping of the polygon. When texture expressing blur is mapped, there is executed the processing of calculating texture coordinates of texture for expressing blur (step S531). When texture for expressing blur is not mapped, the operation proceeds to step S533.

Further, for example, the triangle drawing processing unit 205 and the pixel color processing unit 209 (FIG. 35) included in the pixel processing unit 970 are driven (step S533). As described above, the triangle drawing processing unit 205 forms data at respective pixel at inside of the triangular polygon by interpolating data of respective apex of the triangular polygon. Data of the respective apex are color of material, screen coordinate values and texture coordinate values when step S531 is executed. Further, data at respective pixel are color of material and pixel color when step S531 is executed. The pixel color processing unit 209 writes a display image to the frame buffer 213 by using data at respective pixel at inside of the triangular polygon formed by the triangle drawing processing unit 205. At this occasion, hidden face erasure is carried out by using the Z buffer 211.

(Stereo Model Drawing Processing)

The flow of the processing of drawing the stereo model shown in FIG. 9 can be used also in Embodiment 2. First, initial setting is carried out (step S603). In the initial setting, there is acquired the brightness range table (for example, FIG. 2 or FIG. 3) in correspondence with the stereo model. Next, there is carried out apex conversion (enlargement, contraction, rotation, parallel movement, perspective view conversion) and light source calculation with regard to one apex (step S605).

Next, it is determined whether polygon (face) including the apex is the head face (step S607). When the polygon (face) including the apex is the tail face, the operation returns to step S605. When the polygon (face) including the apex is the head face, there is calculated brightness at the apex where apex conversion and light source calculation are carried out (step S609).

After step S609, there is calculated drawing color of polygon including the apex subjected to apex conversion and light source calculation (step S611). The drawing color of polygon is calculated from reference brightness in correspondence with the respective brightness range stored in the brightness range table and color of the polygon.

Next, one of the brightness ranges of the brightness range table is selected (step S613). Further, brightness at respective pixel at inside of the polygon (brightness distribution in polygon) is calculated by interpolating brightness at the apex of the polygon. Although color of the apex is also interpolated, since the three apexes are provided with the same drawing color and accordingly, the result remains the same even after the interpolation. Further, when the brightness at the pixel falls in the selected brightness range, the pixel is drawn by drawing color in correspondence with the selected brightness range (step S615). The steps S613 and S615 are repeated until the processing is carried out with respect to all of the brightness ranges (step S617).

For example, when the pixel color processing unit 209 cannot deal with two brightness values of an upper limit and a lower limit, the same effect can be achieved by also using the Z buffer 211. Although the Z buffer 211 is used in hidden face erasure, in Embodiment 2, by also using the Z buffer 211, an effect similar to that in the case of comparing with the upper limit value of the brightness is achieved.

The above steps S605 through S617 are repeated until the processing is carried out with respect to all of apexes of the stereo model and, as a result, repeated until the processing is carried out with respect to all of polygons (step S619).

(Stereo Model Drawing Processing (Part 2))

The flow of the second stereo model drawing processing shown in FIG. 15 can be used also in Embodiment 2. In FIG. 15, firstly, initial setting is carried out (step S633). In the initial setting, there is acquired the brightness range table (for example, FIG. 2 or FIG. 3) in correspondence with the stereo model. Further, color data for drawing the stereo model is acquired. Next, there is carried out apex conversions (enlargement, contraction, rotation, parallel movement, perspective view conversion) and light source calculation are carried out with respect to one apex (step S635).

Next, it is determined whether polygon (face) including the apex is a head face (step S637). When the polygon (face) including the apex is a tail face, the operation returns to step S635. When the polygon (face) including the apex is the head face, there is calculated the brightness at the apex subjected to apex conversion and the light source calculation (step S639).

Further, drawing color of the polygon including the apex subjected to apex conversion and the light source calculation is read from the memory 105 (step S641). Next, one of the brightness ranges of the brightness range table is selected (step S643). Thereafter, the brightness at respective pixel at inside of the polygon (brightness distribution in polygon) is calculated by interpolating the brightness at the apex of the polygon. Although color of the apex is also interpolated, since the three apexes are provided with the same drawing color and accordingly, the result remains the same even by the interpolation. Further, when the brightness at the pixel falls in a selected brightness range, drawing is carried out by drawing color in correspondence with the selected brightness range (step S645). The steps S643 and S645 are repeated until the processing is carried out with respect to all of the brightness ranges (step S647).

For example, when the pixel color processing unit 209 cannot deal with two brightness values of the upper limit and the lower limit, by also using the Z buffer 211, the same effect can be achieved. Although the Z buffer 211 is used in hidden face erasure, according to the embodiment, by also using the Z buffer 211, an effect similar to that in the case of comparing with the upper limit value is achieved.

The above steps S635 through S647 are related until the processing is carried out with respect to all apexes of the stereo model and, as a result, repeated until processing is carried out with respect to all of polygons (step S649).

When the above-described processing are carried out, all of polygons of the stereo model are painted to classify by brightnesses at predetermined stages and with regard to the stereo model, an image in the cel animation tone can be provided. Further, according to the contour drawing model introduced in Embodiment 2, a portion of a face rearward from the stereo model which is not hidden by the stereo model is drawn and accordingly, the portion is rendered as the contour line. According to Embodiment 2, in drawing the contour line, the contour line can simply be drawn by executing the processings substantially similar to a normal rendering processing by only introducing the contour drawing model.

Also in Embodiment 2, there are can provided the display screen 120 substantially equivalent to that shown by FIG. 37, FIG. 38, FIG. 39, FIG. 40 and FIG. 41. In FIG. 37, there is drawn the self character in the state in which the self character is directed to the right direction of the display screen 120.

When the player depresses the operation button 166LL from the state in which the self character is directed to the right direction of the display screen, in response thereto, it is determined that the character moves in the left direction of the display screen in accordance with the determination. The self character transits to FIG. 39 in the state in which the self character is directed in the left direction of the display screen by way of FIG. 38 in the state in which the self character is directed to the front side relative to the display screen. Even when the self character is operated in accordance with the operation input, there can be provided the game image in the cel animation tone in real time.

Meanwhile, FIG. 40 shows an example of the display screen 120 in the state in which the camera is moved upwardly in response to operation of the operation button 166RU by the player from the state of FIG. 37. The image from above the self character is displayed.

FIG. 41 shows an example of the display screen 120 in the state in which the camera is moved further upwardly by operating further the operation button 166RU by the player from the state of FIG. 40. There is displayed the image further upward from the self character. In this way, even when the camera is moved in response to the operation input, that is, even when the view point is switched, there can be provided the game image in the cel animation tone in real time.

Thereby, there can be provided the game image in the cel animation tone attached with the contour line in accordance with the operation input in real time by using the CG technology.

4. Other Embodiments (1) The algorism for drawing the contour line is not limited to the above-described but drawing can be carried out by other algorism.

(2) The algorism for coloring the stereo model in the cel animation tone is not limited to the above-described but drawing can be carried out by other algorism.

(3) Although according to the initial stereo model drawing processing of Embodiments 1 and 2, in FIG. 9 expressing the stereo model drawing processing, after steps S605 through S609, the processing of calculating the drawing color of the polygon is executed as step S611, no problem is paused when the drawing color of the polygon has been calculated until the drawing color is used at step S615. Therefore, step S615 may be carried out prior to step S609 or S605, may be carried out in parallel with steps S609 and S605 or may be carried out after step S613 or may be carried out in parallel with step S613.

(4) At step S609 in FIG. 9 expressing the initial stereo model drawing processing of Embodiments 1 and 2, the brightness Y of the apex of the polygon after light source calculation is calculated by the YIQ conversion. Y and Q as a result of the YIQ conversion is not used and therefore, the operation is carried out at high speed when these are not calculated, however, when a routine or the like for carrying out the YIQ conversion is already present, Y and Q may be calculated by using the routine.

(5) At step S615 in FIG. 9 expressing the initial stereo model drawing processing of Embodiments 1 and 2, data of pixel at inside of polygon is formed by interpolating data of the apex of the polygon. When the processing is once carried out, the processing remains unchanged even when a different brightness range is selected and set by the repetition at step S617 and accordingly, the result may be held and used.

(6) At step S605 in FIG. 9 showing the initial stereo model drawing processing of Embodiments 1 and 2, perspective view conversion is carried out and light source calculation is carried out, however, the perspective view conversion may be carried out until step S615. However, when the perspective view conversion is carried out outside of a loop by step S617, the perspective view conversion may not be carried out at a number of times. Therefore, an amount of calculation can be reduced by executing the perspective view conversion at timing of step S605.

(7) Although in FIG. 18 and FIG. 30, the face of the contour drawing model and the face of the stereo model are brought into one-to-one correspondence, a number of the faces of the contour drawing model can also be reduced. Because when the number of the faces is reduced, the processing is accelerated. However, in the faces of the contour drawing model, there are present faces in correspondence with the stereo model.

(8) Change of Used Hardware

Although according to the above-described embodiments, there is disclosed the embodiment in which portions of processings of the stereo model and the contour line drawing model drawing processings are executed by the graphics processing unit 111, a total of the stereo model and the contour drawing model drawing processings may be carried out by the graphics processing unit 111 or may be executed by the operation processing unit 103.

Further, FIG. 34 shows only an example and can be changed variously. It is arbitrary whether the communication interface 115 is provided. It is not necessary to provide the sound processing unit 109 since the invention is not directly related to the sound processing. Further, a storing apparatus of a hard disk HDD or the like may separately be held.

Further, CD-ROM is an example of a record medium and there may be used other record medium such as an inner memory of ROM, CD-ROM, DVD-ROM, memory cartridge, floppy disk, magnetic disk DVD-RAM or the like. In that case, it is necessary to constitute the CD-ROM drive 113 by a drive which can be read by a corresponding medium.

Further, although the above-described is the case in which the invention is mounted by a computer program, the invention can be mounted by a combination of a computer program and an exclusive apparatus such as an electronic circuit or the like only by an exclusive apparatus such as an electronic circuit or the like. In that case, the apparatus may be constituted for respective functions represented by respective steps of the above-described processing flows or it is also conceivable to constitute the apparatus for respective portions of these or combinations of these.

As mentioned above, although a specific explanation has been given of the invention based on the embodiments, the invention is not limited to the above-described embodiments but can pertinently be changed within a range not deviated from the gist. For example, although in the above-described embodiments, a description has been given of the case in which the invention is realized with the household game machine as a platform, the invention may be realized with a computer arcaid game machine or the like as a platform. Depending on cases, it is also conceivable to realize the invention with a portable information terminal, a car navigation system or the like as a platform.

Further, programs or data for realizing the invention are not limited to a mode provided to a computer or a game machine by a record medium such as attachable and detachable CD-ROM or the like. That is, programs or data for realizing the invention may be in a mode in which by the communication interface 115 shown in FIG. 34, the programs or data are recorded to a memory of other apparatus side on the network 151 connected via the communication network 141 and the programs or data are successively stored to the memory 105 and used as necessary via the communication network 141.

(Display Example)

Figures 44, 45:
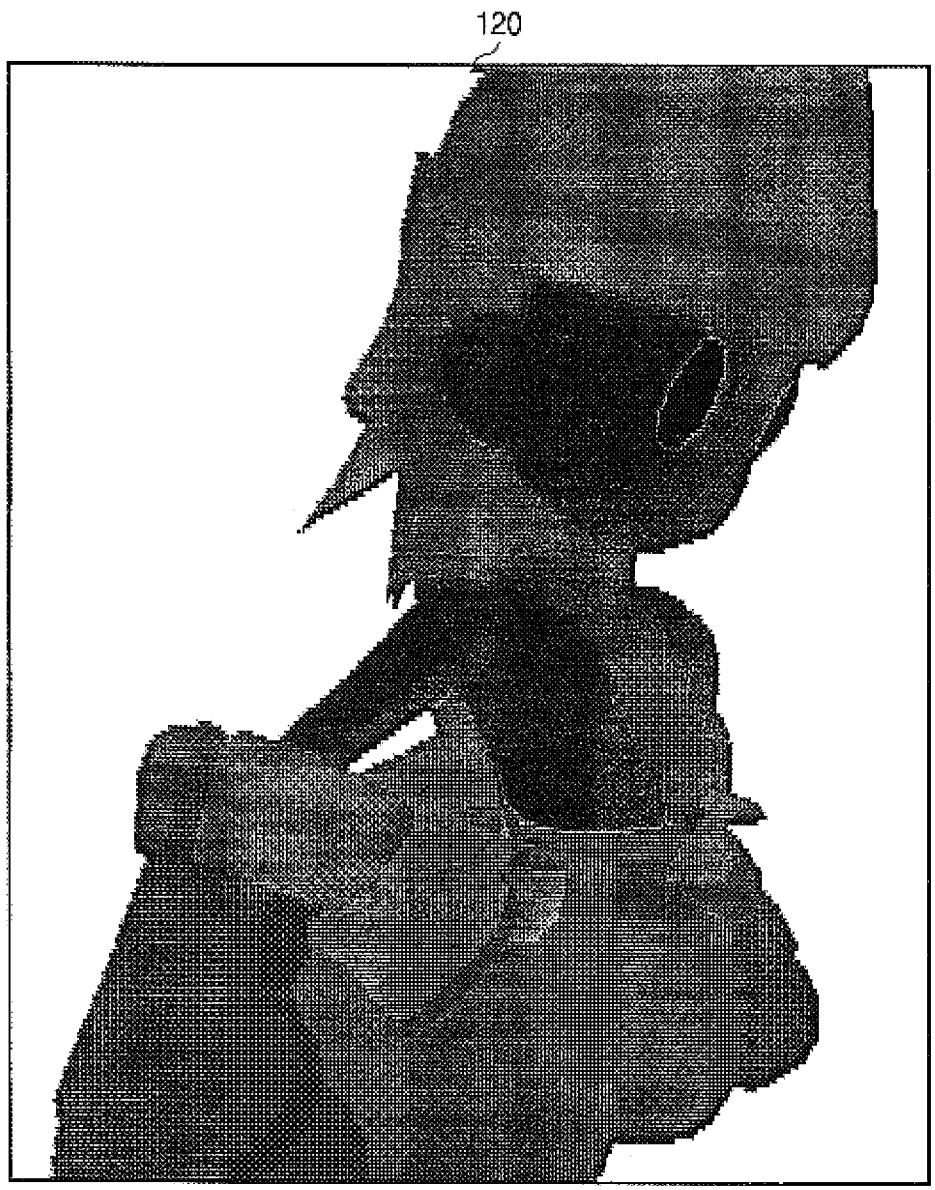
FIG. 44 shows a display example of an image rendered by using a cel animation tone coloring processing.
FIG. 45 is a table showing an example of a brightness range table used in rendering in FIG. 44 and FIG. 47.

FIG. 49 shows a display example of an image when the invention is not used, that is, when color of respective pixel in polygon is interpolated by color of apex of polygon. Further, FIG. 43, FIG. 44, FIG. 46 and FIG. 47 show an example of a display screen in which only the self character of FIG. 7 is displayed to enlarge. For example, there is known a behavior in which the brightness is naturally changed from a vicinity of the ear of the face of the character at a central portion of the image to the right side of the face of the character. Meanwhile, FIG. 44 shows an example of a display example of an image when there is used a brightness range table defining two of the brightness ranges (thresholds) and the image is drawn by an algorism of a coloring processing in the cel animation tone. FIG. 45 shows the brightness range table used in FIG. 44. In this case, there are set two stages of threshold value and reference brightness such that threshold 0.3125 versus reference brightness 0.75 and threshold 0 versus reference brightness 0.60. Different from FIG. 43, it is known that FIG. 44 is painted to classify by two stages of the brightness from a vicinity of the ear of the face of the character at the central portion of the image to the right side of the face of the character.

Figure 46:
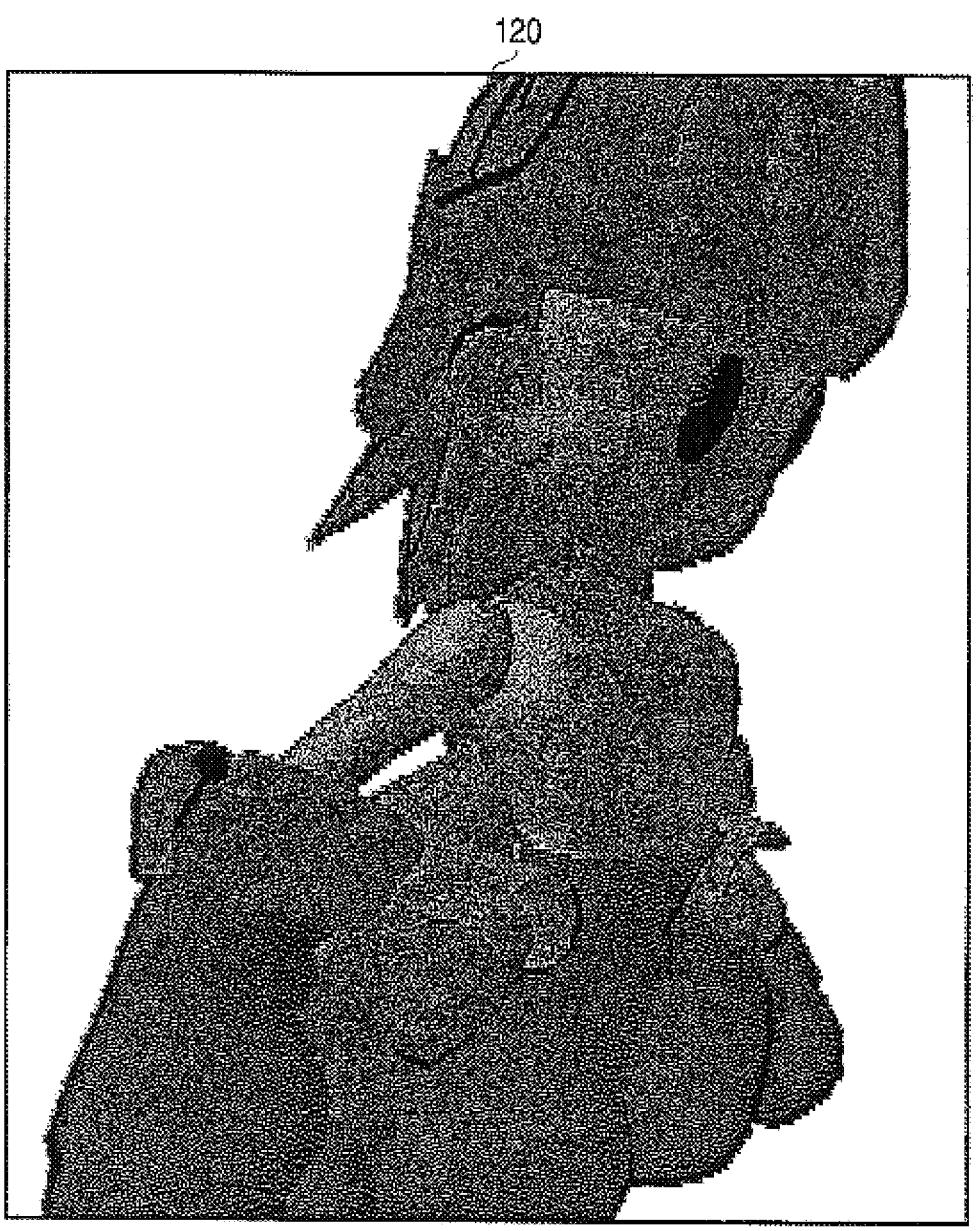
FIG. 46 shows a display example of an image rendered by using the first and the second contour drawing processings.

Further, FIG. 46 shows a display example when the image is drawn by the algorism of the first and the second contour drawing processing. In FIG. 46, there is known a behavior in which the brightness is naturally changed, for example, from a vicinity of the ear of the face of the character at a central portion of the image to the right side of the face of the character. Further, it is known that a contour line of the hair, the body, a bag or the like is also drawn.

Figure 47:
FIG. 47 shows a display example of an image rendered by using Embodiments 1 and 2.

FIG. 47 shows a display example of the image when the image is drawn by the algorism of Embodiments 1 and 2. The brightness range table of FIG. 45 is used similar to FIG. 44. In FIG. 47, it is known that the image is painted to classify by two stages of the brightness from a vicinity of the ear of the face of the character at a central portion of the image to the right side of the face of a person. Further, it is known that a contour line of the hair, body, a bag or the like is also drawn.

By using the algorism of the invention, as a non-realistic image, there can be provided a game image attached with a contour line, an image in the cel animation tone, and an image in the cel animation tone drawn with a contour line in real time in accordance with operation input.

What is claimed is:

1. A method of displaying a stereo model in a video game in a cel animation tone by drawing the stereo model constituted by a plurality of polygons in a virtual three-dimensional space, said method comprising:

a first step of determining a direction of displaying the stereo model in response to an operation input;

a second step of arranging the stereo model and a contour drawing model, having a shape including the stereo model and constituted by a plurality of polygons, in conformity with the direction determined at the first step such that a positional relationship in which the contour drawing model includes the stereo model is constituted; and a third step of drawing the stereo model in the cel animation tone by reducing a number of a brightness values previously given to the stereo model and drawing only the polygons of the contour drawing model having a surface directed in a direction reverse to the direction determined at the first step.

2. The method of displaying the stereo model in the video game according to claim 1:

wherein the third step further comprises drawing the stereo model in the cel animation tone by reducing the number of the brightness values previously given to the stereo model and drawing only the polygons of the contour drawing model having the surface directed in the direction reverse to the direction determined at the first step by using a predetermined color.

3. The method of displaying the stereo model in the video game according to claim 1:

wherein the first step further comprises moving the stereo model and determining the direction of displaying the stereo model in response to the operation input.

4. The method of displaying the stereo model in the video game according to claim 1:

wherein the first step further comprises switching a view point and determining the direction of displaying the stereo model in response to the operation input.

5. The method of displaying the stereo model in the video game according to claim 1:

wherein the stereo model comprises a character.

6. A computer-readable recording medium stored with a stereo model display program for drawing a stereo model of a video game in a cel animation tone, the stereo model constituted by a plurality of polygons in a virtual three-dimensional space:

wherein the stereo model display program makes a computer execute:

a first step of determining a direction of displaying the stereo model in response to an operation input;

a second step of arranging the stereo model and a contour drawing model, having a shape including the stereo model and constituted by a plurality of polygons, in conformity with the direction determined at the first step such that a positional relationship in which the contour drawing model includes the stereo model is constituted; and a third step of drawing the stereo model in a cel animation tone by reducing a number of a brightness values previously given to the stereo model and drawing only the polygons of the contour drawing model having a surface directed in a direction reverse to the direction determined at the first step.

7. The computer-readable record medium according to claim 6:

wherein the third step further comprises drawing the stereo model in a cel animation tone by reducing the number of the brightness values previously given to the stereo model and drawing only the polygons of the contour drawing model having the surface directed in the direction reverse to the direction determined at the first step by using a predetermined color.

8. The computer-readable record medium according to claim 6:

wherein the first step further comprises moving the stereo model and determining the direction of displaying the stereo model in response to the operation input.

9. The computer-readable record medium according to claim 6:

wherein the first step further comprises switching a view point and determining the direction of displaying the stereo model in response to the operation input.

10. The computer-readable record medium according to claim 6:

wherein the stereo model comprises a character.

11. An apparatus for displaying a stereo model in a video game by drawing the stereo model constituted by a plurality of polygons in a virtual three-dimensional space, wherein said apparatus executes:

determining a direction of displaying the stereo model in response to an operation input;

arranging the stereo model and a contour drawing model, having a shape including the stereo model and constituted by a plurality of polygons, in conformity with the determined direction such that a positional relationship in which the contour drawing model includes the stereo model is constituted; and drawing the stereo model in a cel animation tone by reducing a number of brightness values previously given to the stereo model and drawing only the polygons of the contour drawing model having a surface directed in a direction reverse to the determined direction.

12. A game apparatus for drawing a stereo model in a cel animation tone, the stereo model constituted by a plurality of polygons in a virtual three-dimensional space, said apparatus comprising:

a computer;

a computer-readable record medium stored with a program which the computer executes;

wherein the program makes the computer execute:

a determining processing of determining a direction of displaying the stereo model in response to an operation input;

an arranging processing of arranging the stereo model and a contour drawing model, having a shape including the stereo model and constituted by a plurality of polygons, in conformity with the direction determined by the determining processing such that a positional relationship in which the contour drawing model includes the stereo model is constituted; and a drawing processing of drawing the stereo model in a cel animation tone by reducing a number of a brightness values previously given to the stereo model and drawing only the polygons of the contour drawing model having a surface directed to a direction reverse to the direction determined by the determining processing.

* * * * *